United States Patent
Zhou et al.

(10) Patent No.: US 12,478,963 B2
(45) Date of Patent: Nov. 25, 2025

(54) CONTROLLED CELL-CELL INTERACTION ASSAY

(71) Applicant: Singleron Biotechnologies Inc., Woodbridge, CT (US)

(72) Inventors: Jing Zhou, Woodbridge, CT (US); Janaki Acharya, Woodbridge, CT (US); Peter Cyrus Torab, Woodbridge, CT (US); Zhengyue Li, Woodbridge, CT (US)

(73) Assignee: Singleron Biotechnologies Inc., Woodbridge, CT (US)

( * ) Notice: Subject to any disclaimer, the term of this patent is extended or adjusted under 35 U.S.C. 154(b) by 655 days.

(21) Appl. No.: 17/822,562

(22) Filed: Aug. 26, 2022

(65) Prior Publication Data

US 2023/0138703 A1     May 4, 2023

Related U.S. Application Data

(60) Provisional application No. 63/238,041, filed on Aug. 27, 2021.

(51) Int. Cl.
  *B01L 3/00* (2006.01)
  *C12Q 1/6874* (2018.01)

(52) U.S. Cl.
  CPC ...... *B01L 3/502715* (2013.01); *C12Q 1/6874* (2013.01); *B01L 2300/021* (2013.01); *B01L 2300/0645* (2013.01); *B01L 2300/0816* (2013.01); *B01L 2300/0864* (2013.01); *B01L 2400/0415* (2013.01)

(58) Field of Classification Search
  CPC ......... B01L 3/502715; B01L 2300/021; B01L 2300/0645; B01L 2300/0816; B01L 2300/0864; B01L 2400/0415; B01L 3/502761; B01L 3/502707; B01L 2200/0668; B01L 2200/10; B01L 2300/0636; B01L 2400/0424; C12Q 1/6874; C12Q 1/6869; G01N 33/58; B01J 2219/00317; B01J 2219/00549; B01J 2219/00608; B01J 2219/00612; B01J 2219/00621; B01J 2219/00653;
  (Continued)

(56) References Cited

U.S. PATENT DOCUMENTS

2016/0010085 A1\* 1/2016 Kwon ............... C12N 15/1065
                                                                              506/4
2019/0127731 A1   5/2019 McDermott
(Continued)

FOREIGN PATENT DOCUMENTS

WO   WO2017/095917     6/2017
WO   WO2018/148700     8/2018
(Continued)

OTHER PUBLICATIONS

Advisory Action dated Mar. 19, 2024 in U.S. Appl. No. 17/388,537.
(Continued)

*Primary Examiner* — Brian J. Sines
(74) *Attorney, Agent, or Firm* — Dickinson Wright PLLC

(57) ABSTRACT

Disclosed herein include methods, devices, kits, and systems for nucleic acid sequencing, for example, to determine cell-cell interaction using a dielectrophoresis microfluidic device.

19 Claims, 15 Drawing Sheets
Specification includes a Sequence Listing.

(58) Field of Classification Search
CPC .... B01J 2219/00659; B01J 2219/00713; B01J 2219/00722; B01J 19/0046
See application file for complete search history.

(56) References Cited

U.S. PATENT DOCUMENTS

| | | |
|---|---|---|
| 2019/0136316 A1 | 5/2019 | Hindson et al. |
| 2024/0200134 A1* | 6/2024 | Love .................... C12Q 1/6806 |

FOREIGN PATENT DOCUMENTS

| | | |
|---|---|---|
| WO | WO2018/226293 | 12/2018 |
| WO | WO2019/222284 | 11/2019 |
| WO | WO2020/037065 | 2/2020 |
| WO | WO2020/123309 | 6/2020 |
| WO | WO2021/041974 | 3/2021 |
| WO | WO2022/026667 | 2/2022 |
| WO | WO2022/251110 | 12/2022 |
| WO | WO2023028582 | 3/2023 |

OTHER PUBLICATIONS

Alles et al., "Cell fixation and preservation for droplet-based single-cell transcriptomics," BMC Biology 2017, 15(44), in 14 pages.

Bose et al., "Scalable microfluidics for single-cell RNA printing and sequencing," Genome Biology 2015, 16(120), 1-16.

Brennecke et al., "Accounting for technical noise in single-cell RNA-seq experiments," Nature Methods 2013, 10(11), 1093-1095.

Cao et al., "Comprehensive single-cell transcriptional profiling of a multicellular organism," Science 2017, 357,661-667.

Final Office Action dated Dec. 8, 2023 in U.S. Appl. No. 17/388,537.

Intention to Gant dated Apr. 9, 2023 in Europe Patent Application No. 21769211.0.

International Search Report and Written Opinion dated Oct. 26, 2021 in PCT Application No. PCT/US2021/043643.

International Search Report and Written Opinion dated Sep. 26, 2022 in PCT Application No. PCT/US2022/030522.

Islam et al., "Characterization of the single-cell transcriptional landscape by highly multiplex RNA-seq," Genome Research 2011, 21, 1160-1167.

Jaitin et al., "Massively parallel single cell RNA-Seq for marker-free decomposition of tissues into cell types," Science 2014, 343(6172), 776-779.

Klein et al., Droplet Barcoding for Single-Cell Transcriptomics Applied to Embryonic Stem Cells, Cell 2015, 161, 1187-1201.

Macosko et al., "Highly parallel genome-wide expression profiling of individual cells using nanoliter droplets," Cell 2015, 161(5), 1202-1214.

Non-Final Office Action dated Aug. 1, 2023 in U.S. Appl. No. 17/388,537.

Office Action dated Nov. 9, 2023 in Europe Patent Application No. 21769211.0.

Restriction Requirement dated Mar. 16, 2023 in U.S. Appl. No. 17/388,537.

Rosenberg et al., "Single-cell profiling of the developing mouse brain and spinal cord with split-pool barcoding," Science 2018, 360, 176-182.

Tang et al., "mRNA-Seq whole-transcriptome analysis of a single cell," Nature Methods 2009, 6(5), 377-382.

International Search Report and Written Opinion dated Dec. 22, 2022 in PCT Patent Application No. PCT/US2022/075509.

* cited by examiner

CONTROLLED CELL-CELL INTERACTION ASSAY

CROSS-REFERENCE TO RELATED APPLICATIONS

This application claims the benefit under 35 U.S.C. § 119(e) to U.S. Provisional Patent Application No. 63/238,041 filed Aug. 27, 2021, the content of which is incorporated herein by reference in its entirety for all purposes.

REFERENCE TO SEQUENCE LISTING

The present application is being filed along with includes a Sequence Listing in electronic format. The Sequence Listing is provided as a file entitled Sequence_Listing_76PP-328944-US, created Jan. 16, 2023, which is 166 kilobytes in size. The information in the electronic format of the Sequence Listing is incorporated herein by reference in its entirety.

BACKGROUND

Field

The present disclosure relates generally to the field of molecular biology, for example nucleic acids analysis.

Description of the Related Art

Technologies have been developed to investigate single cell genetic information and functionality individually. There is a need for high throughput single cell sequencing technologies that can link the genetic information of single cells to their phenotypic information such as a specific functional feature.

SUMMARY

Disclosed herein include embodiments of a microfluidic device. In some embodiments, a microfluidic device comprises a substrate. The microfluidic device can comprise a plurality of electrodes on the substrate. The plurality of electrodes can comprise a ground electrode, a first signal electrode, and a second signal electrode. The microfluidic device can comprise a microwell array on the substrate and the plurality of electrodes. The microfluidic device can comprise a plurality of microwells. Each of the plurality of microwells can comprise a plurality of barcode molecules attached thereto. Each barcode molecule of the plurality of barcode molecules can comprise a molecular barcode sequence, a first microwell barcode sequence, and/or a second microwell barcode sequence. First microwell barcode sequences of the pluralities of barcode molecules can be predetermined. First microwell barcode sequences of the pluralities of barcode molecules can be identical in each first group of microwells (e.g., microwells in each row) of the microwell array. First microwell barcode sequences of the pluralities of barcode molecules can be different in microwells in different first groups (e.g., different rows) of the microwell array. Second microwell barcode sequences of the pluralities of barcode molecules can be predetermined. Second microwell barcode sequences of the pluralities of barcode molecules can be identical in microwells in each second group of microwells (e.g., microwells in each column) of the microwell array. Second microwell barcode sequences of the pluralities of barcode molecules can be different in microwells in different second groups (e.g., different columns) of the microwell array. A surface of each of the plurality of electrodes can be on a bottom of at least one microwell of the plurality of microwells. A space between the first signal electrode and the ground electrode in the microwell can be capable of trapping a first cell when a first signal is applied to the first signal electrode and the ground electrode. A space between the second signal electrode and the ground electrode in a microwell of the plurality of microwells can be capable of trapping a second cell when a second signal is applied to the second signal electrode and the ground electrode. The microfluidic device can comprise a flow channel. The flow channel can comprise an inlet and an outlet. The inlet and the outlet can be in fluidic communication with the microwell array.

In some embodiments, a surface of the first signal electrode is on the bottom of each microwell of the plurality of microwells. A surface of the second signal electrode can be on the bottom of each microwell of the plurality of microwells. In some embodiments, the plurality of electrodes comprises a plurality of first signal electrodes and a plurality of second signal electrodes. A surface of each of the plurality of first signal electrodes can be on the bottom of at least one microwell of the plurality of microwells. A surface of each of the plurality of second signal electrodes can be on the bottom of at least one microwell of the plurality of microwells. In some embodiments, all first signal electrodes of the plurality of first signal electrodes are connected. In some embodiments, some first signal electrodes of the plurality of first signal electrodes are unconnected. For example, at least two (e.g., 2, 3, 4, 5, 6, 7, 8, 9, 10, or more, such as all) first signal electrodes of the plurality of first signal electrodes can be unconnected. For example, all first signal electrodes of the plurality of first signal electrodes are unconnected. In some embodiments, all second signal electrodes of the plurality of second signal electrodes are connected. In some embodiments, some second signal electrodes of the plurality of second signal electrodes are unconnected. For example, at least two (e.g., 2, 3, 4, 5, 6, 7, 8, 9, 10, or more, such as all) second signal electrodes of the plurality of second signal electrodes can be unconnected. For example, all second signal electrodes of the plurality of second signal electrodes are unconnected. The relative orientations of first signal electrodes can be different in different embodiments. For example, at least two (e.g., 2, 3, 4, 5, 6, 7, 8, 9, 10, or more, such as all) first signal electrodes (or portions of first signal electrodes) of the plurality of first signal electrodes can be parallel (or perpendicular) to each other (or to one another). For example, the relative orientation (or angle) of 2 (or 2 or more, e.g., 2, 3, 4, 5, 6, 7, 8, 9, 10, or more, such as all) first signal electrodes (or portions of first signal electrodes) can be, or be about, 5°, 10°, 20°, 30°, 40°, 45°, 50°, 60°, 70°, 80°, or more. The relative orientations of second signal electrodes can be different in different embodiments. For example, at least two (e.g., 2, 3, 4, 5, 6, 7, 8, 9, 10, or more, such as all) second signal electrodes (or portions of second signal electrodes) of the plurality of second signal electrodes can be parallel (or perpendicular) to each other (or to one another). For example, the relative orientation (or angle) of 2 (or 2 or more, e.g., 2, 3, 4, 5, 6, 7, 8, 9, 10, or more, such as all) second signal electrodes (or portions of second signal electrodes) can be, or be about, 5°, 10°, 20°, 30°, 40°, 45°, 50°, 60°, 70°, 80°, or more The relative orientation of a first signal electrode and a second signal electrode can be different in different embodiments. For example, at least one first signal electrode of the plurality of first signal electrodes and at least one second signal electrode of the plurality of second signal electrodes can be perpendicular to each other. For example, at least one first signal electrode of the plurality of first signal electrodes and at least one second signal electrode of the plurality of second signal electrodes can be parallel to each other. For example, the relative orientation (or angle) of at least one first signal electrode of the plurality of first signal electrodes and at least one second signal electrode of the plurality of second signal electrodes can be, or be about, 5°, 10°, 20°, 30°, 40°, 45°, 50°, 60°, 70°, 80°, or more. In some embodiments, different first signal electrodes of the plurality of first signal electrodes can be on the bottoms of the microwells in different rows of the microwell arrays. Surfaces of different second signal electrodes of the plurality of second signal electrodes can be on the bottoms of the microwells in different rows of the microwell arrays. Surfaces of different first signal electrodes of the plurality of first signal electrodes can be on the bottoms of the microwells in different columns of the microwell arrays. Surfaces of different second signal electrodes of the plurality of second signal electrodes can be on the bottoms of the microwells in different columns of the microwell arrays. In some embodiments, surfaces of different first signal electrodes of the plurality of first signal electrodes can be on the bottoms of different microwells of the plurality of microwells. Surfaces of different second signal electrodes of the plurality of second signal electrodes can be on the bottoms of different microwells of the plurality of microwells. In some embodiments, a surface of the ground electrode is on a bottom of each microwell of the plurality of microwells.

In some embodiments, the space between the first signal electrode and the ground electrode is 1 μm to 10 μm. The space between the second signal electrode and the ground electrode can be 1 μm to 10 μm. In some embodiments, a width of the first signal electrode is 5 μm to 100 μm. A width of the second signal electrode can be 5 μm to 100 μm. A width of the ground electrode can be 5 μm to 50 μm. In some embodiments, a thickness of the first signal electrode can be 0.1 μm to 1 μm. A thickness of the second signal electrode can be 0.1 μm to 1 μm. A thickness of the ground electrode can be 0.1 μm to 1 μm.

In some embodiments, a width of a microwell of the plurality of microwells is 10 μm to 200 μm. A length of a microwell of the plurality of microwells can be 10 μm to 200 μm. A depth of a microwell of the plurality of microwells can be 5 μm to 500 μm. In some embodiments, a microwell of the plurality of microwells has a circular, elliptical, square, rectangular, or hexagonal shape. In some embodiments, the microwell array is directly in contact with the plurality of electrodes. In some embodiments, the microwell array is indirectly in contact with the plurality of electrodes. In some embodiments, a material of the microwell array, or a material of one, one or more, or each of the plurality of microwells, comprises a dielectric material. The dielectric material can comprise SU-8.

In some embodiments, the plurality of barcode is attached to the microwell covalently. In some embodiments, the plurality of barcode molecules is attached to the microwell non-covalently. The substrate can comprise a poly(L-lysine) layer. The poly(L-lysine) layer can comprise streptavidin molecules. The plurality of barcode molecules each can comprise a biotin molecule. The plurality of barcode molecules can be attached to the microwell by binding of the biotin molecules to the streptavidin molecules.

In some embodiments, each barcode molecule of the plurality of barcode molecules comprises a primer sequence, a first linker sequence, a second linker sequence, and/or a target binding sequence. A (or each) barcode molecule can comprise an enzyme recognition sequence. A (or each) barcode molecule can comprise a primer sequence. A barcode molecule can comprise a molecular barcode sequence. A (or each) barcode molecule can comprise a first microwell barcode sequence. A (or each) barcode molecule can comprise a first linker sequence. A (or each) barcode molecule can comprise a second linker sequence. Aa (or each) barcode molecule can comprise a second microwell barcode sequence. A (or each) barcode molecule can comprise a target binding sequence. A (or each) barcode molecule of the plurality of barcode molecules can comprise from 5' to 3' a primer sequence, a molecular barcode sequence, a first microwell barcode sequence, a first linker sequence, a second linker sequence, a second microwell barcode sequence, and/or a target binding sequence. A (or each) barcode molecule can comprise an enzyme recognition sequence that is 5' to the primer sequence. The target binding sequence can comprise a poly(dT) sequence. In some embodiments, each barcode molecule of the plurality of barcode molecules comprises a template switching sequence. In some embodiments, each barcode molecule of the plurality of barcode molecules comprises an enzyme recognition sequence. The enzyme recognition sequence can on the 5' end of the barcode molecule and/or is 5' to the primer sequence.

Disclosed herein include kits for nucleic acid sequencing, for example, to determine cell-cell interactions. In some embodiments, a kit for nucleic acid sequence comprises a microfluidic device of the present disclosure. The kit can comprise instructions for using the microfluidic device. Also disclosed herein include systems for nucleic acid sequence, for example, to determine cell-cell interactions. In some embodiments, a system for nucleic acid sequencing comprises: a holder of a microfluidic device of the present disclosure. The system can comprise: an inlet fluidic interface for fluidic communication with the inlet of the microfluidic device. The system can comprise: an outlet fluidic interface for fluidic communication with the outlet of the microfluidic device. The system can comprise: one or more pumps for introducing one or more fluids into the microfluidic device via the inlet fluidic interface and the inlet of the microfluidic device.

Disclosed herein include methods of nucleic acid sequencing. The method can comprise: providing a microfluidic device of the present disclosure. The method can comprise: loading a plurality of first cells in a first loading buffer into the microfluidic device via the inlet of the microfluidic device. The method can comprise: applying a first signal to the first signal electrode and the ground electrode of the microfluidic device. The first signal applied can result in partitioning of single first cells of the plurality of first cells into microwells of the plurality of microwells. The first signal applied can result in trapping of the single first cells in the spaces between the ground electrode and the first signal electrode in the microwells. The method can comprise: loading a plurality of second cells in a second loading buffer into the microfluidic device via the inlet of the microfluidic device. The method can comprise: applying a second signal to the second signal electrode and the ground electrode of the microfluidic device. The second signal applied can result in partitioning of single second cells of the plurality of second cells into microwells of the plurality of microwells. The second signal applied can result in trapping of the single second cells in the spaces between the ground electrode and the second signal electrode in the microwells. The method can comprise: determining an interaction between the first cell and the second cell is of interest in a microwell of the microwells. The method can comprise: identifying the first microwell barcode sequence and the second microwell barcode sequence of the plurality of barcode molecules in the microwell based on a location of the microwell in the plurality of microwells. The method can comprise: barcoding a plurality of target nucleic acids associated with (e.g., from, on the surface of, or binding to the surface of) the first cell and/or the second cell in each of the microwells using the plurality of barcode molecules attached to the microwells to generate a plurality of barcoded nucleic acid molecules. The method can comprise: sequencing barcoded nucleic acids of the plurality of barcoded nucleic acids released from (thus not attached to) each of the microwells, or any products thereof, to obtain nucleic acid sequences of the plurality of barcoded nucleic acids. The method can comprise: determining the nucleic acid sequences of the plurality of barcoded nucleic acids with the first microwell barcode sequence and the second microwell barcode sequence identified.

In some embodiments, a conductivity of the first loading buffer is 10 µS/m to 1 S/m. A conductivity of the second loading buffer can be 10 µS/m to 1 S/m. In some embodiments, a conductivity of the first loading buffer is lower than a conductivity of the second loading buffer. In some embodiments, a conductivity of the first loading buffer is higher than a conductivity of the second loading buffer. In some embodiments, the first loading buffer and the second loading buffer are identical. In some embodiments, the first loading buffer and the second loading buffer are different.

In some embodiments, a size of a first cell of the plurality of first cells, or an average size of the plurality of first cells is 5 µm to 50 µm. A size of a second cell of the plurality of second cells, or an average size of the plurality of second cells can be 5 µm to 50 µm.

In some embodiments, the first signal comprises a sinusoidal wave, a square wave, a triangle wave, or a combination thereof. A voltage of the first signal can be 1 V to 50 V. A frequency of the first signal can be 10 kHz to 100 MHz. In some embodiments, the second signal can comprise a sinusoidal wave, a square wave, a triangle wave, or a combination thereof. A voltage of the second signal can be 1 V to 50 V. A frequency of the second signal can be 10 kHz to 100 MHz. In some embodiments, the first signal and the second signal are identical. In some embodiments, the first signal and the second signal are different.

In some embodiments, the single first cells are physically trapped in the spaces between the ground electrode and the first signal electrode in the microwells and/or are trapped in the spaces between the ground electrode and the first signal electrode in the microwells by the first signal. The single second cells can be physically trapped in the spaces between the ground electrode and the second signal electrode in the microwells and/or are trapped in the spaces between the ground electrode and the second signal electrode in the microwells by the second signal.

In some embodiments, the method comprises: removing first cells of the plurality of first cells in the microfluidic device that are not trapped in the spaces between the ground electrode and the first signal electrode in the microwells from the microfluidic device. A first cell not trapped in the spaces between the ground electrode and the first signal electrode can be inside a microwell. For example, a first cell of the first cells not trapped in the spaces between the ground electrode and the first signal electrode can be in a space between the second signal electrode and the ground electrode of the microwell. As another example, a first cell of the first cells not trapped in the spaces between the ground electrode and the first signal electrode can be on a surface of the bottom of a microwell (e.g., on the first signal electrode, on the second signal electrode, on the ground electrode, or on the bottom surface of the microwell other than any of the plurality of electrodes). A first cell not trapped in the spaces between the ground electrode and the first signal electrode of a microwell can be outside all microwells. For example, a first cell of the first cells not trapped in the spaces between the ground electrode and the first signal electrode can be between two microwells of the plurality of microwells, such as on a surface between two microwells of the plurality of microwells. Removing the first cells that are not trapped in the spaces between the ground electrode and the first signal electrode from the microfluidic device can comprise introducing a first washing buffer into the microfluidic device via the inlet of the microfluidic device and out of the microfluidic device via the outlet of the microfluidic device, thereby washing away the first cells that are not trapped in the spaces between the ground electrode and the first signal electrode in the microwells from the microfluidic device. Introducing the first washing buffer can comprise injecting the first washing buffer into the inlet of the microfluidic device. The first loading buffer and the first washing buffer can be identical.

In some embodiments, the method comprises: removing second cells of the plurality of second cells in the microfluidic device that are not trapped in the spaces between the ground electrode and the second signal electrode in the microwells from the microfluidic device. A second cell of the second cells not trapped in the spaces between the ground electrode and the second signal electrode of a microwell can be inside a microwell. For example, a second cell of the second cells not trapped in the spaces between the ground electrode and the second signal electrode can be in the space between the first signal electrode and the ground electrode of a microwell. As another example, a second cell of the second cells not trapped in the spaces between the ground electrode and the second signal electrode can be on a surface of the bottom of a microwell (e.g., on the first signal electrode, on the second signal electrode, on the ground electrode, or on the bottom surface of the microwell other than any of the plurality of electrodes). A second cell of the second cells not trapped in the space between the ground electrode and the second signal electrode can be outside all microwells. A second cell of the second cells not trapped in the spaces between the ground electrode and the second signal electrode can be on between two microwells of the plurality of microwells, for example, on a surface between two microwells of the plurality of microwells. Removing the second cells that are not trapped in the spaces between the ground electrode and the second signal electrode from the microfluidic device can comprise introducing a second washing buffer into the microfluidic device via the inlet of the microfluidic device and out of the microfluidic device via the outlet of the microfluidic device, thereby washing away the second cells that are not trapped in the spaces between the ground electrode and the second signal electrode in the microwells from the microfluidic device. Introducing the second washing buffer can comprise injecting the second washing buffer into the inlet of the microfluidic device. The second loading buffer and the second washing buffer can be identical.

In some embodiments, the first signal is also applied after the single first cells are trapped in the spaces between the ground electrode and the first signal electrode in the microwells, e.g., when removing the first cells that are not trapped in the spaces between the ground electrode and the first signal electrode, when loading the plurality of second cells, when applying the second signal, and/or when removing the second cells that are not trapped in the spaces between the ground electrode and the second signal electrode. The first signal can be continuously applied when partitioning the single first cells, when removing the first cells that are not trapped in the space between the ground electrode and the first signal electrode, when loading the plurality of second cells, when applying the second signal, and/or when removing the second cells that are not trapped in the spaces between the ground electrode and the second signal electrode.

In some embodiments, at least 50% of the plurality of microwells each comprises a single first cell (or more than one single first cell, such as 2, 3, 4, 5, 6, 7, 8, 9, 10, 15, 20, 30, 40, 50, or more first cells). At least 50% of the plurality of microwells each can comprise a single second cell (or more than one single second cell, such as 2, 3, 4, 5, 6, 7, 8, 9, 10, 15, 20, 30, 40, 50, or more second cells). At least 50% of the plurality of microwells each can comprise a single first cell and a single second cell. At least 50% of the plurality of microwells each can comprise a single first cell and more than one second cell (such as 2, 3, 4, 5, 6, 7, 8, 9, 10, 15, 20, 30, 40, 50, or more second cells). At least 50% of the plurality of microwells each can comprise more than one first cell (such as 2, 3, 4, 5, 6, 7, 8, 9, 10, 15, 20, 30, 40, 50, or more first cells) and a single second cell. The first cell and the second cell can be the same. The first cell and the second cell can have a similar size. The first cell and the second cell can be different. The first cell and the second cell can have different sizes (e.g., the first cell is bigger than the second cell, or the first cell is smaller than the second cell). The first cell can be a B cell. The second cell can be a T cell. Alternatively, the first cell can be a T cell. The second cell can be a B cell.

In some embodiments, the method comprises: capturing an image of the microwell. Determining the interaction between the first cell and the second cell is of interest in the microwell of the microwells can comprise: determining the interaction between the first cell and the second cell is of interest in the microwell of the microwells using the image.

In some embodiments, the interaction between the first cell and the second cell in the microwell is determined to be of interest before (i) the plurality of target nucleic acids associated with the first cell and/or the second cell in each of the microwells are barcoded and/or (ii) before the barcoded nucleic acids of the plurality of barcoded nucleic acids released from (thus not attached to) each of the microwells, or any products thereof, are sequenced. The first microwell barcode sequence and the second microwell barcode sequence of the plurality of barcode molecules in the microwell can be identified before (i) the plurality of target nucleic acids associated with the first cell and/or the second cell in each of the microwells are barcoded and/or (ii) before the barcoded nucleic acids of the plurality of barcoded nucleic acids released from (thus not attached to) each of the microwells, or any products thereof, are sequenced.

In some embodiments, the interaction between the first cell and the second cell in the microwell is determined to be of interest (i) after the plurality of target nucleic acids associated with the first cell and/or the second cell in each of the microwells are barcoded and/or (ii) after the barcoded nucleic acids of the plurality of barcoded nucleic acids not attached to (e.g., released from) each of the microwells, or any products thereof, are sequenced. For example, one or more images of the first cell and the second cell in a microwell can be captured. The images can be analyzed to determine the interaction between the first cell and the second cell is of interest after the plurality of target nucleic acids associated with the first cell and/or the second cell are barcoded and/or after the barcoded nucleic acids of the plurality of barcoded nucleic acids not attached to the microwell, or any products thereof, are sequenced. In some embodiments, the first microwell barcode sequence and the second microwell barcode sequence of the plurality of barcode molecules in the microwell are identified (i) after the plurality of target nucleic acids associated with the first cell and/or the second cell in each of the microwells are barcoded and/or (ii) after the barcoded nucleic acids of the plurality of barcoded nucleic acids released from (thus not attached to) each of the microwells, or any products thereof, are sequenced. For example, one or more images of the first cell and the second cell in a microwell can be captured. The images can be analyzed to determine the interaction between the first cell and the second cell is of interest after the plurality of target nucleic acids associated with the first cell and/or the second cell are barcoded and/or after the barcoded nucleic acids of the plurality of barcoded nucleic acids not attached to the microwell, or any products thereof, are sequenced. Subsequently, the first microwell barcode sequence and the second microwell barcode sequence of the microwell can be determined.

In some embodiments, identifying the first microwell barcode sequence and the second microwell barcode sequence comprises: identifying the first microwell barcode sequence and the second microwell barcode sequence of the plurality of barcode molecules in the microwell based on a location in a first group (e.g., a row location) and a location in a second group (e.g., a column location) of the microwell in the plurality of microwells.

In some embodiments, the plurality of barcoded nucleic acids comprises a plurality of double-stranded barcoded nucleic acids each comprising a first barcoded nucleic acid attached to the microwell and a second barcoded nucleic acid complementary to the first barcoded nucleic acid. The first barcoded nucleic acid can hybridize to the second barcoded nucleic acid. The method can comprise: denaturing the plurality of double-stranded barcoded nucleic acids to generate single-stranded first barcoded nucleic acids attached to the microwell and single-stranded second barcoded nucleic acids released from (thus not attached to) the microwell. The method can comprise: collecting the single-stranded second barcoded nucleic acids released from (thus not attached to) the microwell via the outlet of the microfluidic device. Sequencing the barcoded nucleic acids release from (so not attached to) each of the microwells, or any product thereof, can comprise: sequencing the collected single-stranded second barcoded nucleic acids released from (thus not attached to) the microwell, or any products thereof, to obtain nucleic acid sequences of the plurality of barcoded nucleic acids.

In some embodiments, the plurality of barcoded nucleic acids comprises a plurality of single-stranded or partially single-stranded barcoded nucleic acids. The method can comprise: detaching (or releasing) the plurality of barcoded nucleic acid molecules from the microwell. Detaching the plurality of barcoded nucleic acid molecules from the microwell can comprise detaching the plurality of barcoded nucleic acid molecules from the microwell with thermal dissociation, thermal cleavage, chemical dissociation, chemical cleavage, enzymatic cleavage, photocleavage, or a combination thereof. In some embodiments, detaching the plurality of barcoded nucleic acid molecules comprises: hybridizing a single-stranded recognition oligonucleotide to (i) the restriction enzyme recognition sequence, (ii) the restriction enzyme recognition sequence and the primer sequence, or (iii) the restriction enzyme recognition sequence and a portion of the primer sequence, of each of the plurality of barcoded nucleic acids to generate a partially double-stranded barcoded nucleic acid. Detaching the plurality of barcoded nucleic acid molecules can comprise: digesting the partially double-stranded barcoded nucleic acids generated at the enzyme recognition sequence using a restriction enzyme capable of digesting the restriction enzyme recognition sequence to detach (or release) the plurality of barcoded nucleic acid molecules from the microwell. In some embodiments, detaching the plurality of barcoded nucleic acid molecules can comprise: digesting the plurality of single-stranded or partially single-stranded barcoded nucleic acids at the enzyme recognition sequences using an endonuclease to detach (or release) the plurality of barcoded nucleic acid molecules from the microwell. In some embodiments, the thermal dissociation comprises heating the microfluidic device to 90° C. to denature the streptavidin molecules and/or to degrade the poly(L-lysine) layer to detach (or release) the plurality of barcoded nucleic acid molecules from the microwell. In some embodiments, the chemical dissociation comprises: contacting the streptavidin molecules with a chemical (e.g., formamide) to dissociate the binding of the biotin molecules and the streptavidin molecules to detach (or release) the plurality of barcoded nucleic acid molecules from the microwell.

Disclosed herein include embodiments of a method of making a microfluidic device. In some embodiments, a method of making a microfluidic device comprises: (a) generating a plurality of electrodes on a substrate and comprising a ground electrode, a first signal electrode, and a second signal electrode. The method can comprise: (b) generating a microwell array on the substrate and the plurality of electrodes and comprising a plurality of microwells. The method can comprise: (c1) providing a first patterning device comprising a plurality of first parallel flow channels with a first pattern. The method can comprise: (c2) aligning the first patterning device with the microwell array such that microwells of the microwell array in a first group (e.g., microwells in a row) are aligned to one of the plurality of first parallel flow channels. The method can comprise: (c3) introducing into each of the plurality of first parallel flow channels a solution comprising a plurality of first barcode molecules. The plurality of first barcode molecules in one solution can comprise an identical first microwell barcode sequence. The pluralities of first barcode molecules in different solutions can comprise different first microwell barcode sequences. First barcode molecules of the plurality of first barcode molecules can be attached to the microwells of the microwell array in the first group aligned to the first parallel flow channel. The method can comprise: (d1) providing a second patterning device comprising a plurality of second parallel flow channels with a second pattern. The method can comprise: (d2) aligning the second patterning device with the microwell array such that microwells of the microwell array in a second group (e.g., microwells in a column) are aligned to one of the plurality of second parallel flow channels. The method can comprise: (d3) introducing into each of the second parallel flow channels a solution comprising a plurality of second barcode molecules, wherein the plurality of second barcode molecules in one solution comprises an identical second microwell barcode sequence. The pluralities of second barcode molecules in different solutions can comprise different second microwell barcode sequences. Second barcode molecules of the plurality of second barcode molecules can be attached to the first barcode molecules attached to the microwells of the microwell array in the first group aligned to the second parallel flow channel.

In some embodiments, the first microwell barcode sequences of the pluralities of barcode molecules are identical in microwells in each first group (e.g., each row) of the microwell array and different in microwells in different first groups (e.g., different rows) of the microwell array. Second microwell barcode sequences of the pluralities of barcode molecules can be identical in microwells in each second group (e.g., each column) of the microwell array and different in microwells in different second groups (e.g., different columns) of the microwell array.

In some embodiments, the solution comprising the plurality of second barcode molecules comprises linker molecules. The linker molecules can comprise an identical sequence. The plurality of second barcode molecules can be hybridized to the linker molecules in the solution. In some embodiments, the solution comprising the plurality of first barcode molecules comprises linker molecules comprising an identical sequence. The plurality of first barcode molecules can be hybridized to the linker molecules in the solution. For example, a second barcode molecule can be complementary to a part of the linker and hybridize to that part of the linker, and a first barcode molecule can be complementary to another part of the linker and hybridize to this other part of the linker.

In some embodiments, the microwells of the plurality of microwells in a first group comprise microwells of a row of the plurality of microwells. The microwells of the plurality of microwells in a second group comprise microwells of a column of the plurality of microwells. In some embodiments, the microwells of the plurality of microwells in a first group comprise microwells of a column of the plurality of microwells. The microwells of the plurality of microwells in a second group can comprise microwells of a row of the plurality of microwells.

In some embodiments, a direction of the first parallel flow channel, when the first patterning device is aligned with the microwell array, and a direction of the second parallel flow channel, when the second patterning device is aligned with the microwell array is perpendicular to each other.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 1E shows non-limiting exemplary dimensions of the electrodes and microwells. The illustrative microwells are elliptical in shape.

FIG. 2A shows a flow channel A pattern and FIG. 2B shows a flow channel B pattern.

FIG. 3A. Flow channels A is aligned with the microwell array with each flow channel covering one row of the microwell array. B sequences are applied to each flow channel to bind to the surface of microwell array. FIG. 3B. After removing the flow channels A, each row of the microwell array is coated with a unique B sequence. FIG. 3C. Flow channels B is aligned with the microwell array with each flow channel covering one column of the microwell array. Modified A sequences are applied to each flow channel to ligated to the B sequences already bonded to the surface of microwell array. FIG. 3D. After removing the flow channels B, each microwell of the microwell array is coated with a specific barcode sequence.

FIG. 5A shows a microfluidic device with pre-patterned microwell arrays on the substrate and two sets of electrodes under each microwell. FIG. 5B shows loading type I cells and turning on the first set of electrodes to capture type I cells. FIG. 5C shows loading type II cells and turning on the second set of electrodes to capture type II cells, as well as co-culturing the cell pairs and recording the microwell locations of cells with desirable functionality. FIG. 5D shows lysing the cells and capturing the released biological information by the pre-patterned oligonucleotides in the microwell. FIG. 5E shows releasing the captured biological information with specific barcode sequences and collecting them for sequencing.

FIG. 10A shows the violin plot of the gene number, and FIG. 10B shows the spatial profile of the gene number corresponding to cell barcodes. FIG. 10C shows the violin plot of the UMI number, and FIG. 10D shows the spatial profile of the UMI number corresponding to cell barcodes.

Figure 1A:
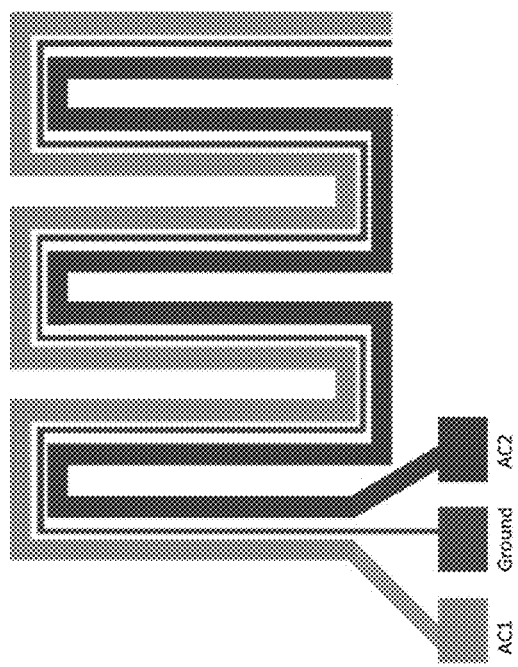
FIGS. 1A-1E show a schematic of the cross-section view and top view of a glass wafer in a non-limiting embodiment of a microfluidic device. Electrodes are formed on the glass wafer by lift-off process (FIG. 1A: cross-section view, and FIG. 1B: top view (substrate not shown)). Microwell array is formed by lithography and aligned with the electrodes (FIG. 1C: cross-section view (showing microwells), and FIG. 1D: top view (showing microwells that are elliptical in shape; substrate not shown)).

Throughout the drawings, reference numbers may be re-used to indicate correspondence between referenced elements. The drawings are provided to illustrate example embodiments described herein and are not intended to limit the scope of the disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

All patents, published patent applications, other publications, and sequences from GenBank, and other databases referred to herein are incorporated by reference in their entirety with respect to the related technology.

Biological events usually involve cell-cell interactions (e.g., immune response). Immunotherapy depends the activating or suppressing of immune systems, for example using immune cells to attack or to be silent to target cells, to treat patients. However, due to the cell heterogeneity, even the cells that came from the same source, went through the same desirable engineering or bio-modification process, and/or presented the expected biological markers, can have distinct functionality and result in different therapeutic outcomes in patients. Therefore, for cell therapeutic drug discovery, it is advantageous to screen individual cells with specific functionality, besides biological marker development and genetic information discovery. Technologies have been developed to investigate single cell biologic marker development, genetic information, and functionality individually. Flow cytometry can distinguish and sort single cells with different biomarkers based on different fluorescent signals. Single cell sequencing technology has been used to interrogate the genetic information of single cells. Microwell array, microfluidic traps, and microdroplets have been used to evaluate the cytotoxicity of single cells by pairing attack cells with target cells. But few technologies can correlate the measured biomarkers and genetic information with cells having specific functionality, especially in a high throughput. There is a need for new technology allowing high throughput analysis for specific cell functionality and cell-cell interactions.

Disclosed herein include embodiments of a microfluidic device. In some embodiments, a microfluidic device comprises a substrate. The microfluidic device can comprise a plurality of electrodes on the substrate. The plurality of electrodes can comprise a ground electrode, a first signal electrode, and a second signal electrode. The microfluidic device can comprise a microwell array on the substrate and the plurality of electrodes. The microfluidic device can comprise a plurality of microwells. Each of the plurality of microwells can comprise a plurality of barcode molecules attached thereto. Each barcode molecule of the plurality of barcode molecules can comprise a molecular barcode sequence, a first microwell barcode sequence, and/or a second microwell barcode sequence. First microwell barcode sequences of the pluralities of barcode molecules can be predetermined. First microwell barcode sequences of the pluralities of barcode molecules can be identical in each first group of microwells (e.g., microwells in each row) of the microwell array. First microwell barcode sequences of the pluralities of barcode molecules can be different in microwells in different first groups (e.g., different rows) of the microwell array. Second microwell barcode sequences of the pluralities of barcode molecules can be predetermined. Second microwell barcode sequences of the pluralities of barcode molecules can be identical in microwells in each second group of microwells (e.g., microwells in each column) of the microwell array. Second microwell barcode sequences of the pluralities of barcode molecules can be different in microwells in different second groups (e.g., different columns) of the microwell array. A surface of each of the plurality of electrodes can be on a bottom of at least one microwell of the plurality of microwells. A space between the first signal electrode and the ground electrode in the microwell can be capable of trapping a first cell when a first signal is applied to the first signal electrode and the ground electrode. A space between the second signal electrode and the ground electrode in a microwell of the plurality of microwells can be capable of trapping a second cell when a second signal is applied to the second signal electrode and the ground electrode. The microfluidic device can comprise a flow channel. The flow channel can comprise an inlet and an outlet. The inlet and the outlet can be in fluidic communication with the microwell array.

Disclosed herein include kits for nucleic acid sequencing, for example, to determine cell-cell interactions. In some embodiments, a kit for nucleic acid sequence comprises a microfluidic device of the present disclosure. The kit can comprise instructions for using the microfluidic device. Also disclosed herein include systems for nucleic acid sequence, for example, to determine cell-cell interactions. In some embodiments, a system for nucleic acid sequencing comprises: a holder of a microfluidic device of the present disclosure. The system can comprise: an inlet fluidic interface in fluidic communication with the inlet of the microfluidic device. The system can comprise: an outlet fluidic interface in fluidic communication with the outlet of the microfluidic device. The system can comprise: one or more pumps for introducing one or more fluids into the microfluidic device via the inlet fluidic interface and the inlet of the microfluidic device.

Disclosed herein include methods of nucleic acid sequencing. The method can comprise: providing a microfluidic device of the present disclosure. The method can comprise: loading a plurality of first cells in a first loading buffer into the microfluidic device via the inlet of the microfluidic device. The method can comprise: applying a first signal to the first signal electrode and the ground electrode of the microfluidic device. The first signal applied can result in partitioning of single first cells of the plurality of first cells into microwells of the plurality of microwells. The first signal applied can result in trapping of the single first cells in the spaces between the ground electrode and the first signal electrode in the microwells. The method can comprise: loading a plurality of second cells in a second loading buffer into the microfluidic device via the inlet of the microfluidic device. The method can comprise: applying a second signal to the second signal electrode and the ground electrode of the microfluidic device. The second signal applied can result in partitioning of single second cells of the plurality of second cells into microwells of the plurality of microwells. The second signal applied can result in trapping of the single second cells in the spaces between the ground electrode and the second signal electrode in the microwells. The method can comprise: determining an interaction between the first cell and the second cell is of interest in a microwell of the microwells. The method can comprise: identifying the first microwell barcode sequence and the second microwell barcode sequence of the plurality of barcode molecules in the microwell based on a location of the microwell in the plurality of microwells. The method can comprise: barcoding a plurality of target nucleic acids associated with (e.g., from, on the surface of, binding to the surface of) the first cell and/or the second cell in each of the microwells using the plurality of barcode molecules attached to the microwell to generate a plurality of barcoded nucleic acid molecules. The method can comprise: sequencing barcoded nucleic acids of the plurality of barcoded nucleic acids released from (thus not attached to) each of the microwells, or any products thereof, to obtain nucleic acid sequences of the plurality of barcoded nucleic acids. The method can comprise: determining the nucleic acid sequences of the plurality of barcoded nucleic acids with the first microwell barcode sequence and the second microwell barcode sequence identified.

Disclosed herein include embodiments of a method of making a microfluidic device. In some embodiments, a method of making a microfluidic device comprises: (a) generating a plurality of electrodes on a substrate and comprising a ground electrode, a first signal electrode, and a second signal electrode. The method can comprise: (b) generating a microwell array on the substrate and the plurality of electrodes and comprising a plurality of microwells. The method can comprise: (c1) providing a first patterning device comprising a plurality of first parallel flow channels with a first pattern. The method can comprise: (c2) aligning the first patterning device with the microwell array such that microwells of the microwell array in a first group (e.g., microwells in a row) are aligned to one of the plurality of first parallel flow channels. The method can comprise: (c3) introducing into each of the plurality of first parallel flow channels a solution comprising a plurality of first barcode molecules. The plurality of first barcode molecules in one solution can comprise an identical first microwell barcode sequence. The pluralities of first barcode molecules in different solutions can comprise different first microwell barcode sequences. First barcode molecules of the plurality of first barcode molecules can be attached to the microwells of the microwell array in the first group aligned to the first parallel flow channel. The method can comprise: (d1) providing a second patterning device comprising a plurality of second parallel flow channels with a second pattern. The method can comprise: (d2) aligning the second patterning device with the microwell array such that microwells of the microwell array in a second group (e.g., microwells in a column) are aligned to one of the plurality of second parallel flow channels. The method can comprise: (d3) introducing into each of the second parallel flow channels a solution comprising a plurality of second barcode molecules, wherein the plurality of second barcode molecules in one solution comprises an identical second microwell barcode sequence. The pluralities of second barcode molecules in different solutions can comprise different second microwell barcode sequences. Second barcode molecules of the plurality of second barcode molecules can be attached to the first barcode molecules attached to the microwells of the microwell array in the first group aligned to the second parallel flow channel.

Dielectrophoresis Microfluidic Device

Disclosed herein include systems, devices, kits and methods for high throughput capturing interested single cell pairs by dielectrophoresis microfluidic devices, monitoring the cell functionality, and performing genetic information analysis. The systems, devices, kits, and methods can be used to screen immune cells with specific functions and obtain their biological information. The systems, methods, kits, and devices can be used to characterize functionality of cells for cell therapeutic drug discovery. In contrast to current technologies, the systems, devices, kits and methods disclosed herein can be used to characterize cell biological markers, genetic information, and functionality at the same time and to obtain genetic information from cells with specific functionality.

Figure 2A:
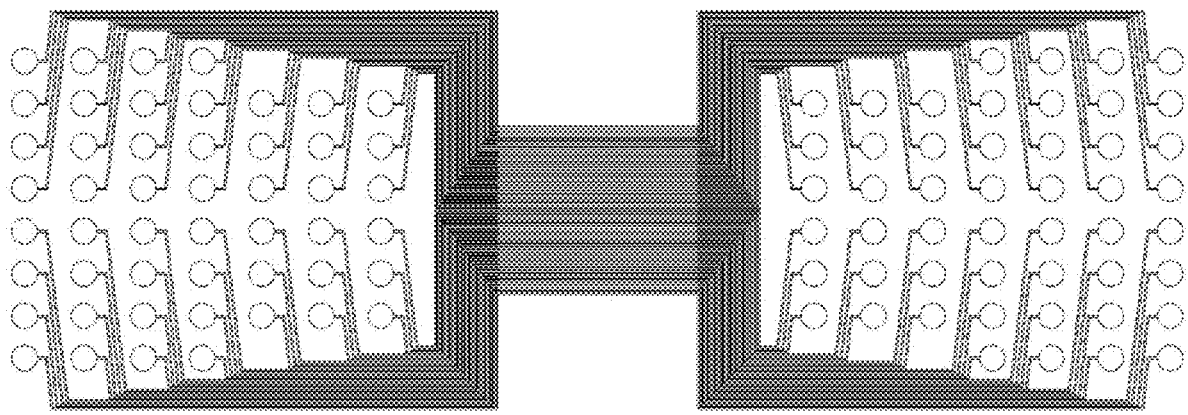
FIGS. 2A-2B show a flow channel pattern in a non-limiting embodiment of the device disclosed herein, respectively.
Figure 3A:
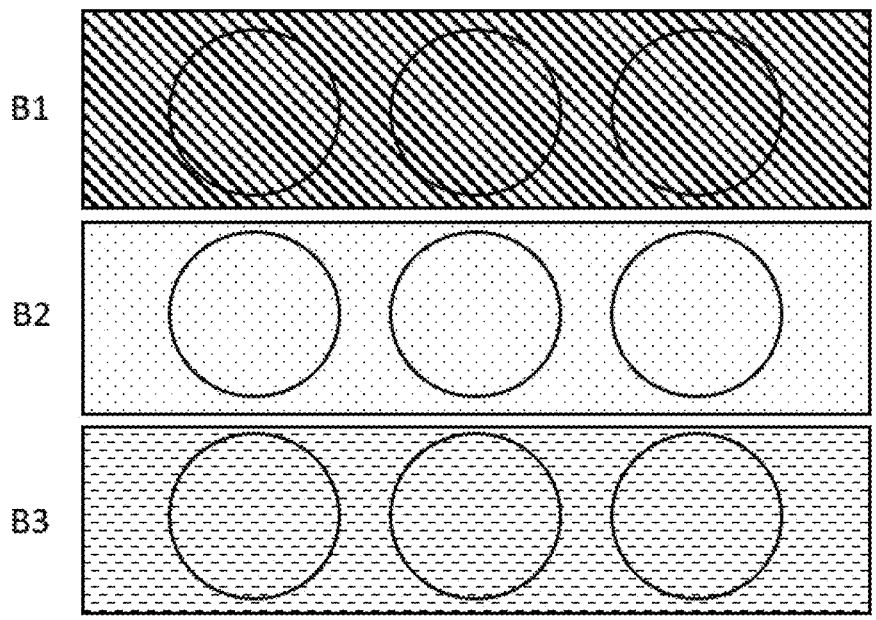
FIGS. 3A-3D illustrate in a non-limiting exemplary process of barcode patterning.
Figure 3B:
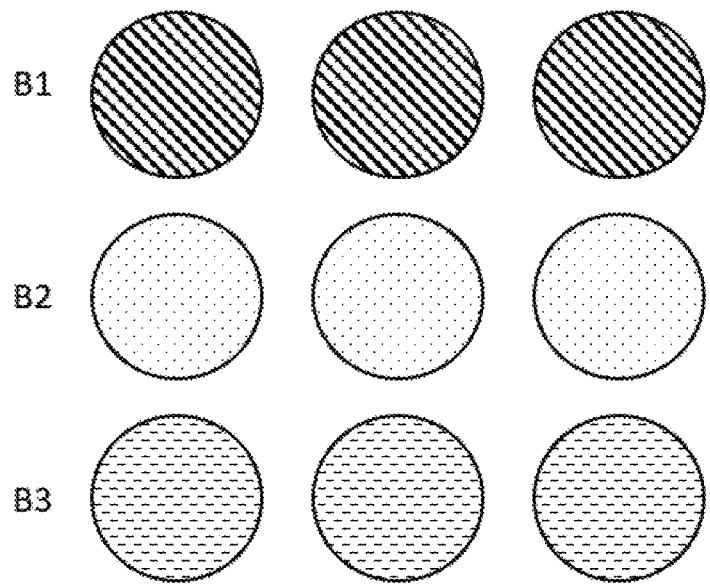
Figure 3C:
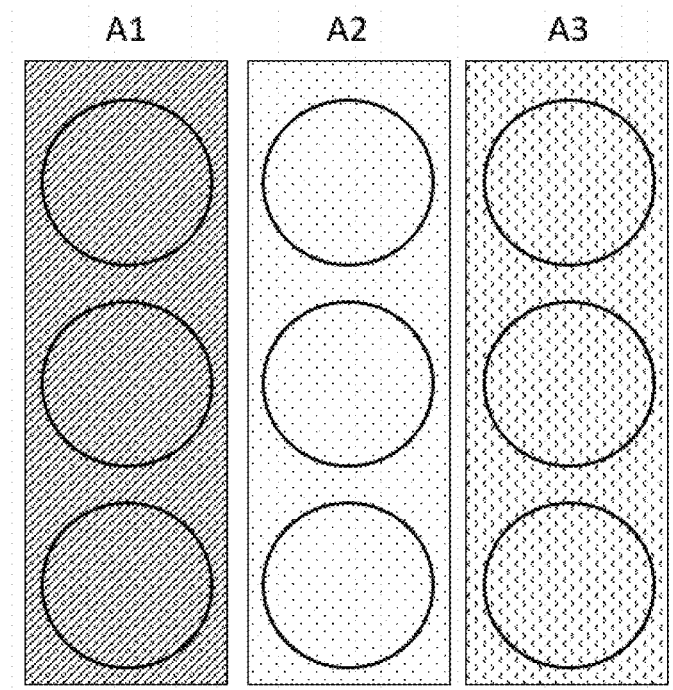
Figure 3D:
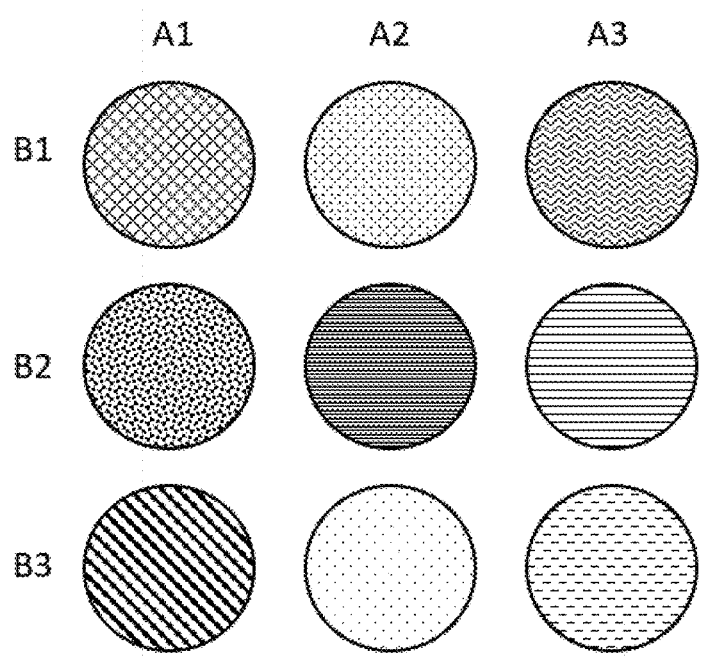
Figure 4:
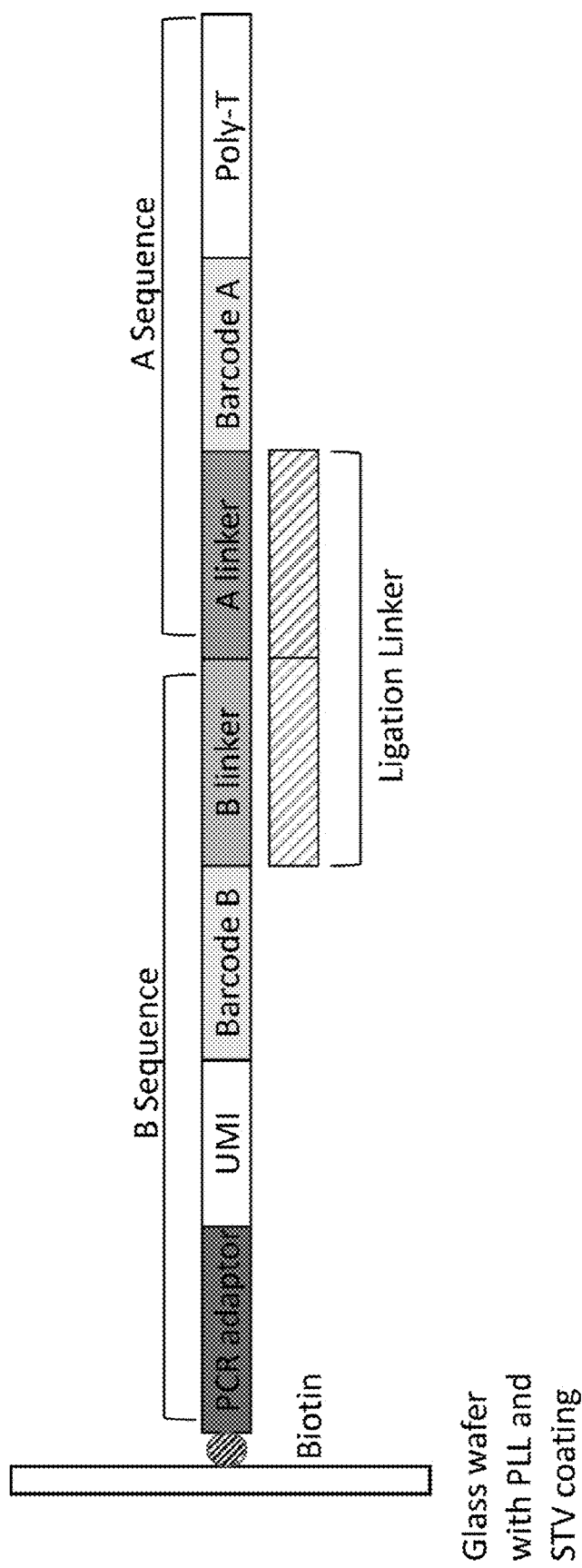
FIG. 4 is a schematic diagram showing a non-limiting example of a barcode molecule.

Described herein include high throughput systems, devices, kits and methods for investigating single cell functionality and/or correlating it with cell genetic information. In the systems, devices, kits and methods, pre-patterned dielectrophoresis microfluidic devices can be used to capture interested cells and extract the genetic information from these interested cells. For example, a dielectrophoresis microfluidic device (see FIGS. 1A-1E and accompanying description) can have a microwell array on its substrate, and the microwell array on the device substrate can have pre-patterned oligonucleotide sequences used as specific cell barcodes (also referred to herein as combinatorial microwell barcodes) or microwell indicators to differentiate each microwell and/or cells in microwells accordingly. The oligonucleotide sequences can be designed and delivered to the microwell array using patterning devices (see FIGS. 2A-2B and accompanying description) in a way that each microwell has a unique and known oligonucleotide sequence (see FIGS. 3A-3D and accompanying description). FIG. 4 shows an exemplary oligonucleotide sequence. In some embodiments, at the bottom of each microwell, there are two sets of electrodes controlled separately to capture different types of cells (see FIGS. 1A-1E and accompanying description). The electrode geometry can be configured to capture the cells with desirable sizes. The captured cell pairs can be monitored during co-culture to characterize the functionality of attack cells.

The systems, devices, kits and methods disclosed herein can comprise the use of dielectrophoresis microfluidic devices to trap interested cell pairs for investigation. The systems, devices, kits and methods disclosed herein can be used, for example, to investigate single T cell, B cell, NK cell, and stem cell functionality, and for high throughput single cell pair analysis. In some embodiments, pre-patterned substrate can be used to add specific and unique microwell barcodes to interested cells. In some embodiments, pre-designed and known microwell barcodes can be correlated to retrieve genetic information of specific cells.

Microfluidic Device

Figure 1B:
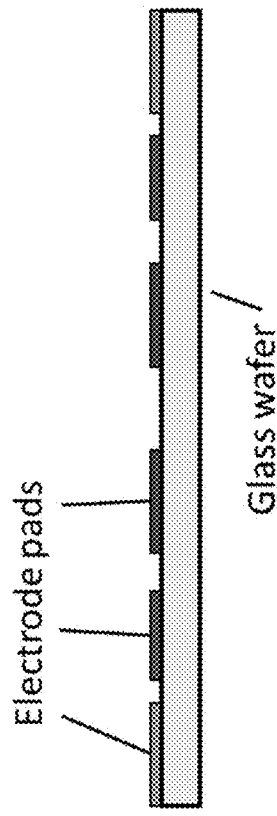
Figure 1C:
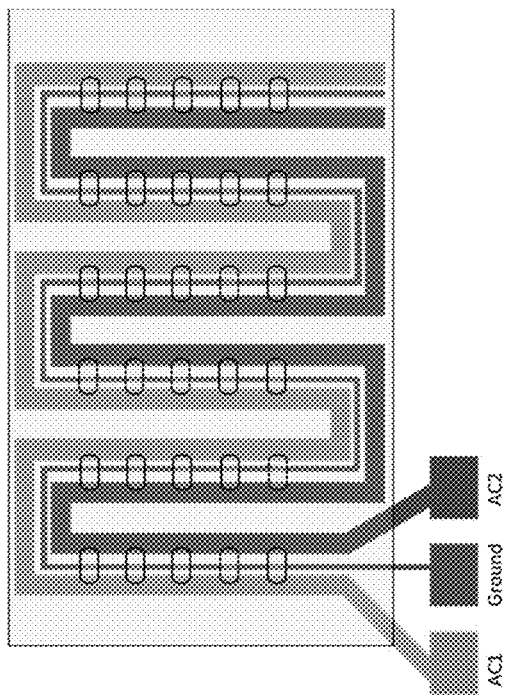
Figure 1D:
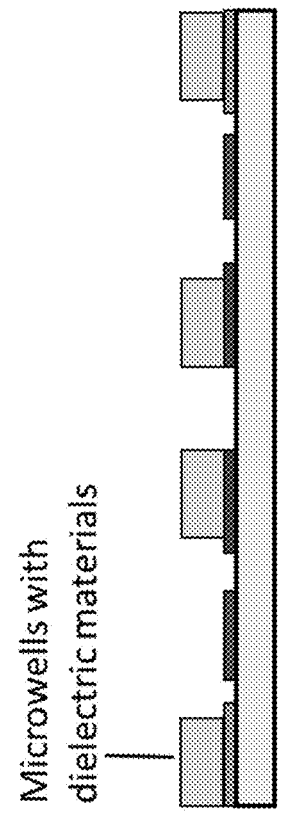
Figure 1E:
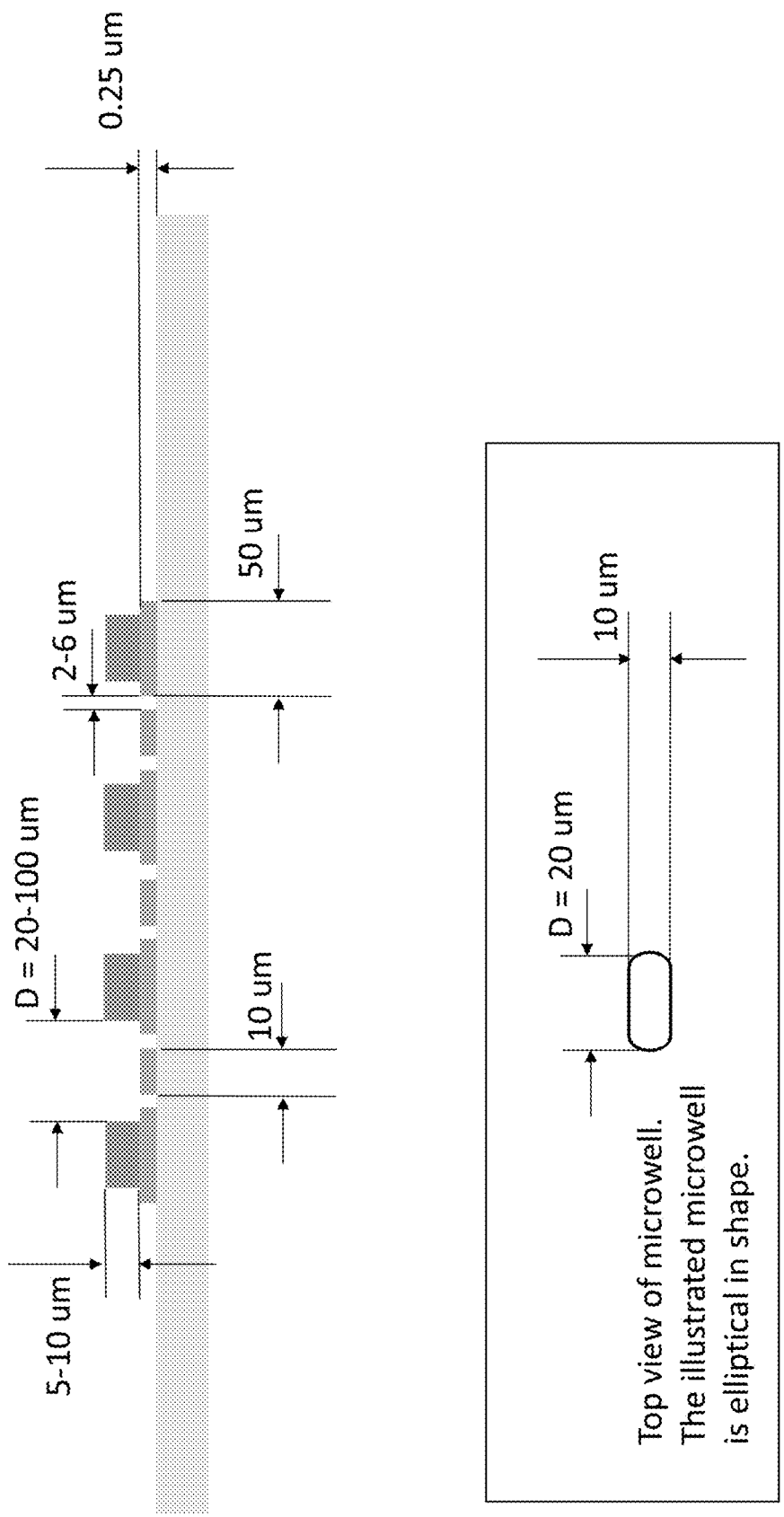

Disclosed herein include embodiments of a microfluidic device (e.g., a dielectrophoresis microfluidic device). In some embodiments, a microfluidic device comprises a substrate (such as the glass wafer shown in FIGS. 1A-1D). The microfluidic device can comprise a plurality of electrodes on the substrate. The plurality of electrodes can comprise a ground electrode, a first signal electrode, and a second signal electrode (such as the ground electrode, AC1 electrode, and AC2 electrode shown in FIGS. 1B and 1D). A first signal applied to the first signal electrode and the ground electrode can result in a first dielectric force. A second signal applied to the second signal electrode and the ground electrode can result in a second dielectric force. The microfluidic device can comprise a microwell array (see FIGS. 1C-1D for an example). The microwell array can comprise a plurality of microwells. The microwell array (or the microwells of the microwell array) can comprise a dielectric material. In the embodiment shown in FIGS. 1C-1D, the microwells are arranged into rows and columns. The microwell array can be on the substrate (see FIGS. 1C-1D for an example). The microwell array can be on the plurality of electrodes (see FIGS. 1C-1D for an example). For example, the microwells can be in contact with the substrate as illustrated in FIG. 1D and with the plurality of electrodes as illustrated in FIGS. 1C-1D. The substate and the plurality of electrodes can be at the bottom of the microwell array. The bottoms of the microwells can be formed by the substrate and the plurality of electrodes.

Electrodes

Figure 5A:
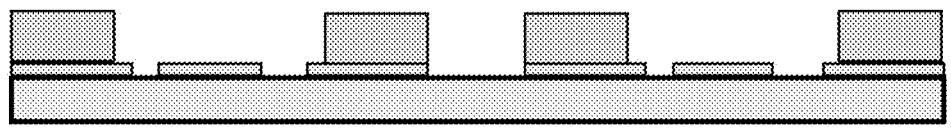
FIGS. 5A-5E show schematic diagrams for a non-limiting workflow for determining cell-cell interaction.
Figure 5B:
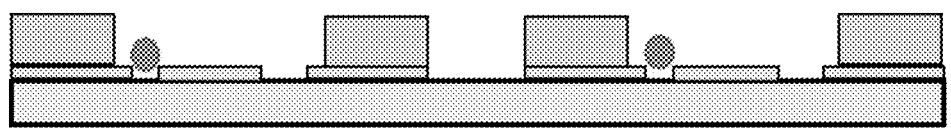
Figure 5C:
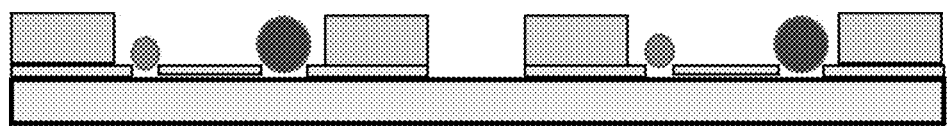

The material of an electrode can comprise copper, nickel, graphite, carbon, titanium, gold, brass, silver, platinum, palladium, mixed mental oxide, zirconium, niobium, or tantalum, or a combination thereof. One or more surfaces (e.g., the top surface and a side surface) of each of the plurality of electrodes can be on (or can be exposed at) a bottom of at least one microwell (or one or more microwells, or each microwell) of the plurality of microwells. For example, the top surface and the side surface of each of the three electrodes shown in FIGS. 1C-1D are on (or exposed at) the bottom of each microwell of the plurality of microwells. In some embodiments, an electrode (or one or more electrodes, or each electrode) can be on the bottom of, of about, of at least, of at least about, at most, or at most about, 1, 2, 3, 4, 5, 6, 7, 8, 9, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, 100000, 200000, 300000, 400000, 500000, 600000, 700000, 800000, 900000, 1000000, 2000000, 3000000, 4000000, 5000000, 6000000, 7000000, 8000000, 9000000, 10000000, 20000000, 30000000, 40000000, 50000000, 60000000, 70000000, 80000000, 90000000, 100000000, 200000000, 300000000, 400000000, 500000000, 600000000, 700000000, 800000000, 900000000, 1000000000, or a number or a range between any two of these values, microwells. A space between the first signal electrode and the ground electrode in the microwell can be capable of trapping a first cell as illustrated in FIG. 5B. The first cell can be trapped in the space between the first signal electrode and the ground electrode when a first signal (e.g., a direct current (DC) or alternating current (AC)) is applied to the first signal electrode and the ground electrode. A space between the second signal electrode and the ground electrode in a microwell of the plurality of microwells can be capable of trapping a second cell as illustrated in FIG. 5C. The second cell can be trapped in the space between the second signal electrode and the ground electrode when a second signal (e.g., a DC or AC signal) is applied to the second signal electrode and the ground electrode. Different signals can be applied to a first signal electrode and a second signal electrode. The same signal can be applied to a first signal electrode and a second signal electrode. The microfluidic device can comprise a flow channel. The microwell array can be in the flow channel. The flow channel can comprise an inlet and an outlet. The inlet and the outlet can be in fluidic communication with the microwell array. For example, when a fluid is injected into the inlet of the microfluidic device, the fluid can enter the flow channel such that the fluid can flow over and onto the microwell array and into the microwells. The fluid can exit the flow channel through the outlet of the microwell device.

Samples (e.g., cells), free reagents, and/or reagents encapsulated in microcapsules can be introduced into the microwells via the inlet. The reagents can comprise restriction enzymes, ligase, polymerase, fluorophores, oligonucleotide barcodes, oligonucleotide probes, adapters, buffers, dNTPs, ddNTPs, and other reagents required for performing the methods described herein. Samples can be introduced into the microwells when, for example, a signal is applied to the first signal electrode and the ground electrode and/or when a signal is applied to the second signal electrode and the ground electrode. Reagents can be flow from the inlet port through a flow channel to deliver to the microwell array, and the waste can be pushed out from the outlet port and removed.

In some embodiments, the microfluidic device includes two signal electrodes. A surface of the first signal electrode is on the bottom (or exposed at the bottom) of one (or one or more, or each) microwell of the plurality of microwells. A surface of the second signal electrode can be on the bottom (or exposed at the bottom) of one (or one or more, or each) microwell of the plurality of microwells. In some embodiments, there are more than two signal electrodes. For example, the plurality of electrodes can comprise a plurality of first signal electrodes and a plurality of second signal electrodes. A surface of each of the plurality of first signal electrodes can be on the bottom (or exposed at the bottom) of at least one microwell of the plurality of microwells. A surface of one (or one or more, or each) of the plurality of second signal electrodes can be on the bottom (or exposed at the bottom) of at least one microwell of the plurality of microwells. In some embodiments, the plurality of first signal electrodes (or the plurality of second signal electrodes) can comprise, comprise about, comprise at least, comprise at least about, comprise at most, or comprise at most about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900, 1000, or a number or a range between any two of these values, electrodes. In some embodiments, one, one or more, of each of the plurality of first signal electrodes (or the plurality of second signal electrodes) can be on the bottom (or exposed at the bottom) of, of about, of at least, of at least about, at most, or at most about, 1, 2, 3, 4, 5, 6, 7, 8, 9, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, 100000, 200000, 300000, 400000, 500000, 600000, 700000, 800000, 900000, 1000000, 2000000, 3000000, 4000000, 5000000, 6000000, 7000000, 8000000, 9000000, 10000000, 20000000, 30000000, 40000000, 50000000, 60000000, 70000000, 80000000, 90000000, 100000000, 200000000, 300000000, 400000000, 500000000, 600000000, 700000000, 800000000, 900000000, 1000000000, or a number or a range between any two of these values, microwells.

A number of first signal electrodes can be unconnected such that these first signal electrodes can be individually controlled and different signals can be applied to the first signal electrodes simultaneously. For example, at least two first signal electrodes of the plurality of first signal electrodes can be unconnected. A number of second signal electrodes can be unconnected such that these second signal electrodes can be individually controlled and different signals can be applied to the second signal electrodes simultaneously. For example, at least two second signal electrodes of the plurality of second signal electrodes can be unconnected. Different signals can be applied to two or more first (or second) signal electrodes. The same signal or different signals can be applied to two or more first (or second) signal electrodes. No signal can be applied to one or more other first (or second) signal electrodes. For example, the same or different signals can be applied to three first signal electrodes, and no signal can be applied to two other first signal electrodes. For example, the same or different signals can be applied to nine first signal electrodes, and no signal can be applied to one other first signal electrode. In some embodiments, the number of first signal electrodes (or the number of second signal electrodes) that are unconnected can be, be about, be at least, be at least about, be at most, or be at most about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900, 1000, or a number or a range between any two of these values.

In some embodiments, the number of first signal electrodes that are parallel (or substantially parallel, not parallel, or not substantially parallel) to each other (or another first signal electrode) can be, be about, be at least, be at least about, be at most, or be at most about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900, 1000, or a number or a range between any two of these values. For example, at least two first signal electrodes of the plurality of first signal electrodes can be parallel. In some embodiments, the number of second signal electrodes that are parallel (or substantially parallel, not parallel, or not substantially parallel) to each other (or another second signal electrode) can be, be about, be at least, be at least about, be at most, or be at most about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900, 1000, or a number or a range between any two of these values. For example, at least two second signal electrodes of the plurality of second signal electrodes can be parallel.

A first signal electrode can be perpendicular (or substantially perpendicular, or not perpendicular, or not substantially perpendicular, or parallel, or substantially parallel, or not parallel, or not substantially parallel) to a second signal electrode. The relative orientation (or angle) between a first signal electrode and a second electrode can be, or be about, 5°, 10°, 20°, 30°, 40°, 45°, 50°, 60°, 70°, 80°, or more. In some embodiments, the number of first signal electrodes that are perpendicular (or substantially perpendicular, or not perpendicular, or not substantially perpendicular, or parallel, or substantially parallel, or not parallel, or not substantially parallel, or having another relative orientation (or angle)) to at least one second signal electrode can be, be about, be at least, be at least about, be at most, or be at most about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900, 1000, or a number or a range between any two of these values. In some embodiments, the number of second signal electrodes that are perpendicular (or substantially perpendicular, not perpendicular, or not substantially perpendicular, or parallel, or substantially parallel, or not parallel, or not substantially parallel, or having another relative orientation (or angle)) to at least one first signal electrode can be, be about, be at least, be at least about, be at most, or be at most about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900, 1000, or a number or a range between any two of these values. For example, at least one first signal electrode of the plurality of first signal electrodes and at least one second signal electrode of the plurality of second signal electrodes can be perpendicular to each other.

In some embodiments, different first signal electrodes of the plurality of first signal electrodes can be on (or can be exposed at) the bottoms of the microwells in different first groups (e.g., different rows) of the microwell arrays. For example, the microwells of different first groups can comprise different first signal electrodes. Surfaces of different second signal electrodes of the plurality of second signal electrodes can be on (or can be exposed at) the bottoms of the microwells in different second groups (e.g., different columns) of the microwell arrays. For example, the microwells of different second groups can comprise different second signal electrodes. Surfaces of different first signal electrodes of the plurality of first signal electrodes can be on (or can be exposed at) the bottoms of the microwells in different second groups (e.g., different columns) of the microwell arrays. For example, the microwells of different second groups can comprise different first signal electrodes. Surfaces of different second signal electrodes of the plurality of second signal electrodes can be on (or can be exposed at) the bottoms of the microwells in different first groups (e.g., different rows) of the microwell arrays. For example, the microwells of different first groups can comprise different second signal electrodes. In some embodiments, surfaces of different first signal electrodes of the plurality of first signal electrodes can be on (or can be exposed at) the bottoms of different microwells of the plurality of microwells. For example, different microwells can comprise different first signal electrodes. Surfaces of different second signal electrodes of the plurality of second signal electrodes can be on the bottoms of different microwells of the plurality of microwells. For example, different microwells can comprise different second signal electrodes. In some embodiments, a surface of the ground electrode is on a bottom of one, one or more, or each of the plurality of microwells. For example, all the microwells can have the same ground electrode. As another example, two or more microwells can have the same ground electrode.

The electrode geometry (e.g., width, length, height (or thickness), shape, and spacing) can be selected to capture the cells with desirable sizes. The space or spacing between a first signal electrode and a ground electrode (or the space or spacing between a second signal electrode and a ground electrode) can be different in different implementations. In some embodiments, the space or spacing between a first signal electrode and a ground electrode is, is about, is at least about, is at most, or is at most about, 100 nanometer (nm), 200 nm, 300 nm, 400 nm, 500 nm, 600 nm, 700 nm, 800 nm, 900 nm, 1 micrometer (µm), 2 µm, 3 µm, 4 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, or a number or a range between any two of these values. For example, the space or spacing between the first signal electrode and the ground electrode is 1 µm to 10 µm. For example, the space between the second signal electrode and the ground electrode can be 1 µm to 10 µm. The spacing between the first signal electrode and the ground electrode and the space between the second signal electrode and the ground electrode can be different (see FIGS. 1A-1D for an illustration). The spacing between the first signal electrode and the ground electrode and the space between the second signal electrode and the ground electrode can be the same.

The width or length of a first signal electrode (or a second signal electrode or a ground electrode) can be different in different implementations. In some embodiments, the width or length of a first signal electrode (or a second signal electrode or a ground electrode) is, is about, is at least, is at least about, is at most, or is at most about, 1 micrometer (µm), 2 µm, 3 µm, 4 µm, 5 µm, 6 µm, 7 µm, 8 µm, 9 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 300 µm, 400 µm, 500 µm, 600 µm, 700 µm, 800 µm, 900 µm, 1 millimeter (mm), 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, or a number or a range between any two of these values. For example, the width of the first signal electrode is 5 µm to 100 µm. As another example, the width of the second signal electrode can be 5 µm to 100 µm. For example, the width of the ground electrode can be 5 µm to 50 µm. The thickness of a first signal electrode (or a second signal electrode or a ground electrode) can be different in different implementations. In some embodiments, the thickness of a first signal electrode (or a second signal electrode or a ground electrode) is, is about, is at least, is at least about, is at most, or is at most about, 0.01 µm, 0.02 µm, 0.03 µm, 0.04 µm, 0.05 µm, 0.06 µm, 0.07 µm, 0.08 µm, 0.09 µm, 0.1 µm, 0.15 µm, 0.2 µm, 0.25 µm, 0.3 µm, 0.35 µm, 0.4 µm, 0.45 µm, 0.5 µm, 0.55 µm, 0.6 µm, 0.65 µm, 0.7 µm, 0.75 µm, 0.8 µm, 0.85 µm, 0.9 µm, 0.95 µm, 1 µm, 1.1 µm, 1.2 µm, 1.3 µm, 1.4 µm, 1.5 µm, 1.6 µm, 1.7 µm, 1.8 µm, 1.9 µm, 2 µm, or a number or a range between any two of these values. For example, the thickness of the first signal electrode can be 0.1 µm to 1 µm. As another example, the thickness of the second signal electrode can be 0.1 µm to 1 µm. As a further example, the thickness of the ground electrode can be 0.1 µm to 1 µm. In the non-limiting exemplary embodiment shown in FIG. 1E, the spacing between the first signal electrode (or the second signal electrode) and the ground electrode is 2 µm to 6 µm, the width of the first signal electrode (or the second ground electrode) is 50 µm, the width of the ground electrode is 10 µm, the thickness of the first signal electrode (or the second ground electrode) is 0.25 µm, and the thickness of the ground electrode is 0.25 µm.

Microwell Array

The microwell array can comprise different numbers of microwells in different implementations. In some embodiments, the microwell array can comprise, comprise about, comprise at least, comprise at least about, comprise at most, or comprise at most about, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, 100000, 200000, 300000, 400000, 500000, 600000, 700000, 800000, 900000, 1000000, 2000000, 3000000, 4000000, 5000000, 6000000, 7000000, 8000000, 9000000, 10000000, 20000000, 30000000, 40000000, 50000000, 60000000, 500000000, 600000000, 700000000, 800000000, 900000000, 1000000000, or a number or a range between any two of these values, microwells. The microwells can be arranged into rows and columns, for example. The number of microwells in a row (or a column) can be, be about, be at least, be at least about, be at most, or be at most about, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, 100000, or a number or a range between any two of these values. Adjacent rows (or columns) of microwells can be aligned or staggered, for example.

The width, length, depth (or height), radius, or diameter of a microwell of the plurality of microwells can be different in different implementations. In some embodiments, the width, length, depth (or height), radius, or diameter of a microwell of the plurality of microwells can be, be about, be at least, be at least about, be at most, or be at most about, 1 µm, 2 µm, 3 µm, 4 µm, 5 µm, 6 µm, 7 µm, 8 µm, 9 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, 450 µm, 460 µm, 470 µm, 480 µm, 490 µm, 500 µm, 600 µm, 700 µm, 800 µm, 900 µm, 1000 µm, or a number or a range between any two of these values. For example, the width of a microwell of the plurality of microwells is 10 µm to 200 µm. As another example, the length of a microwell of the plurality of microwells can be 10 µm to 200 µm. As a further example, the depth of a microwell of the plurality of microwells can be 5 µm to 500 µm. In the non-limiting exemplary embodiment shown in FIG. 1E, the width of a microwell is 10 µm, the length of a microwell is 20 µm to 100 µm, such as 20 µm, and the depth of a microwell is 5 µm to 10 µm. The shape of a microwell can be different in different implementations. In some embodiments, a microwell of the plurality of microwells has a circular, elliptical, square, rectangular, triangular, or hexagonal shape.

The volume of one, one or more, or each, of the plurality of microwells can be different in different embodiments. The volume of one, one or more, or each, of the plurality of microwells can be, be about, be at least, be at least about, be at most, or be at most about, 1 nm$^3$, 2 nm$^3$, 3 nm$^3$, 4 nm$^3$, 5 nm$^3$, 6 nm$^3$, 7 nm$^3$, 8 nm$^3$, 9 nm$^3$, 10 nm$^3$, 20 nm$^3$, 30 nm$^3$, 40 nm$^3$, 50 nm$^3$, 60 nm$^3$, 70 nm$^3$, 80 nm$^3$, 90 nm$^3$, 100 nm$^3$, 200 nm$^3$, 300 nm$^3$, 400 nm$^3$, 500 nm$^3$, 600 nm$^3$, 700 nm$^3$, 800 nm$^3$, 900 µm$^3$, 1000 nm$^3$, 10000 nm$^3$, 100000 µm$^3$, 1000000 nm$^3$, 10000000 nm$^3$, 100000000 µm$^3$, 1000000000 nm$^3$, 2 µm$^3$, 3 µm$^3$, 4 µm$^3$, 5 µm$^3$, 6 µm$^3$, 7 µm$^3$, 8 µm$^3$, 9 µm$^3$, 10 µm$^3$ 20 µm$^3$ 30 µm$^3$, 40 µm$^3$, 50 µm$^3$, 60 µm$^3$, 70 m$^3$, 80 µm$^3$, 90 µm$^3$, 100 µm$^3$, 200 µm$^3$, 300 µm$^3$, 400 µm$^3$, 500 µm$^3$, 600 µm$^3$, 700 µm$^3$, 800 µm$^3$, 900 µm$^3$, 1000 µm$^3$, 10000 µm$^3$, 100000 µm$^3$, 1000000 µm$^3$, or a number or a range between any two of these values. The volume of one, one or more, or each, of the plurality of microwells can be, be about, be at least, be at least about, be at most, or be at most about, 1 nanolieter (nl), 2 nl, 3 nl, 4 nl, 5 nl, 6 nl, 7 nl, 8 nl, 9 nl, 10 nl, 11 nl, 12 nl, 13 nl, 14 nl, 15 nl, 16 nl, 17 nl, 18 nl, 19 nl, 20 nl, 21 nl, 22 nl, 23 nl, 24 nl, 25 nl, 26 nl, 27 nl, 28 nl, 29 nl, 30 nl, 31 nl, 32 nl, 33 nl, 34 nl, 35 nl, 36 nl, 37 nl, 38 nl, 39 nl, 40 nl, 41 nl, 42 nl, 43 nl, 44 nl, 45 nl, 46 nl, 47 nl, 48 nl, 49 nl, 50 nl, 51 nl, 52 nl, 53 nl, 54 nl, 55 nl, 56 nl, 57 nl, 58 nl, 59 nl, 60 nl, 61 nl, 62 nl, 63 nl, 64 nl, 65 nl, 66 nl, 67 nl, 68 nl, 69 nl, 70 nl, 71 nl, 72 nl, 73 nl, 74 nl, 75 nl, 76 nl, 77 nl, 78 nl, 79 nl, 80 nl, 81 nl, 82 nl, 83 nl, 84 nl, 85 nl, 86 nl, 87 nl, 88 nl, 89 nl, 90 nl, 91 nl, 92 nl, 93 nl, 94 nl, 95 nl, 96 nl, 97 nl, 98 nl, 99 nl, 100 nl, or a number or a range between any two of these values. For example, the volume of one, one or more, or each, of the plurality of microwells is about 1 nm$^3$ to about 1000000 µm$^3$.

In some embodiments, the microwell array is directly in contact with one, one or more, or each, of the plurality of electrodes. In some embodiments, the microwell array is indirectly in contact with one, one or more, or each, of the plurality of electrodes. For example, a thin layer of photoresist (e.g., SU-8 in Example 1) may be applied on top of the electrodes to increase the adhesion of the microwell array to the electrode surfaces such that the thin layer of photoresist separates the microwell array and the plurality of electrodes. In some embodiments, a material of the microwell array, or a material of one, one or more, or each of the plurality of microwells, comprises a dielectric material. The dielectric material can comprise SU-8. In some embodiments, a material of the microfluidic device (or a component thereof, such as the microwell array, one or more microwells, or the substrate) comprises silicon, glass, ceramic, elastomers such as polydimethylsiloxane (PDMS) and thermoset polyester, thermoplastic polymers such as polystyrene, polycarbonate, poly(methyl methacrylate) (PMMA), poly-ethylene glycol diacrylate (PEGDA), Teflon, polyurethane (PU), composite materials such as cyclic-olefin copolymer, and combinations thereof.

Barcode Molecules

One, one or more, or each of the plurality of microwells can comprise a plurality of barcode molecules attached thereto. A barcode molecule of the plurality of barcode molecules can comprise a molecular barcode sequence (e.g., the unique molecular identifier (UMI) shown in FIG. 4), a first microwell barcode sequence (e.g., Barcode B shown in FIG. 4), and/or a second microwell barcode sequence (e.g., Barcode A shown in FIG. 4).

In some embodiments, the plurality of barcode is attached to the microwell covalently. In some embodiments, the plurality of barcode molecules is attached to the microwell non-covalently. The substrate can comprise a poly(L-lysine) layer (PLL) as illustrated in FIG. 4. The poly(L-lysine) layer can comprise streptavidin molecules. The plurality of barcode molecules each can comprise a biotin molecule. The plurality of barcode molecules can be attached to the microwell by binding of the biotin molecules to the streptavidin molecules as illustrated in FIG. 4.

Figure 6A:
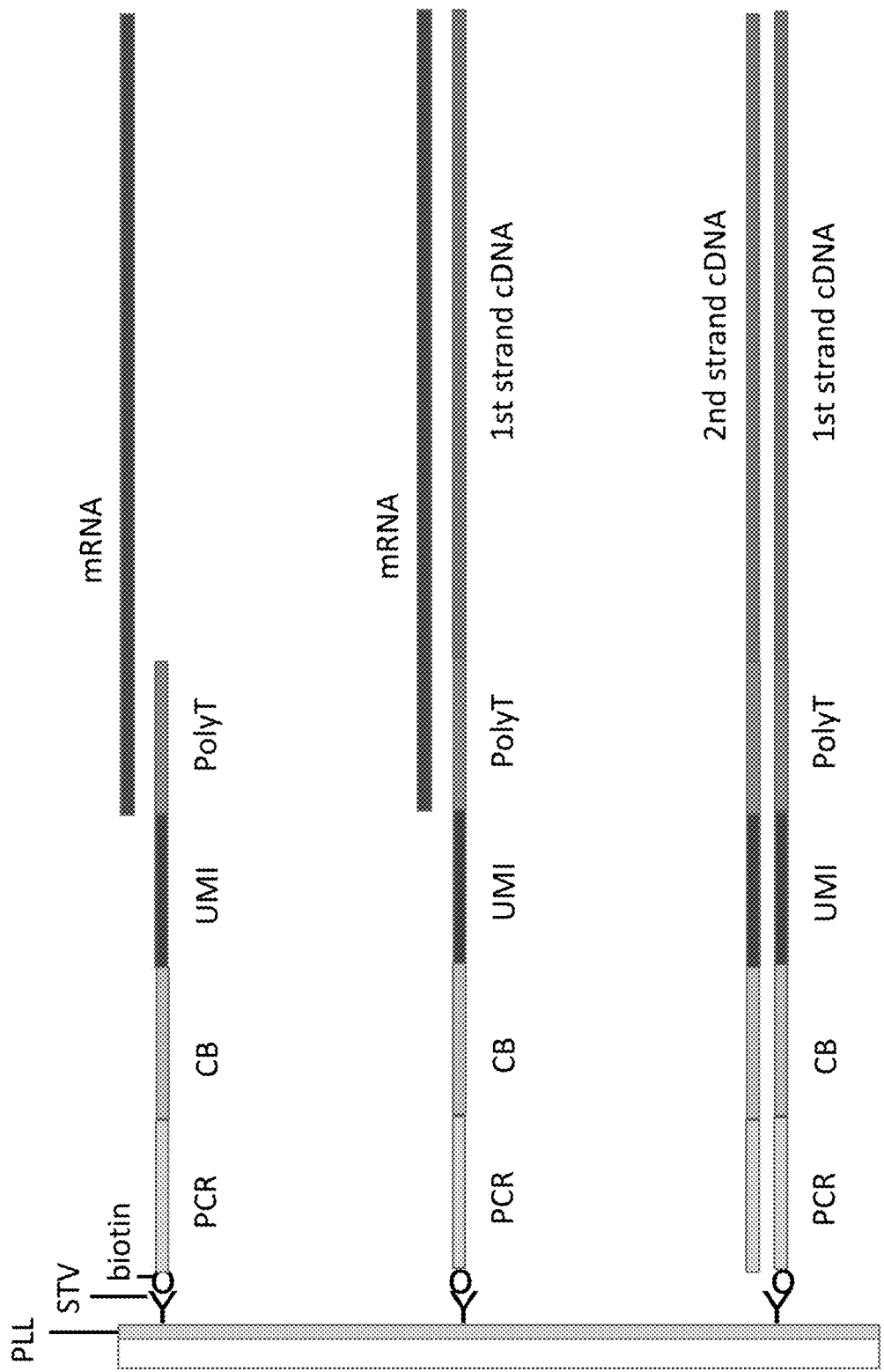
FIGS. 6A-6C show non-limiting exemplary embodiments of obtaining barcoded nucleic acids for sequencing. A barcode molecule can comprise a PCR adapter sequence, a combinatorial microwell barcode sequence (also referred to herein as cell barcode "CB"), a molecular label (e.g., a UMI), and a target binding sequence (a polyT sequence). The barcode molecule can be extended to generate a barcoded nucleic acid comprising a complementary sequence of a target nucleic acid (e.g., mRNA). Second strand synthesis can be performed, and the second strand synthesis product can be pooled prior to sequencing (FIG. 6A). The barcoded nucleic acid can be detached from the microwell (e.g., by restriction enzyme digestion shown in FIG. 6B and by chemical dissociation shown in FIG. 6C).
Figure 6B:
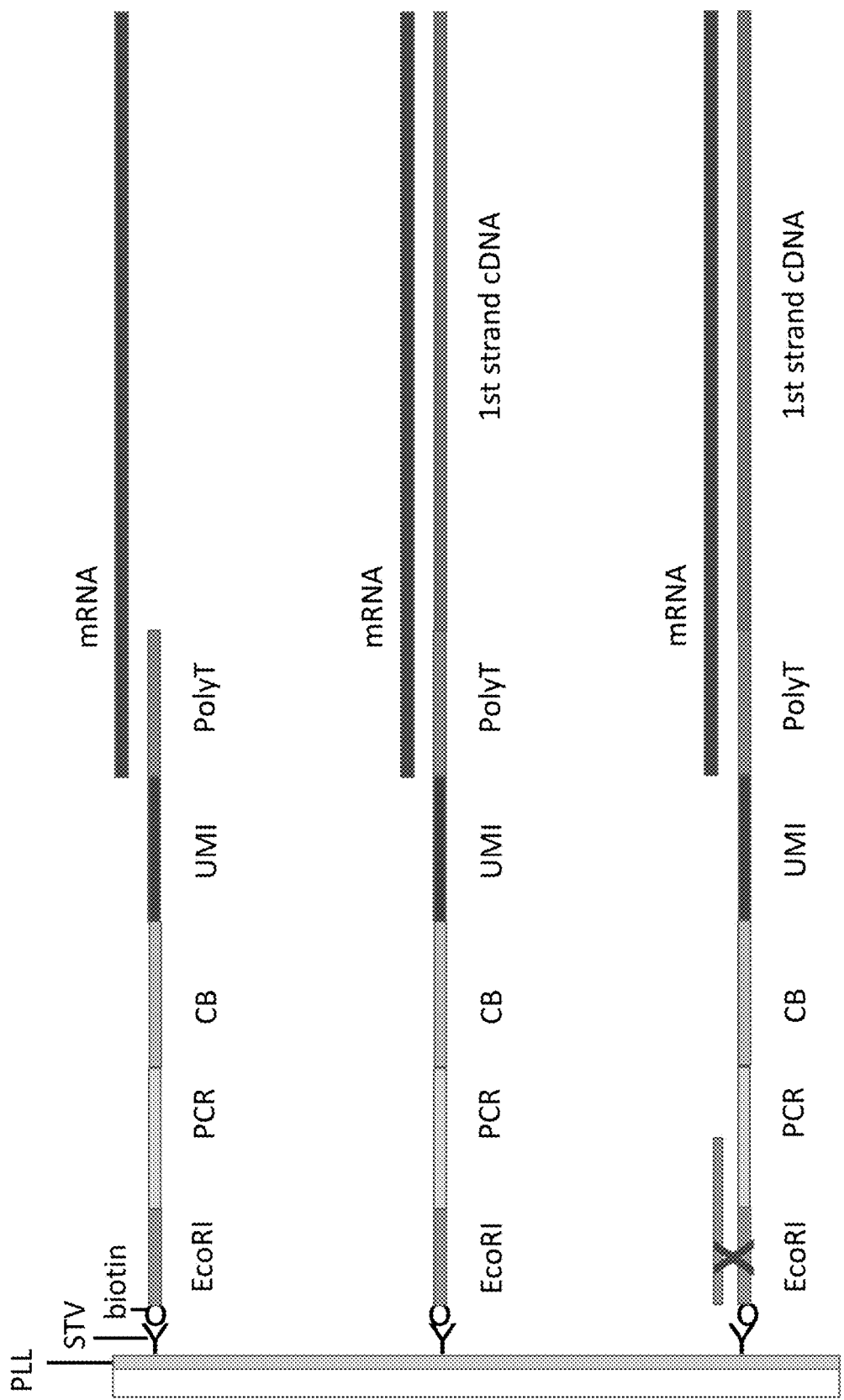

In some embodiments, one, one or more, or each barcode molecule of the plurality of barcode molecules comprises an enzyme recognition sequence (e.g., a restriction enzyme recognition sequence shown in FIG. 6B). In some embodiments, one, one or more, or each barcode molecule of the plurality of barcode molecules comprises no enzyme recognition sequence. In some embodiments, one, one or more, or each barcode molecule of the plurality of barcode molecules comprises a primer sequence (e.g., a PCR adapter sequence illustrated in FIG. 4), a first linker sequence (e.g., B linker sequence shown in FIG. 4), a second linker sequence (e.g., A linker shown in FIG. 4), and/or a target binding sequence (e.g., a poly-T sequence shown in FIG. 4, or a randomer, such as a random hexamer). Each barcode molecule of the plurality of barcode molecules can comprise from 5' to 3' a primer sequence, a molecular barcode sequence, a first microwell barcode sequence, a first linker sequence, a second linker sequence, a second microwell barcode sequence, and/or a target binding sequence. In some embodiments, each barcode molecule of the plurality of barcode molecules can comprise an enzyme recognition sequence on the 5' end or 5' to the primer sequence. The target binding sequence can comprise a poly(dT) sequence. In some embodiments, each barcode molecule of the plurality of barcode molecules comprises a template switching sequence (e.g., GGG, such as rGrGrG).

In some embodiments, the target binding sequences of all barcode molecules of the plurality of barcode molecules comprise poly(dT) capable of hybridizing to poly(A) tails of mRNA molecules (or poly(dA) regions or tails of DNA). In some embodiments, the target binding sequences of some barcode molecules of the plurality of barcode molecules comprise gene-specific or target-specific primer sequences. For example, a barcode molecule of the plurality of barcode molecules can also comprise a target binding sequence capable of hybridizing to a specific target nucleic acid associated with the first cell and/or second cell, thereby capturing specific targets or analytes of interest. For example, the target binding sequence capable of hybridizing to a specific target nucleic acid can be a gene-specific primer sequence. The gene-specific primer sequences can be designed based on known sequences of a target nucleic acid of interest. The gene-specific primer sequences can span a nucleic acid region of interest, or adjacent (upstream or downstream) of a nucleic acid region of interest.

Molecular Barcode Sequence

In some embodiments, a barcode molecule (or each barcode molecule of the plurality of barcode molecules) can comprise a molecular barcode sequence. Molecular barcode sequences can be used for identifying molecular origins of barcoded nucleic acids. The molecular barcode sequences of the barcode molecules of the plurality of barcode molecules attached to a microwell can be identical or different.

In some embodiments, the molecular barcode sequences of the plurality of barcode molecules are different. The number (or percentage) of molecular barcode sequences of barcode molecules attached to a microwell with different sequences can be different in different embodiments. In some embodiments, the number of molecular barcode sequences of barcode molecules attached to a microwell with different sequences is, is about, is at least, is at least about, is at most, or is at most about, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, 100000, 200000, 300000, 400000, 500000, 600000, 700000, 800000, 900000, 1000000, 2000000, 3000000, 4000000, 5000000, 6000000, 7000000, 8000000, 9000000, 10000000, 20000000, 30000000, 40000000, 50000000, 60000000, 70000000, 80000000, 90000000, 100000000, 200000000, 300000000, 400000000, 500000000, 600000000, 700000000, 800000000, 900000000, 1000000000, or a number or a range between any two of these values. In some embodiments, the percentage of molecular barcode sequences of barcode molecules attached to a microwell with different sequences is, is about, is at least, is at least about, is at most, or is at most about, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.9%, 100%, or a number or a range between any two of these values. For example, the molecular barcode sequences of two barcode molecules of the plurality of barcode molecules attached to a microwell can comprise different sequences.

The number of barcode molecules attached to a microwell with identical molecular barcode sequences can be different in different embodiments. In some embodiments, the number of barcode molecules attached to a microwell with identical molecular barcode sequences is, is about, is at least, is at least about, is at most, or is at most about, 1, 2, 3, 4, 5, 6, 7, 8, 9, 10, 20, 30, 40, 50, 60, 70, 80, 90, 100, 200, 300, 400, 500, 600, 700, 800, 900, 1000, or a number or a range between any two of these values. For example, the molecular barcode sequences of two barcode molecules attached to a microwell can comprise an identical sequence.

The number of unique molecular barcode sequences attached to a microwell can be different in different embodiments. In some embodiments, the number of unique molecular barcode sequences is, is about, is at least, is at least about, is at most, or is at most about, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, 100000, 200000, 300000, 400000, 500000, 600000, 700000, 800000, 900000, 1000000, 2000000, 3000000, 4000000, 5000000, 6000000, 7000000, 8000000, 9000000, 10000000, 20000000, 30000000, 40000000, 50000000, 60000000, 70000000, 80000000, 90000000, 100000000, 200000000, 300000000, 400000000, 500000000, 600000000, 700000000, 800000000, 900000000, 1000000000, or a number or a range between any two of these values.

The length of a molecular barcode sequence of a barcode molecule (or the length of a molecular barcode sequence of each barcode molecule) can be different in different embodiments. In some embodiments, the length of a molecular barcode sequence of a barcode molecule (or the length of a molecular barcode sequence of each barcode molecule) is, is about, is at least, is at least about, is at most, or is at most about, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, or a number or a range between any two of these values, nucleotides in length.

Microwell Barcodes Sequences

In some embodiments, a barcode molecule (or each barcode molecule of the plurality of barcode molecules) can comprise a first microwell barcode sequence and a second microwell barcode sequence. First microwell barcode sequences of the pluralities of barcode molecules can be predetermined (see FIGS. 3A-3B and the accompanying description for a non-limiting exemplary method of predetermining the Barcode B sequences for an example). First microwell barcode sequences of the pluralities of barcode molecules can be identical in each first group of microwells (e.g., microwells in each row as illustrated in FIGS. 3A-3B) of the microwell array. First microwell barcode sequences of the pluralities of barcode molecules can be different in microwells in different first groups (e.g., different rows as illustrated in FIGS. 3A-3B) of the microwell array. Second microwell barcode sequences of the pluralities of barcode molecules can be predetermined (see FIGS. 3A-3B and the accompanying description for a non-limiting exemplary method of predetermining the Barcode A sequences). Second microwell barcode sequences of the pluralities of barcode molecules can be identical in microwells in each second group of microwells (e.g., microwells in each column as illustrated in FIGS. 3C-3D) of the microwell array. Second microwell barcode sequences of the pluralities of barcode molecules can be different in microwells in different second groups (e.g., different columns as illustrated in FIGS. 3C-3D) of the microwell array. The combination of the first microwell barcode sequence and the second microwell barcode sequence (also referred to herein as a combinatorial or combination microwell barcode sequence) can be unique to each microwell and can be used to determine the microwell origins of barcoded nucleic acids (or to determine the barcoded nucleic acids originate from the first cell and/or the second cell in the microwell) as disclosed herein.

The number (or percentage) of barcode molecules attached to a microwell with identical first microwell barcode sequences, identical second microwell barcode sequences, and/or combinations of first microwell barcode sequences and second microwell barcode sequences that are identical can be different in different embodiments. In some embodiments, the number of barcode molecules attached to a microwell with identical first microwell barcode sequences, identical second microwell barcode sequences, and/or combinations of first microwell barcode sequences and second microwell barcode sequences that are identical is, is about, is at least, is at least about, is at most, or is at most about, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, 100000, 200000, 300000, 400000, 500000, 600000, 700000, 800000, 900000, 1000000, 2000000, 3000000, 4000000, 5000000, 6000000, 7000000, 8000000, 9000000, 10000000, 20000000, 30000000, 40000000, 50000000, 60000000, 70000000, 80000000, 90000000, 100000000, 200000000, 300000000, 400000000, 500000000, 600000000, 700000000, 800000000, 900000000, 1000000000, or a number or a range between any two of these values. In some embodiments, the percentage of barcode molecules attached to a microwell with identical first microwell barcode sequences, identical second microwell barcode sequences, and/or combinations of first microwell barcode sequences and second microwell barcode sequences that are identical is, is about, is at least, is at least about, is at most, or is at most about, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.9%, 100%, or a number or a range between any two of these values. For example, at least two barcode molecules attached to a microwell comprise identical first microwell barcode sequences and identical second microwell barcode sequences.

The combination of a first microwell barcode sequence and a second microwell barcode sequence (also referred to herein as a combinatorial microwell barcode sequence) can be unique (or substantially unique) to a microwell. The number of unique combinations of first microwell barcode sequences and second microwell barcode sequences amongst the microwells can be different in different embodiments. In some embodiments, the number of unique combinations of first microwell barcode sequences and second microwell barcode sequences amongst the microwells is, is about, is at least, is at least about, is at most, or is at most about, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, 100000, 200000, 300000, 400000, 500000, 600000, 700000, 800000, 900000, 1000000, 2000000, 3000000, 4000000, 5000000, 6000000, 7000000, 8000000, 9000000, 10000000, 20000000, 30000000, 40000000, 50000000, 60000000, 70000000, 80000000, 90000000, 100000000, 200000000, 300000000, 400000000, 500000000, 600000000, 700000000, 800000000, 900000000, 1000000000, or a number or a range between any two of these values. In some embodiments, the percentage of unique combinatorial microwell barcode sequences amongst combinatorial microwell barcode sequences of barcode molecules attached to a microwell is, is about, is at least, is at least about, is at most, or is at most about, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.9%, 100%, or a number or a range between any two of these values. For example, the two microwells can comprise barcode molecules having different combinations of first microwell barcode sequences and second microwell barcode sequences.

The length of a first microwell barcode sequence, a second microwell barcode sequence, and/or a combination of a first microwell barcode sequence and a second microwell barcode sequence of a barcode molecule (or each first microwell barcode sequence, each second microwell barcode sequence, and/or a combination of each first microwell barcode sequence and a second microwell barcode sequence) can be different in different embodiments. In some embodiments, a first microwell barcode sequence, a second microwell barcode sequence, and/or a combination of a first microwell barcode sequence and a second microwell barcode sequence of a barcode molecule (or each first microwell barcode sequence, each second microwell barcode sequence, and/or a combination of each first microwell barcode sequence and a second microwell barcode sequence) of a barcode molecule is, is about, is at least, is at least about, is at most, or is at most about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 82, 83, 84, 85, 86, 87, 88, 89, 90, 91, 92, 93, 94, 95, 96, 97, 98, 99, 100, or a number or a range between any two of these values, nucleotides in length.

In some embodiments, a combinatorial microwell barcode sequences can serve to track the target nucleic acids associated with the first cell and/or the second cell throughout the processing (e.g., location of the cells in the plurality of microwells) when the combinatorial microwell barcode sequence associated with the target nucleic acids is determined during sequencing. In some embodiment, a combinatorial microwell barcode can serve to provide linkage information between cell nucleic acid sequences and cell functionality when in combination with optical imaging. Optical imaging can be performed to identify a microwell with an interaction between the first cell (e.g., a T cell) and the second cell (e.g., a B cell) that is of interest. Barcoded nucleic acids with an identical combinatorial microwell barcode sequence can be generated from target nucleic acids of interacting cells within a given microwell. Some barcoded nucleic acids are pooled and sequenced to determine cell nucleic acid sequences or a profile (e.g., an mRNA expression profile) which is associated with (e.g., identifiable by or linked with) the combinatorial microwell barcode sequence. The combinatorial microwell barcode sequence for the microwell is predetermined. By matching the combinatorial microwell barcode sequence associated with the profile and the combinatorial microwell barcode sequence of the microwell, the profile can be tracked to the first cell and/or the second cell and linked to the interaction of interest. For example, the profile can be tracked to that microwell where phenotypic observables (e.g., cellular metabolism, cell cycle states, cell signaling, cell viability etc.) of the cells have been obtained or recorded. The profile can thus be linked to the observed cell-cell interaction.

Primer Sequence

In some embodiments, a barcode molecule (or each barcode molecule of the plurality of barcode molecules) can comprise a primer sequence. The primer sequence can be a sequencing primer sequence (or a sequencing primer binding sequence), such as a Read 1 sequence. The primer sequence can be a PCR primer sequence (or PCR primer binding sequence), such as a PCR adaptor sequence illustrated in FIG. 4. The length of the primer sequence can be different in different embodiments. In some embodiments, the primer sequence is 6, 7, 8, 9, 10, 11, 12, 13, 14, 15, 16, 17, 18, 19, 20, 21, 22, 23, 24, 25, 26, 27, 28, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, or a number or a range between any two of these values, nucleotides in length. The number (or percentage) of barcode molecules attached to a microwell each comprising a primer sequence (or each comprising an identical primer sequence) can be different in different embodiments. In some embodiments, the number of barcode molecules attached to a microwell each comprising a primer sequence is, is about, is at least, is at least about, is at most, or is at most about, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, 100000, 200000, 300000, 400000, 500000, 600000, 700000, 800000, 900000, 1000000, 2000000, 3000000, 4000000, 5000000, 6000000, 7000000, 8000000, 9000000, 10000000, 20000000, 30000000, 40000000, 50000000, 60000000, 70000000, 80000000, 90000000, 100000000, 200000000, 300000000, 400000000, 500000000, 600000000, 700000000, 800000000, 900000000, 1000000000, or a number or a range between any two of these values. In some embodiments, the percentage of barcode molecules attached to a microwell each comprising a primer sequence (or each comprising an identical primer sequence) is, is about, is at least, is at least about, is at most, or is at most about, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.9%, 100%, or a number or a range between any two of these values.

Linker Sequences

In some embodiments, a barcode molecule (or each barcode molecule of the plurality of barcode molecules) can comprise a first linker sequence (e.g., B linker shown in FIG. 4) and a second linker sequence (e.g., A linker shown in FIG. 4). A first barcode molecule can comprise the first linker sequence. A second barcode molecule can comprise the second linker sequence. When attaching the barcode molecule to a microwell, the first barcode molecule can be attached to the microwell first. A ligation linker can hybridize to both the first linker sequence of the first barcode molecule and the second linker sequence of second barcode such that the first barcode molecule and the second barcode molecule can be ligated using, for example, a ligase. A barcode molecule can comprise the first barcode molecule (e.g., on the 5' end of the barcode molecule) and the second barcode molecule (e.g., on the 3' end of the barcode molecule) ligated.

The length of a first linker sequence, or a second linker sequence, or both, can be different in different embodiments. In some embodiments, the first linker sequence (or the second linker sequence) is 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, or a number or a range between any two of these values, nucleotides in length. The number (or percentage) of barcode molecules attached to a microwell each comprising a first linker sequence, a second linker sequence, or both (or each comprising an identical first linker sequence, an identical second linker sequence, or both) can be different in different embodiments. In some embodiments, the number of barcode molecules attached to a microwell each comprising a first linker sequence, a second linker sequence, or both (or each comprising an identical first linker sequence, an identical second linker sequence, or both) is, is about, is at least, is at least about, is at most, or is at most about, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, 100000, 200000, 300000, 400000, 500000, 600000, 700000, 800000, 900000, 1000000, 2000000, 3000000, 4000000, 5000000, 6000000, 7000000, 8000000, 9000000, 10000000, 20000000, 30000000, 40000000, 50000000, 60000000, 70000000, 80000000, 90000000, 100000000, 200000000, 300000000, 400000000, 500000000, 600000000, 700000000, 800000000, 900000000, 1000000000, or a number or a range between any two of these values. In some embodiments, the percentage of barcode molecules attached to a microwell each comprising a first linker sequence, a second linker sequence, or both (or each comprising an identical first linker sequence, an identical second linker sequence, or both) is, is about, is at least, is at least about, is at most, or is at most about, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.9%, 100%, or a number or a range between any two of these values.

Target Binding Sequence

In some embodiments, a barcode molecule (or each barcode molecule of the plurality of barcode molecules) can comprise a target binding sequence. The target binding sequence can comprise a poly(dT) sequence. The target binding sequence can comprise a randomer, such as a random hexamer. The target binding sequence can comprise a target-specific sequence, such as a gene-specific sequence. The target binding sequence can be capable of hybridizing to a target nucleic acid, such as mRNA. The target binding sequence can be capable of hybridizing to a specific target nucleic acid (e.g., mRNA of a specific gene of interest).

The length of a target binding sequence can be different in different embodiments. In some embodiments, a target binding sequence is, is about, is at least, is at least about, is at most, or is at most about, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, or a number or a range between any two of these values, nucleotides in length. The target binding sequence can be 12-18 deoxythymidines in length. In some embodiments, the target binding sequence can be 20 nucleotides or longer to enable their annealing in reverse transcription reactions at higher temperatures.

The number of the barcode molecules attached to a microwell comprising a target binding sequence can be different in different embodiments. In some embodiments, the number of barcode molecules attached to a microwell comprising a target binding sequence (e.g., poly(dT) sequence) is, is about, is at least, is at least about, is at most, or is at most about, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, 100000, 200000, 300000, 400000, 500000, 600000, 700000, 800000, 900000, 1000000, 2000000, 3000000, 4000000, 5000000, 6000000, 7000000, 8000000, 9000000, 10000000, 20000000, 30000000, 40000000, 50000000, 60000000, 70000000, 80000000, 90000000, 100000000, 200000000, 300000000, 400000000, 500000000, 600000000, 700000000, 800000000, 900000000, 1000000000, or a number or a range between any two of these values.

In some embodiments, the target binding sequence can be on the 3' end of a barcode molecule of the plurality of barcode molecules attached to a microwell. FIG. 4 shows a poly-dT target binding sequence at the 3' end of a barcode molecule. A barcode molecule comprising a poly(dT) target binding sequence can be used to capture (e.g., hybridize to) 3' end of a polyadenylated mRNA transcript in a target nucleic acid for a downstream 3' gene expression library construction.

In some embodiments, target binding sequences of the barcode molecules attached to a microwell can be identical (e.g., same number of dTs). In some embodiments, the target binding sequences of the barcode molecules attached to a microwell can be different (e.g., different numbers of dTs). The percentage of the barcode molecules of the plurality of barcode molecules attached to a microwell with identical target binding sequences can be different in different embodiments. In some embodiments, the percentage of the barcode molecules of the plurality of barcode molecules attached to a microwell with identical target binding sequences (e.g., identical poly(dT) sequences) is, is about, is at least, is at least about, is at most, is at most about, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.9%, 100%, or a number or a range between any two of these values.

In some embodiments, the barcode molecules attached to a microwell can comprise a set of different gene-specific primer sequences each capable of binding to a specific target nucleic acid sequence. The number of different gene-specific primer sequences of the barcode molecules attached to a microwell can be different in different embodiments. In some embodiments, the number of different gene-specific primer sequences of the barcode molecules attached to a microwell is, is about, is at least, is at least about, is at most, or is at most about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 7000, 8000, 9000, 10000, 20000, 50000, 1000000, or a number or a range between any two of these values.

Accordingly, the number of target nucleic acids of interest (e.g., genes of interest) that the barcode molecules attached to a microwell are capable of binding can be different in different embodiments. In some embodiments, the number of target nucleic acids of interest (e.g., genes of interest) the barcode molecules attached to a microwell are capable of binding is, is about, is at least, is at least about, is at most, or is at most about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900, 1000, 2000, 3000, 4000, 5000, 6000, 7000, 8000, 9000, 10000, 20000, 50000, 1000000, or a number or a range between any two of these values. One barcode molecule attached to a microwell can bind to a molecule (or a copy) of a target nucleic acid. Barcode molecules attached to a microwell can bind to molecules (or copies) of a target nucleic acid or molecules (or copies) of target nucleic acids.

In some embodiments, the barcode molecules of the plurality of barcode molecules can each comprise a poly(dT) sequence, a gene-specific primer sequence, and/or both. The poly(dT) sequence and the gene-specific primer sequence can be on a same barcode molecule or different barcode molecules of the plurality of barcode molecules attached to a microwell.

Template Switching Sequence

In some embodiments, a barcode molecule (or each barcode molecule of the plurality of barcode molecules) can be a template switching oligonucleotide (TSO). A barcode molecule can comprise a template switching sequence, such as 1, 2, 3, 4, 5, or more guanine (G) bases. The part of a barcode molecule that is the template switching sequence can be ribonucleotides.

The number of the barcode molecules attached to a microwell comprising a template switching sequence can be different in different embodiments. In some embodiments, the number of barcode molecules attached to a microwell comprising a template switching sequence is, is about, is at least, is at least about, is at most, or is at most about, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, 100000, 200000, 300000, 400000, 500000, 600000, 700000, 800000, 900000, 1000000, 2000000, 3000000, 4000000, 5000000, 6000000, 7000000, 8000000, 9000000, 10000000, 20000000, 30000000, 40000000, 50000000, 60000000, 70000000, 80000000, 90000000, 100000000, 200000000, 300000000, 400000000, 500000000, 600000000, 700000000, 800000000, 900000000, 1000000000, or a number or a range between any two of these values.

In some embodiments, the template switching sequences of the barcode molecules attached to a microwell can be identical. In some embodiments, the template switching sequences of the barcode molecules attached to a microwell can be different. The percentage of the barcode molecules of the plurality of barcode molecules attached to a microwell with identical template switching sequences can be different in different embodiments. In some embodiments, the percentage of the barcode molecules of the plurality of barcode molecules attached to a microwell with identical template switching sequences is, is about, is at least, is at least about, is at most, is at most about, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.9%, 100%, or a number or a range between any two of these values.

Determining Cell-Cell Interaction

FIGS. 5A-5E show a non-limiting exemplary workflow of determining cell-cell interaction using a microfluidic device disclosed herein First, type I cells (also referred to herein as first cells) can be loaded into the microfluidic device, and the first set of electrodes can be turned on to generate an electric field to capture the type I cells to result in one cell per microwell (FIG. 5B). Extra type I cells can be washed away with the first set of electrodes on to avoid removal of captured type I cells. Second, after washing away extra type I cells, type II cells (also referred to herein as second cells) can be loaded into the microfluidic device, and the second sets of electrodes can be turned on to generate proper electric field to capture the type II cells (FIG. 5C). During the capture of type II cells, the first set of electrodes can be on to avoid removal of captured type I cells. After washing away extra second type II cells, there is a cell pair of one type I cell and one type II cell in each microwell.

Third, the cell functionality is monitored, including but not limited to, the killing of one type of cells to the other type of cells, during co-culturing the cell pair of one type I cell and one type II cell. Such cell-cell interaction is of interest. The microwell location of cells with desirable functionality or with cell-cell interaction of interest is recorded.

Figure 5D:
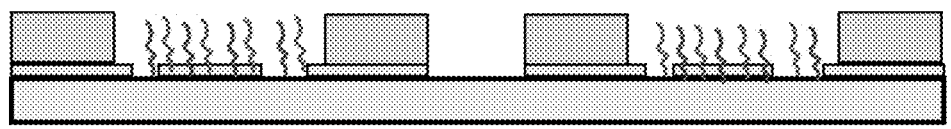
Figure 5E:
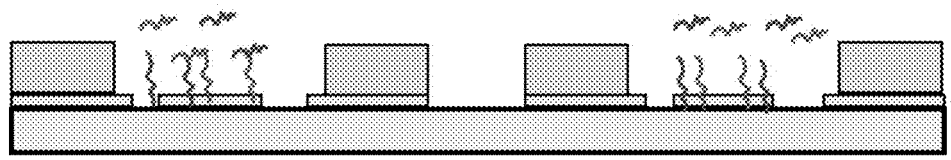

Fourth, the cells are lysed to release cell biological information (e.g., cellular nucleic acids, also referred to herein as sample nucleic acids) which is then captured by the unique oligonucleotide sequences in each microwell (FIG. 5D). Fifth, uncaptured biological information (e.g., cellular components other than the captured nucleic acids, such as proteins, lipids, uncaptured nucleic acids) is washed away. Sixth, the captured biological information with unique barcodes is release from the microwells to perform one or more reactions (e.g., nucleic acid reactions), including but not limited to, reverse transcription, 1-cycle PCR, denaturization, and cleavage (e.g., enzyme cleavage, photocleavage) (FIG. 5E).

Seventh, the products released from (thus not attached to) the microwells are collected and prepared for sequencing. Eighth, sequencing data analysis is performed to extract microwell barcode information. Ninth, the microwell barcodes obtained from sequencing data analysis are matched with those assigned to recorded microwell location of cells with desirable functionality to retrieve the genetic information of cells with desirable functionality or with cell-cell interaction of interest.

Loading and Partitioning Cells

Disclosed herein include methods of determining cell-cell interaction of interest. The method can comprise loading a plurality of first cells in a first loading buffer into the microfluidic device of the present disclosure via the inlet of the microfluidic device. The method can comprise applying a first signal to the first signal electrode and the ground electrode of the microfluidic device. The first signal can result in the single first cells moving into the microwells by, for example, dielectrophoresis force. The first signal applied can result in partitioning of single first cells of the plurality of first cells into microwells of the plurality of microwells. Single first cells can be present in the microwells. A single first cell can be present in each of one or more microwells. The first signal applied can result in the single first cells moving to the spaces between the ground electrode and the first signal electrode in the microwells. The first signal applied can result in trapping of the single first cells in the spaces between the ground electrode and the first signal electrode in the microwells. The single first cells can be physically trapped in the spaces between the ground electrode and the first signal electrode in the microwells (e.g., by the contact with the ground electrode and the first signal electrode). The first signal can trap single first cells in the spaces between the ground electrode and the first signal electrode in the microwells.

The method can comprise removing first cells of the plurality of first cells in the microfluidic device that are not trapped in the spaces between the ground electrode and the first signal electrode in the microwells from the microfluidic device. A first cell of the first cells not trapped in the spaces between the ground electrode and the first signal electrode can be inside a microwell. For example, a first cell of the first cells not trapped in the spaces between the ground electrode and the first signal electrode can be in a microwell, such as in the space between the second signal electrode and the ground electrode in the microwell. A first cell of the first cells not trapped in the spaces between the ground electrode and the first signal electrode can be on a surface of the bottom of the microwell (e.g., on the first signal electrode, on the second signal electrode, on the ground electrode, or on the surface of the bottom of the microwell other than any of the plurality of electrodes). A first cell of the first cells not trapped in the spaces between the ground electrode and the first signal electrode of a microwell can be outside all microwells. For example, a first cell of the first cells not trapped in the spaces between the ground electrode and the first signal electrode can be between two microwells of the plurality of microwells (e.g., on a surface between two microwells). Removing the first cells that are not trapped in the spaces between the ground electrode and the first signal electrode from the microfluidic device can comprise introducing a first washing buffer into the microfluidic device via the inlet of the microfluidic device and out of the microfluidic device via the outlet of the microfluidic device. The first washing buffer can wash away the first cells that are not trapped in the spaces between the ground electrode and the first signal electrode in the microwells from the microfluidic device. Introducing the first washing buffer can comprise injecting the first washing buffer into the inlet of the microfluidic device. The first loading buffer and the first washing buffer can be identical or different.

The method can comprise loading a plurality of second cells in a second loading buffer into the microfluidic device via the inlet of the microfluidic device. The first loading buffer and the second loading buffer can be identical or different. The method can comprise applying a second signal to the second signal electrode and the ground electrode of the microfluidic device. The second signal applied can result in the single second cells moving into the microwells by, for example, dielectrophoresis force. The second signal applied can result in partitioning of single second cells of the plurality of second cells into microwells of the plurality of microwells. The single second cells can be present in the microwells. A single second cell can be present in each of one or more microwells. The second signal applied can result in the single second cells moving to the spaces between the ground electrode and the second signal electrode in the microwells. The second signal applied can result in trapping of the single second cells in the spaces between the ground electrode and the second signal electrode in the microwells. The single second cells can be physically trapped in the spaces between the ground electrode and the second signal electrode in the microwells (e.g., by the contact with the ground electrode and the second signal electrode). The second signal can trap single second cells in the spaces between the ground electrode and the second signal electrode in the microwells.

The method can comprise removing second cells of the plurality of second cells in the microfluidic device that are not trapped in the spaces between the ground electrode and the second signal electrode in the microwells from the microfluidic device. A second cell of the second cells not trapped in the spaces between the ground electrode and the second signal electrode of a microwell can be inside a microwell. For example, a second cell of the second cells not trapped in the spaces between the ground electrode and the second signal electrode can be in a microwell, such as in the space between the first signal electrode and the ground electrode. As another example, a second cell of the second cells not trapped in the spaces between the ground electrode and the second signal electrode can be on a surface of the bottom of a microwell (e.g., on the first signal electrode, on the second signal electrode, on the ground electrode, or on the bottom surface of the microwell other than any of the plurality of electrodes). A second cell of the second cells not trapped in the space between the ground electrode and the second signal electrode can be outside all microwells. For example, a second cell of the second cells not trapped in the spaces between the ground electrode and the second signal electrode can be between two microwells of the plurality of microwells (e.g., on a surface between two microwells). Removing the second cells that are not trapped in the spaces between the ground electrode and the second signal electrode from the microfluidic device can comprise introducing a second washing buffer into the microfluidic device via the inlet of the microfluidic device and out of the microfluidic device via the outlet of the microfluidic device. The second washing buffer can wash away the second cells that are not trapped in the spaces between the ground electrode and the second signal electrode in the microwells from the microfluidic device. Introducing the second washing buffer can comprise injecting the second washing buffer into the inlet of the microfluidic device. The second loading buffer and the second washing buffer can be identical or different.

The first signal can also be applied after the single first cells are trapped in the spaces between the ground electrode and the first signal electrode in the microwells. For example, the first signal is also applied when removing the first cells that are not trapped in the space between the ground electrode and the first signal electrode, when loading the plurality of second cells, when applying the second signal, and/or when removing the second cells that are not trapped in the space between the ground electrode and the second signal electrode. The first signal can be continuously applied when partitioning the single first cells, when removing the first cells that are not trapped in the space between the ground electrode and the first signal electrode, when loading the plurality of second cells, when applying the second signal, and/or when removing the second cells that are not trapped in the space between the ground electrode and the second signal electrode.

The conductivity of the first loading buffer (or the second loading buffer, the first washing buffer, or the second washing buffer) can be different in different implementations. In some embodiments, the conductivity of the first loading buffer (or the second loading buffer, the first washing buffer, or the second washing buffer) is, is about, is at least, is at least about, is at most, or is at most about, 1 µS/m, 2 µS/m, 3 µS/m, 4 µS/m, 5 µS/m, 6 µS/m, 7 µS/m, 8 µS/m, 9 µS/m, 10 µS/m, 11 µS/m, 12 µS/m, 13 µS/m, 14 µS/m, 15 µS/m, 16 µS/m, 17 µS/m, 18 µS/m, 19 µS/m, 20 µS/m, 30 µS/m, 40 µS/m, 50 µS/m, 60 µS/m, 70 µS/m, 80 µS/m, 90 µS/m, 100 µS/m, 200 µS/m, 300 µS/m, 400 µS/m, 500 µS/m, 600 µS/m, 700 µS/m, 800 µS/m, 900 µS/m, 1 S/m, 2 S/m, 3 S/m, 4 S/m, 5 S/m, 6 S/m, 7 S/m, 8 S/m, 9 S/m, 10 S/m, or a number or a range between any two of these values. For example, the conductivity of the first loading buffer (or the second loading buffer, the first washing buffer, or the second washing buffer) is 10 µS/m to 1 S/m. The conductivity of the first loading buffer can be lower than (or higher than or the same as) the conductivity of the second loading buffer. The conductivity of the first loading buffer can be lower than (or higher than or the same as) the conductivity of the first washing buffer. The conductivity of the second loading buffer can be lower than (or higher than or the same as) the conductivity of the second washing buffer. The conductivity of the first washing buffer can be lower than (or higher than or the same as) the conductivity of the second washing buffer.

In some embodiments, the size (e.g., length or diameter) of a first cell of the plurality of first cells (or a second cell of the plurality of second cells), or an average size of the plurality of first cells (or the plurality of second cells) is, is about, is at least, is at least about, is at most, or is at most about, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 30 µm, 40 µm, 50 µm, 60 µm, 70 µm, 80 µm, 90 µm, 100 µm, or a number or a range between any two of these values. For example, the size of a first cell, or the average size of two or more first cells is 5 µm to 50 µm. As another example, the size of a second cell, or an average size of two or more second cells is 5 µm to 50 µm.

The percentage of the plurality of microwells each comprising a single first cell (or a single second cell, or a single first cell and a single second cell) can be different embodiments. In some embodiments, the percentage of the plurality of microwells each comprising a single first cell (or a single second cell, or a single first cell and a single second cell) is, is about, is at least, is at least about, is at most, or is at most about, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or a number or a range between any two of these values. For example, at least 50% of the plurality of microwells each comprises a single first cell. As another example, at least 50% of the plurality of microwells each comprises a single second cell. As a further example, at least 50% of the plurality of microwells each comprises a single first cell and a single second cell. The percentage of the plurality of microwells each comprising two or more first cells (or two or more second cells) can be different embodiments. In some embodiments, the percentage of the plurality of microwells each comprising two or more first cells (or two or more second cells) is, is about, is at least, is at least about, is at most, or is at most about, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, or a number or a range between any two of these values.

The first signal and/or the second signal can be different in different implementations. The first signal and the second signal can be identical. The first signal and the second signal can be different. One or more properties of the first signal and the second signal can be identical (e.g., the first signal and the second signal each comprises a sinusoidal wave), and one or more other properties of the first signal and the second signal can be different (e.g., the voltages and the frequencies of the first signal and the second signal can be different). In some embodiments, the first signal (or the second signal) comprises a sinusoidal wave, a square wave, a triangle wave, or a combination thereof. In some embodiments, the voltage of the first signal (or the second signal) is, is about, is at least, is at least about, is at most, or is at most about, 0.1 V, 0.2 V, 0.3 V, 0.4 V, 0.5 V, 0.6 V, 0.7 V, 0.8 V, 0.9 V, 1 V, 2 V, 3 V, 4 V, 5 V, 6 V, 7 V, 8 V, 9 V, 10 V, 11 V, 12 V, 13 V, 14 V, 15 V, 16 V, 17 V, 18 V, 19 V, 20 V, 21 V, 22 V, 23 V, 24 V, 25 V, 26 V, 27 V, 28 V, 29 V, 30 V, 31 V, 32 V, 33 V, 34 V, 35 V, 36 V, 37 V, 38 V, 39 V, 40 V, 41 V, 42 V, 43 V, 44 V, 45 V, 46 V, 47 V, 48 V, 49 V, 50 V, 60 V, 70 V, 80 V, 90 V, 100 V, 200V, 500 V, 1000 V, or a number or a range between any two of these values. For example, the voltage of the first signal is 1 V to 50 V. As another example, the voltage of the second signal is 1 V to 50 V. In some embodiments, the frequency of the first signal (or the second signal) is, is about, is at least, is at least about, is at most, or is at most about, 1 kilohertz (kHz), 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1 megahertz (MHz), 2 MHz, 3 MHz, 4 MHz, 5 MHz, 6 MHz, 7 MHz, 8 MHz, 9 MHz, 10 MHz, 20 MHz, 30 MHz, 40 MHz, 50 MHz, 60 MHz, 70 MHz, 80 MHz, 90 MHz, 100 MHz, 200 MHz, 300 MHz, 400 MHz, 500 MHz, 600 MHz, 700 MHz, 800 MHz, 900 MHz, 1000 MHz, or a number or a range between any two of these values. For example, the frequency of the first signal is 10 kHz to 100 MHz. As another example, the frequency of the second signal is 10 kHz to 100 MHz.

Cell-Cell Interaction of Interest

The method can comprise determining an interaction between the first cell and the second cell is of interest in a microwell of the microwells. The interaction of interest can comprise one or more characteristics of the first cell and/or the second cell. In some embodiments, the method comprises capturing an image (e.g., optical imaging) of the microwell. Determining the interaction between the first cell and the second cell is of interest in the microwell of the microwells can comprise determining the interaction between the first cell and the second cell is of interest in the microwell of the microwells using the image. Optical imaging can be performed to identify a microwell with an interaction between the first cell (e.g., a T cell) and the second cell (e.g., a B cell) that is of interest. In some embodiments, the method comprises culturing the first cell and the second cell in the microwell subsequent to partitioning the plurality of first cells and the plurality of second cells and prior to barcoding the plurality of sample nucleic acids. The interaction of interest can occur when culturing the first cell and the second cell.

In some embodiments, the characteristics of the first cell and/or the second cell comprises a phenotypic feature of the first cell and/or the second cell. The phenotypic feature can comprise cell viability, cell activity, a cell size, a nucleus size, cell morphology, nucleus morphology, a surface marker expression level, a protein expression level (e.g., a fluorescence protein expression level), a signaling dynamics, a signaling behavior, or a combination thereof. In some embodiments, the first cell interacts with the second cell. An interaction between the first cell and the second cell can be of interest. In some embodiments, the interaction between the first cell and the second cell that is of interest comprises an increase in cell proliferation, an increase in cell viability, an increase in cell movement, an increase in cell differentiation, an expression of a specific protein or an elevation of its expression level, a secretion of a specific cytokine or elevation of its secretion amount, or a combination thereof. In some embodiments, the interaction between the first cell and the second cell that is of interest comprises an inhibition in cell movement, a reduction of cell proliferation, a decrease in cell viability, an inhibition in cell differentiation, a decrease of protein expression, a decrease of cytokine secretion, or a combination thereof.

In some embodiments, the first cell is a T cell. The second cell can be a B cell (e.g., a B cell that is presenting an antigen, such as a specific antigen). In some embodiments, a microwell comprises at most one T cell and one or more B cells (e.g., 1, 2, 3, 4, 5, 6, 7, 8, 9, 10, 15, 20, 30, 40, 50, or more B cells). In some embodiments, a microwell comprises at most one B cell and one or more T cells (e.g., 1, 2, 3, 4, 5, 6, 7, 8, 9, 10, 15, 20, 30, 40, 50, or more T cells). The interaction between the first cell and the second cell can result in functionalization of the first cell. The interaction between the first cell and the second cell can result in death of the second cell. Functionalizing of the first cell can result in death of the second cell. In some embodiments, the first cell and/or the second cell is an immune cell. The immune cell can be a neutrophil, an eosinophil, a basophil, a mast cell, a monocyte, a macrophage, a dendritic cell, a natural killer cell, a lymphocyte, a B cell, a T cell, or a combination thereof.

In some embodiments, a first cell and a second cell can be incubated or cultured in a microwell to allow for the cells to interact in order to determine a cell-cell interaction or other cell-cell relationship. Interactions between cells can occur via intracellular proteins, extracellular matrix proteins or cell-surface proteins. For example, the first cell can display a receptor molecule capable of binding to a ligand molecule displayed on the second cell. The first cell can be an endothelial cell expressing a selectin and the second cell may be a leukocyte expressing a glycoprotein. In another example, the first cell can be a T cell displaying a T-cell receptor and the second cell can be an antigen presenting cell presenting an antigen. Using the method disclosed herein, the identity of cell-cell interaction and their genomic information can be correlated using the barcode sequencing.

The interaction between the first cell and the second cell can comprise an activating interaction of the first cell by the second cell, an inhibiting interaction of the first cell by the second cell, an inductive interaction of the first cell by the second cell, or a combination thereof. In some embodiments, the activating interaction can comprise an increase in a gene expression level and/or a protein expression level, an increase in cell proliferation, an increase in cell viability, an increase in cell movement, an increase in cell differentiation, an expression of a specific protein or an elevation of its expression level, a secretion of a specific cytokine or elevation of its secretion amount, or a combination thereof. In some embodiments, the inductive interaction can comprise production of proteins or small molecules such as cytokines or chemokines from the first cell and/or the second cell that can confer growth, survival, proliferation, or drug resistance of the first cell and/or the second cell. In some embodiments, the inhibiting interaction can comprise an inhibition of cell movement, a reduction of cell proliferation, a decrease in cell viability, an inhibition in cell differentiation, a decrease in protein expression, a decrease in cytokine secretion, or a combination thereof. For example, a first cell can be a T cell and a second cell can be a B cell, and the interaction between the T cell and the B cell can result in functionalization of the T cell and/or death of the B cell.

In some embodiments, the interaction between the first cell and the second cell that is of interest comprises (or results in) a change in a profile of the first cell and/or the second cell. The profile can comprise a transcriptomics profile. The profile can comprise a multi-omics profile. The multi-omics profile can comprise a genomics profile, a proteomics profile, a transcriptomics profile, an epigenomics profile, a metabolomics profile, a chromatics profile, a protein expression profile, a cytokine secretion profile, or a combination thereof. In some embodiments, the method comprises determining the profile of the first cell and/or the second cell using the nucleic acid sequences (for example, using the molecular label sequences and sequences of the sample nucleic acids (or portions thereof) present in the nucleic acid sequences) of the plurality of barcoded nucleic acids. The expression profile of the first cell and/or the second cell in the microwell determined can be different from an expression profile of the first cell or the second cell alone.

In some embodiments, the interaction between the first cell and the second cell in the microwell is determined to be of interest before (or after) the plurality of target nucleic acids associated with the first cell and/or the second cell in each of the microwells are barcoded and/or are pooled. The first microwell barcode sequence and the second microwell barcode sequence of the plurality of barcode molecules in the microwell can be identified before (or after) the plurality of target nucleic acids associated with the first cell and/or the second cell in each of the microwells are barcoded and/or are pooled.

In some embodiments, the interaction between the first cell and the second cell in the microwell is determined to be of interest before (or after) the barcoded nucleic acids of the plurality of barcoded nucleic acids released from (thus not attached to) each of the microwells, or any products thereof, are sequenced (such as sequencing library construction and sequencing of amplified barcoded nucleic acids). The first microwell barcode sequence and the second microwell barcode sequence of the plurality of barcode molecules in the microwell can be identified before (or after) the barcoded nucleic acids of the plurality of barcoded nucleic acids released from (thus not attached to) each of the microwells, or any products thereof, are sequenced (such as sequencing library construction and sequencing of amplified barcoded nucleic acids).

Target Nucleic Acids and Cells

A first cell can be associated with target nucleic acids. For example, a first cell can comprise mRNA or can be labeled with a nucleic acid (e.g., directly, or indirectly through a binding moiety, such as an antibody conjugated with the nucleic acid). A second cell can be associated with target nucleic acids. The target nucleic acids associated with a plurality of first cells and/or a plurality of second cells can comprise deoxyribonucleic acid (DNA), ribonucleic acid (RNA), and/or any combination or hybrid thereof. The target nucleic acids can be single-stranded or double-stranded, or contain portions of both double-stranded or single-stranded sequences. The target nucleic acids can contain any combination of nucleotides, including uracil, adenine, thymine, cytosine, guanine, inosine, xanthine, hypoxanthine, isocytosine, isoguanine and any nucleotide derivative thereof. As used herein, the term "nucleotide" may include naturally occurring nucleotides and nucleotide analogs, including both synthetic and naturally occurring species. The target nucleic acids can be genomic DNA (gDNA), mitochondrial DNA (mtDNA), messenger RNA (mRNA), ribosomal RNA (rRNA), transfer RNA (tRNA), nuclear RNA (nRNA), small interfering RNA (siRNA), small nuclear RNA (snRNA), small nucleolar RNA (snoRNA), small Cajal body-specific RNA (scaRNA), microRNA (miRNA), double stranded (dsRNA), ribozyme, riboswitch or viral RNA, or any nucleic acids that may be obtained from a sample.

The first cells and/or second cells partitioned (or distributed) into the microwells can be obtained from any organism of interest such as Monera (bacteria), Protista, Fungi, Plantae, and Animalia Kingdoms. A cell can be a mammalian cell, and particularly a human cell such as T cells, B cells, natural killer cells, stem cells, cancer cells, or any cells the functionality of which can be affected by the presence of other cells (e.g., cells involved in cell-cell interaction). In some embodiments, the first cell and/or the second cell can be an immune cell. For example, the cell can a neutrophil, an eosinophil, a basophil, a mast cell, a monocyte, a macrophage, a dendritic cell, a natural killer cell, a lymphocyte, a B cell, a T cell, or a combination thereof.

Cells described herein can be obtained from a cell sample. A cell sample comprising cells can be obtained from any source including a clinical sample and a derivative thereof, a biological sample and a derivative thereof, a forensic sample and a derivative thereof, and a combination thereof. A cell sample can be collected from any bodily fluids including, but not limited to, blood, urine, serum, lymph, saliva, anal, and vaginal secretions, perspiration and semen of any organism. A cell sample can be products of experimental manipulation including purification, cell culturation, cell isolation, cell separation, cell quantification, sample dilution, or any other cell sample processing approaches. A cell sample can be obtained by dissociation of any biopsy tissues of any organism including, but not limited to, skin, bone, hair, brain, liver, heart, kidney, spleen, pancreas, stomach, intestine, bladder, lung, esophagus.

Barcoding and Sequencing

The method can comprise barcoding a plurality of target nucleic acids associated with the first cell and/or the second cell in each of the microwells using the plurality of barcode molecules attached to the microwell to generate a plurality of barcoded nucleic acid molecules (see FIG. 5D for an example). Barcode molecules can each comprise a target binding sequence (e.g., a poly(dT) sequence). Target nucleic acids can be barcoded by the hybridization of the barcode molecules with the target nucleic acids (e.g., hybridization of the poly(dT) sequences of the barcode molecules and the poly(A) tails of mRNA target nucleic acids) and extension of the barcode molecules by a reverse transcriptase to generate barcoded nucleic acids (e.g., $1^{st}$ strand synthesis). The sequences of the barcode molecules are on the 5' end of the barcoded nucleic acids, and the reverse complements of the target nucleic acids are on the 3' end of the barcoded nucleic acids. Template switching can be performed to generate barcoded nucleic acids with additional sequences, such as amplification primer binding sequences. In some embodiments, barcode molecules each comprises a template switching sequence (e.g., a few Gs). Extension primers comprising target binding sequences (e.g., a poly(dT) sequence) can be introduced into the microwells. The extension primers can hybridize with target nucleic acids (e.g., by the hybridization of the poly(dT) sequences of the extension primers and the poly(A) tails of mRNA target nucleic acids) and extended by a reverse transcriptase to generate intermediate extension products. The reverse transcriptase that performs reverse transcription to generate the intermediate extension products can add a few deoxycytidines to the intermediate extension products in a template independent manner. The intermediate extension products can hybridize to the barcode molecules (by the hybridization of the deoxycytidines added and the guanine bases of the template switching sequences of the barcode molecules) and be extended by the reverse transcriptase to generate barcoded nucleic acids. The reverse complements of the sequences of the barcode molecules are on the 3' end of the barcoded nucleic acids, and the reverse complements of the target nucleic acids are on the 5' end of the barcoded nucleic acids.

The method can comprise sequencing (e.g., by sequencing by synthesis, sequencing by binding, sequencing by ligation, and/or nanopore sequencing) barcoded nucleic acids of the plurality of barcoded nucleic acids, or products thereof, release from (thus not attached to) each of the microwells, or any products thereof, to obtain sequencing data. The sequencing data can comprise nucleic acid sequences of the plurality of barcoded nucleic acids. In some embodiments, the method comprises pooling barcoded nucleic acids of the plurality of barcoded nucleic acids before determining the nucleic acid sequences of the plurality of barcoded nucleic acids. The method can comprise determining the nucleic acid sequences of the plurality of barcoded nucleic acids (e.g., the sequences of the molecular labels and/or the sequences of the target nucleic acids, or subsequences thereof) with the first microwell barcode sequence and the second microwell barcode sequence identified. A sequencing library of the barcoded nucleic acids can be constructed and used to determine the nucleic acid sequences of the plurality of barcoded nucleic acids.

In some embodiments, the plurality of barcoded nucleic acids comprises a plurality of double-stranded barcoded nucleic acids each comprising a first barcoded nucleic acid attached to the microwell and a second barcoded nucleic acid that is complementary and hybridized to the first barcoded nucleic acid (see FIG. 6A for an example). The method can comprise denaturing a double-stranded barcoded nucleic acid to generate a single-stranded first barcoded nucleic acids attached to the microwell (e.g., $1^{st}$ strand cDNA at the bottom of FIG. 6A) and a single-stranded second barcoded nucleic acids not attached to (e.g., released from) the microwell (e.g., $2^{nd}$ strand cDNA at the bottom of FIG. 6A). The method can comprise denaturing the plurality of double-stranded barcoded nucleic acid to generate single-stranded first barcoded nucleic acids attached to the microwell and a single-stranded second barcoded nucleic acids not attached to (e.g., released from) the microwell. The method can comprise collecting (e.g., pooling) the single-stranded second barcoded nucleic acids via the outlet of the microfluidic device. Sequencing the barcoded nucleic acids released from (thus not attached to) each of the microwells, or any product thereof, can comprise sequencing the single-stranded second barcoded nucleic acids collected, or any products thereof, to obtain nucleic acid sequences of the plurality of barcoded nucleic acids.

In some embodiments, the plurality of barcoded nucleic acids comprises a plurality of single-stranded or partially single-stranded barcoded nucleic acids. The method can comprise detaching (or releasing) the plurality of barcoded nucleic acid molecules from the microwell. Detaching the plurality of barcoded nucleic acid molecules from the microwell can comprise detaching the plurality of barcoded nucleic acid molecules from the microwell with thermal dissociation, thermal cleavage, chemical dissociation, chemical cleavage, enzymatic cleavage (e.g., using an endonuclease, such as a restriction enzyme), photocleavage (e.g., UV photocleavage), or a combination thereof.

In some embodiments, the barcode molecules can comprise a sequence that is a restriction enzyme recognition sequence (see FIG. 6B for an example). Detaching the plurality of barcoded nucleic acid molecules comprises introducing a single-stranded recognition oligonucleotide capable of hybridizing (e.g., complementary) to (i) the restriction enzyme recognition sequence, (ii) the restriction enzyme recognition sequence and the primer sequence, or (iii) the restriction enzyme recognition sequence and a portion of the primer sequence (illustrated in FIG. 6B). The single-stranded recognition oligonucleotide can be a reverse complement of the restriction enzyme recognition sequence, or the restriction enzyme recognition sequence and the primer sequence, or the restriction enzyme recognition sequence and a portion of the primer sequence. The method can include hybridizing (e.g., heating up and cooling down the microfluidic device) the single-stranded recognition oligonucleotide to (i) the restriction enzyme recognition sequence, (ii) the restriction enzyme recognition sequence and the primer sequence, or (iii) the restriction enzyme recognition sequence and a portion of the primer sequence, of one, one or more, or each of the plurality of barcoded nucleic acids (single-stranded barcoded nucleic acids or partially single-stranded barcoded nucleic acids) to generate a partially double-stranded barcoded nucleic acid (see FIG. 6B for an illustration). Detaching the plurality of barcoded nucleic acid molecules can comprise digesting the partially double-stranded barcoded nucleic acids at the enzyme recognition sequence using a restriction enzyme (e.g., EcoRI illustrated in FIG. 6B) capable of digesting the restriction enzyme recognition sequence to detach (or release) the plurality of barcoded nucleic acid molecules from the microwell. In some embodiments, detaching the plurality of barcoded nucleic acid molecules can comprise digesting the plurality of partially single-stranded barcoded nucleic acids generated at the enzyme recognition sequences using an endonuclease to detach (or release) the plurality of barcoded nucleic acid molecules from the microwell. In some embodiments, the restriction enzyme is a type I restriction enzyme, a type II restriction enzyme, a type III restriction enzyme, type IV restriction enzyme, or a type V restriction enzyme. In some embodiments, the restriction enzyme is EcoRI, EcoRII, BamHI, HindIII, TaqI, NotI, HinFI, Sau3AI, PvuII, SmaI, HaeIII, HgaI, AluI, EcoRV, EcoP15I, KpnI, PstI, SacI, SalI, ScaI, SpeI, SphI, StuI, or XbaI.

Figure 6C:
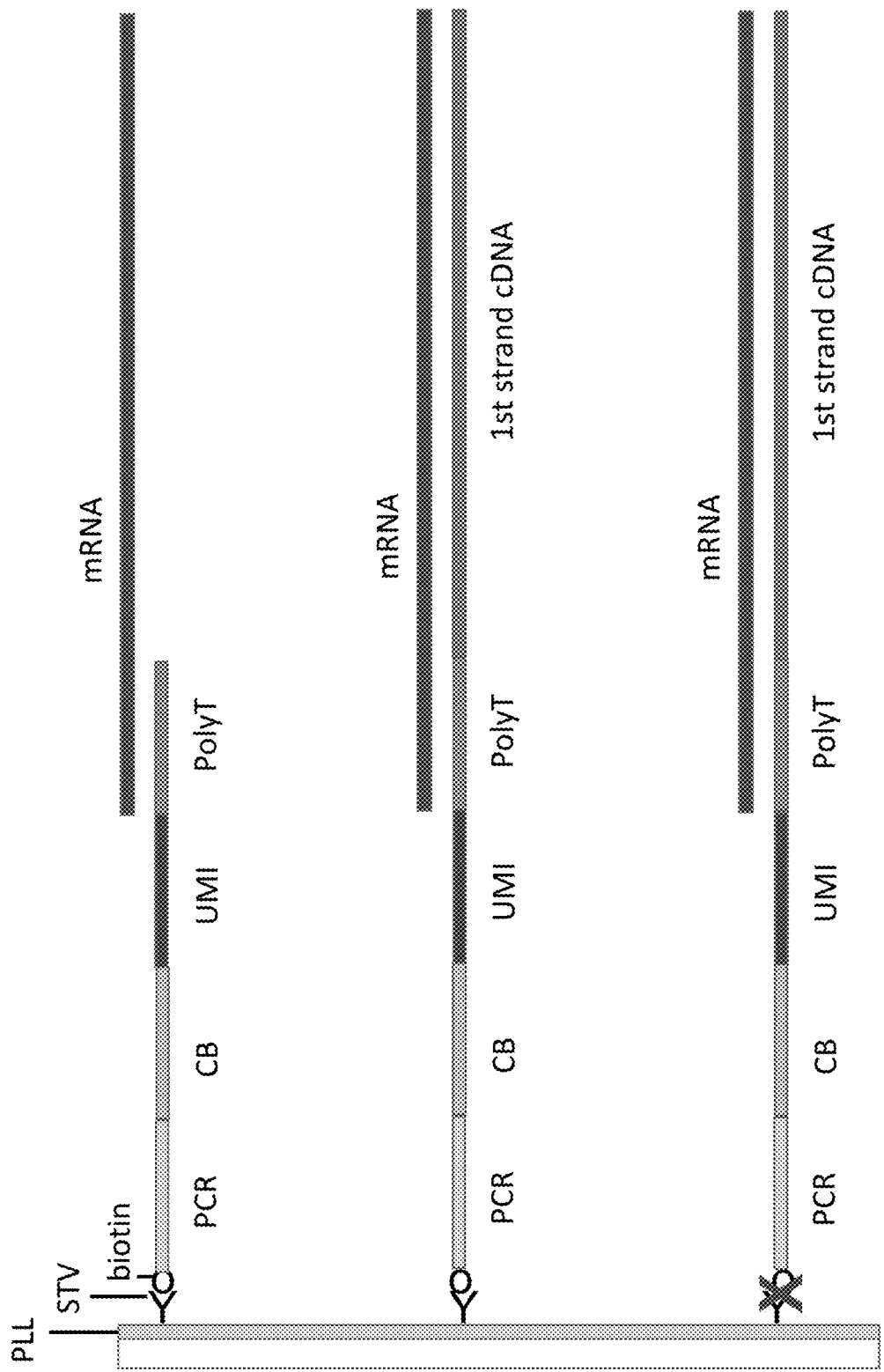

In some embodiments, the thermal dissociation comprises heating the microfluidic device to a predetermined temperature (to denature the streptavidin molecules and/or to degrade the poly(L-lysine) layer) to detach (or release) the plurality of barcoded nucleic acid molecules from the microwell. The predetermined temperature can be, be about, be at least, be at least about, be at most, or be at most about, 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., 90° C., 91° C., 92° C., 93° C., 94° C., 95° C., 96° C., 97° C., 98° C., 99° C., 100° C., or a number or a range between any two of these values. In some embodiments, the chemical dissociation comprises contacting the streptavidin molecules with a chemical (e.g., formamide) to dissociate the binding of the biotin molecules and the streptavidin molecules to detach (or release) the plurality of barcoded nucleic acid molecules from the microwell (see FIG. 6C for an illustration).

Pooling

In some embodiments, the method comprises pooling barcoded nucleic acids of the plurality of barcoded nucleic acids after barcoding the barcoded nucleic acids prior to sequencing the barcoded nucleic acids, or products thereof (see FIG. 5E for an example). In some embodiments, pooling barcoded nucleic acids occurs after generating the double-stranded barcoded nucleic acids (e.g., see FIGS. 5E and 6A for examples). In some embodiments, pooling barcoded nucleic acids occurs after denaturizing (such as heat denaturization or chemical denaturization with, for example, sodium hydroxide) the double-stranded barcoded nucleic acids which generates two single-stranded barcoded nucleic acids, one retained in the microwell and one released from the barcoded nucleic acids retained in the microwell. In some embodiments, pooling barcoded nucleic acids comprises collecting the single-stranded barcoded nucleic acids released from the barcoded nucleic acids retained in the microwell.

Single-stranded barcoded nucleic acids released into bulk can be collected by pooling, and the barcoded nucleic acids retained in the microwells are not pooled. According the origin of the pooled barcoded nucleic acids can be traced, for example, to its original location in the plurality of microwells. The pooled barcoded nucleic acids can be single-stranded or double-stranded (e.g., generated from the single-stranded pooled barcoded nucleic acids by PCR amplification). The pooled barcoded nucleic acids (e.g., barcoded cDNA) can be purified and/or amplified prior to sequencing library construction. The pooled barcoded nucleic acids with desired length may be selected.

Sequencing Library Construction

The barcoded nucleic acids (e.g., pooled barcoded nucleic acids) can be further processed prior to sequencing to generate processed barcoded nucleic acids. For example, the method can include amplification of barcoded nucleic acids, fragmentation of amplified barcoded nucleic acids, end repair of fragmented barcoded nucleic acids, A-tailing of fragmented barcoded nucleic acids that have been end-repaired to facilitate ligation to adapters, and attaching (e.g., by ligation and/or PCR) one or more sequencing primer sequences (e.g., a Read 1 sequence and/or a Read 2 sequence), sample indexes (e.g., short sequences specific to a given sample library), and/or flow cell binding sequences (e.g., P5 and/or P7). Additional PCR amplification can also be performed. This process can also be referred to as sequencing library construction.

In some embodiments, the method comprises performing a polymerase chain reaction (PCR) in bulk, subsequent to the pooling, on the pooled barcoded nucleic acids to generate amplified barcoded nucleic acids. PCR amplification can be carried out to generate sufficient mass for the subsequent library construction processes. PCR amplification can also be performed with primers specific to target nucleic acids of interest such as T-cell receptor (TCR) or B-cell receptor (BCR) constant regions.

In some embodiments, the method comprises fragmenting (e.g., via enzymatic fragmentation, mechanical force, chemical treatment, etc.) the pooled barcoded nucleic acids to generate fragmented barcoded nucleic acids. Fragmentation can be carried out by any suitable process such as physical fragmentation, enzymatic fragmentation, or a combination of both. For example, the barcoded nucleic acids can be sheared physically using acoustics, nebulization, centrifugal force, needles, or hydrodynamics. The barcoded nucleic acids can also be fragmented using enzymes such as restriction enzymes or endonucleases.

Fragmentation yields fragments of a desired size for subsequent sequencing. The desired sizes of the fragmented nucleic acids are determined by the limitations of the next generation sequencing instrumentation and by the specific sequencing application as will be understood by a person skilled in the art. For example, when using Illumina technology, the fragmented nucleic acids can have a length of between about 50 bases to about 1,500 bases. In some embodiments, the fragmented barcoded nucleic acids have about 400 bp to 700 bp in length.

Fragmented barcoded nucleic acids can undergo end-repair and A-tailing (to add one or more adenine bases) to form an A overhang. This A overhang allows adapter containing one or more thymine overhanging bases to base pair with the fragmented barcoded nucleic acids.

Fragmented barcoded nucleic acids can be further processed by adding additional sequences (e.g., adapters) for use in sequencing based on specific sequencing platforms. Adapters can be attached to the fragmented barcoded nucleic acids by ligation using a ligase and/or PCR. For example, fragmented barcoded nucleic acids can be processed by adding one or more sequencing primer sequences. The sequencing primer sequences can comprise a Read 1 sequence and/or a Read 2 sequence. An adapter comprising a primer sequence can be ligated to the fragmented barcoded nucleic acids after, for example, end-repair and A tailing, using a ligase. The adaptor can include one or more thymine (T) bases that can hybridize to the one or more A bases added by A tailing. An adaptor can be, for example, partially double-stranded or double stranded.

The adapter can also include platform-specific sequences for fragment recognition by specific sequencing instrument. For example, the adapter can comprise a sequence for attaching the fragmented barcoded nucleic acids to a flow well of Illumina platforms, such as a P5 sequence, a P7 sequence, or a portion thereof. Different adapter sequences can be used for different next generation sequencing instrument as will be understood by a person skilled in the art.

The adapter can also contain sample indexes to identify samples and to permit multiplexing. Sample indexes enable multiple samples to be sequenced together (i.e., multiplexed) on the same instrument flow cell as will be understood by a person skilled in the art. Adapters can comprise a single sample index or a dual sample indexes depending on the implementations such as the number of libraries combined and the level of accuracy desired.

In some embodiments, the amplified barcoded nucleic acids generated from sequencing library construction can include a P5 sequence, a sample index, a Read 1 sequence, a combinatorial microwell barcode, a molecular label (e.g., a UMI), a target biding region (e.g., a poly(dT) sequence), a sequence of a sample nucleic acid or a portion thereof, a Read 2 sequence, a sample index, and/or a P7 sequence (e.g., from 5'-end to 3'-end). In some embodiments, the processed barcoded nucleic acids can include a P5 sequence, a sample index, a Read 1 sequence, a combinatorial microwell barcode sequence, a molecular label (e.g., a UMI), a sequence of a template switching oligonucleotide, a sequence of a sample nucleic acid or a portion thereof, a Read 2 sequence, a sample index, and/or a P7 sequence (e.g., from 5'-end to 3'-end).

In some embodiments, sequencing the barcoded nucleic acids, or products thereof, comprises sequencing products of the barcoded nucleic acids. Products of the barcoded nucleic acids can include the processed nucleic acids generated by any step of the sequencing library construction process, such as amplified barcoded nucleic acids, fragmented barcoded nucleic acids, fragmented barcoded nucleic acids comprising additional sequences such as one or more sequencing primer sequences and/or adapter sequences described herein.

Sequencing Barcoded Nucleic Acids

The method disclosed herein can comprise sequencing the plurality of barcoded nucleic acids or products thereof to obtain nucleic acid sequences of the plurality of barcoded nucleic acids to generate sequencing data. The barcoded nucleic acids generated by the method disclosed herein can comprise barcoded nucleic acids retained in a microwell and barcoded nucleic acids pooled, from each partition, into a pooled mixture outside the microwells. The sequences of the pooled barcoded nucleic acids can be determined by, for example, sequencing by synthesis, sequencing by binding, sequencing by ligation, and/or nanopore sequencing.

In some embodiments, sequencing the plurality of barcoded nucleic acids or products thereof comprises sequencing the pooled barcoded nucleic acids to obtain nucleic acid sequences of the pooled barcoded nucleic acids. As used herein, a "sequence" can refer to the sequence, a complementary sequence thereof (e.g., a reverse, a compliment, or a reverse complement), the full-length sequence, a subsequence, or a combination thereof. The nucleic acids sequences of the pooled barcoded nucleic acids can each comprise a sequence of a barcode molecule (e.g., the combinatorial microwell barcode and the molecular label) and a sequence of a sample nucleic acid associated with the first cell and/or the second cell or a reverse complement thereof.

Post-Sequencing Analysis

The obtained nucleic acid sequences of the plurality of barcoded nucleic acids (e.g., nucleic acid sequences of pooled barcoded nucleic acids) can be subjected to any downstream post-sequencing data analysis as will be understood by a person skilled in the art. The sequence data can undergo a quality control process to remove adapter sequences, low-quality reads, uncalled bases, and/or to filter out contaminants. The high-quality data obtained from the quality control can be mapped or aligned to a reference genome or assembled de novo.

Gene expression quantification and differential expression analysis can be carried out to identify genes whose expression differs under different conditions, such as, external stimuli and/or signals received from other cells through cell-cell interaction.

In some embodiments, the method can comprise determining a profile (e.g., an expression profile, an omics profile, or a multi-omics profile) of the sample nucleic acids associated with the first cell and/or the second cell. A profile can be a single omics profile, such as a transcriptome profile. The profile can be a multi-omics profile, which can include profiles of genome (e.g., a genomics profile), proteome (e.g., a proteomics profile), transcriptome (e.g., a transcriptomics profile), epigenome (e.g., an epigenomics profile), metabolome (e.g., a metabolomics profile), and/or microbiome (e.g., microbiome profile). The profile can include an RNA expression profile. The profile can include a protein expression profile. The expression profile can comprise an RNA expression profile, an mRNA expression profile, and/or a protein expression profile. The profile can be a profile of one cell (e.g., a first cell or a second cell). The profiles can be profiles of two cells from a same partition (e.g., a first cell and a second cell). A profile can also be a profile of one or more target nucleic acids (e.g., gene markers) or a selection of genes associated with the first cell and/or the second cell.

In some embodiments, the method disclosed herein can be used to determine a profile (e.g., an expression profile, an omics profile, or a multi-omics profile) of a cell involved in cell-cell interaction, such as to detect changes in gene expression profile of the cell in terms of identification of RNA transcripts and their quantitation. In some embodiments, a profile of a first cell and/or a second cell can be determined using the nucleic acid sequences of the plurality barcoded nucleic acids. For example, determining the profile of the first cell and/or the second cell can comprise determining the profile of the first cell and/or the second cell using the molecular label sequences (e.g., UMI) and sequences of the sample nucleic acids, or a portion thereof, present in the nucleic acid sequences.

In some embodiments, the first cell and the second cell when in contact (or under incubation) with each other can have an expression profile different from an expression profile of the first cell or the second cell alone. A differential expression analysis can be performed to detect quantitative changes in expression levels between the cell involved in a cell-cell interaction and the cell alone. Genes expressed differentially can be detected. Differential expression profile can be correlated to the cell functionality and/or cell's phenotypes.

Therefore, in some embodiments, an interaction between the first cell and the second cell may be of interest. The interaction between the first cell and the second cell that is of interest can comprise a change in a profile of the first cell and/or the second cell. The profile can comprise a transcriptomics profile, a multi-omics profile such as a genomics profile, a proteomics profile, a transcriptomics profile, an epigenomics profile, a metabolomics profile, a chromatics profile, or a combination thereof. In some embodiments, the profile of the first cell and/or the second cell in the microwell can be different from a profile of the first cell or the second cell alone.

Correlating Sequence Information with Cell-Cell Interaction

In some embodiments, the method comprises linking a profile of the first cell and/or the second cell in the microwell determined with the characteristics of the first cell and/or the second cell in the microwell (or with the phenotypic feature of the first cell and/or the second cell, or with the interaction of interest between the first cell and the second cell) using (i) the combinatorial microwell barcode sequence of the microwell and (ii) the combinatorial microwell barcode sequence of the barcoded nucleic acid, or products thereof (such as pooled barcoded nucleic acid, or the amplified nucleic acids) in the sequencing data.

Matching barcode sequences. The nucleic acid sequences of barcoded nucleic acids determined can comprise nucleic acid sequences of the barcoded nucleic acids, or products thereof. For example, two barcoded nucleic acids of the plurality of barcoded nucleic acids can comprise a pooled barcoded nucleic acid of the pooled barcoded nucleic acids. The combinatorial microwell barcode sequence of the microwell and the combinatorial microwell barcode sequence of the pooled barcoded nucleic acid can be identical. The combinatorial microwell barcode sequence of the pooled barcoded nucleic acids can be matched to the combinatorial microwell barcode sequence of the microwell. By matching the two combinatorial microwell barcode sequences, the nucleic acid sequences of the pooled barcoded nucleic acids associated with the first cell and/or the second cell can be traced back to the location of the microwell the barcoded nucleic acids are pooled from (or the microwell the first cell and/or the second cell is originally partitioned into).

In some embodiments, the method can comprise recording a location of the microwell comprising the first cell and/or the second cell, or characteristics of the first cell and/or the second cell in the microwell to provide a recorded location of the microwell, or characteristics of the first cell and/or the second cell in the microwell. Recording the location of a microwell can be performed subsequent to partitioning a plurality of first cells and/or a plurality of second cells. Recording the location of a microwell can be performed prior to barcoding the sample nucleic acids. Recording the location of the microwell comprising a first cell and a second cell, or characteristics of the first cell and the second cell therein can comprise optically imaging the microwell, or the first cell and the second cell therein. The location of the microwell can be associated with (e.g., linked to) a particular combinatorial microwell barcode sequence, which can be predetermined based on, for example, the row position and the column position of the microwell.

The method can comprise: identifying the first microwell barcode sequence and the second microwell barcode sequence of the plurality of barcode molecules in the microwell based on a location of the microwell in the plurality of microwells. In some embodiments, identifying the first microwell barcode sequence and the second microwell barcode sequence comprises: identifying the first microwell barcode sequence and the second microwell barcode sequence of the plurality of barcode molecules in the microwell based on a location in a first group (e.g., a row location) and a location in a second group (e.g., a column location) of the microwell in the plurality of microwells.

In some embodiments, the method can include matching a recorded location of the microwell with the nucleic acid sequences of the pooled barcoded nucleic acids. The recorded location of the microwell comprising a first cell and a second cell and/or the characteristic of the first cell and/or the second cell in the microwell can be linked with the combinatorial microwell barcode sequence of the microwell. The combinatorial microwell barcode sequence of the microwell can then be linked to the combinatorial microwell barcode sequence of the barcoded nucleic acids (e.g., pooled barcoded acids) originating from target nucleic acids associated with the first cell and/or the second cell.

Matching sequences with cell-cell interaction. In some embodiments, the method can comprise recording a location of the microwell comprising a first cell and a second cell. The first cell and second cell can potentially interact with each other and exhibit phenotypic observable features of interest. In some embodiments, prior to recording a location of the microwell, the cells can be cultured for a certain time under a condition to allow the first cell and the second cell to interact.

In some embodiments, the method can include recording a location of the microwell comprising a first cell and a second cell. The method can comprise recording characteristics of the first cell and/or the second cell in the microwell. The characteristics can comprise phenotypic features of the first cell and the second cell in the microwell. The phenotypic features of a pair of interacting cells can be used to interpret the nature of the cell-cell interaction.

Phenotypic features obtained for the cells in each partition can include any phenotypic observables such as cellular metabolism, cell cycle states, cell signaling, cell viability, a cell size, a nucleus size, cell morphology or nucleus information, a surface marker expression level, protein expression level (e.g., fluorescence protein expression level), cytokine expression profile, other related signaling dynamics and behavior. Phenotypic features can be obtained using any suitable approach including cell imaging, immunofluorescence, and protein secretion assays. For example, phenotypic features can be obtained using a fluorescence microscopy, a fluorescence imaging, phase contrast, differential interference contrast, phase-imaging, magnetic resonance imaging, Raman scattering imaging, or a combination thereof.

In some embodiments, the method can comprise linking the sequence data (e.g., a profile) of the first cell and/or the second cell in the microwell with the characteristics of the first cell and/or the second cell in the microwell, the phenotypic feature of the first cell and/or the second cell, and/or the interaction of interest between the first cell and the second cell using the combinatorial microwell barcode sequence of the microwell and the combinatorial microwell barcode sequence of the pooled barcoded nucleic acid in the sequencing data.

Therefore, by attaching identical combinatorial microwell barcodes sequence to target nucleic acids associated with one or more interacting cells (e.g., a pair of interacting cells) within a given microwell and matching such combinatorial microwell barcode sequences with the combinatorial microwell barcode sequences associated with the microwell, the sequences of the target nucleic acids of the interacting cells having the identical combinatorial microwell barcode sequences can be tracked to that partition. Cell characteristics such as phenotypic observables (e.g., cellular metabolism, cell cycle states, cell signaling, cell viability etc.) of the interacting cells can be obtained. Cell nucleic acid sequences or a profile to the cell functionality and the nature of the cell-cell interaction can thus be linked.

Kits

Disclosed herein include kits for nucleic acid sequencing, for example, to determine cell-cell interactions. In some embodiments, a kit for nucleic acid sequence comprises a microfluidic device of the present disclosure. The kit can comprise instructions for using the microfluidic device.

Systems

Also disclosed herein include systems for nucleic acid sequence, for example, to determine cell-cell interactions. In some embodiments, a system for nucleic acid sequencing comprises: a holder of a microfluidic device of the present disclosure. The system can comprise: an inlet fluidic interface (e.g., a connector or a tube) for fluidic communication with the inlet of the microfluidic device. The system can comprise: an outlet fluidic interface (e.g., a connector or a tube) for fluidic communication with the outlet of the microfluidic device. The system can comprise: one or more pumps for introducing one or more fluids into the microfluidic device via the inlet fluidic interface and the inlet of the microfluidic device.

Microfluidic Device Fabrication

Disclosed herein include embodiments of a method of making (or fabricating) a microfluidic device. In some embodiments, a method of making (or fabricating) a microfluidic device comprises generating a plurality of electrodes on a substrate (see Example 1 for an illustration). The plurality of electrodes can comprise a ground electrode, a first signal electrode, and a second signal electrode. The method can comprise generating a microwell array on the substrate and the plurality of electrodes and comprising a plurality of microwells (see Example 1 for an illustration). The method can comprise providing a first patterning device comprising a plurality of first flow channels with a first pattern (e.g., the patterning device shown in FIG. 2A). One or more (or all) first flow channels can be parallel or substantially parallel. In some embodiments, the plurality of first flow channels comprises, comprises about, comprises at least, comprises at least about, comprises at most, or comprises at most about, 5, 6, 7, 8, 9, 10, 111, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900, 1000, 2000, 3000, 4000, 5000, 6000, 7000, 8000, 9000, 10000, or a number or a range between any two of these values, first flow channels.

The method can comprise aligning the first patterning device with the microwell array such that microwells of the microwell array in a first group (e.g., microwells in a row) are aligned to one of the plurality of first flow channels. The method can comprise introducing into each of the plurality of first flow channels a solution comprising a plurality of first barcode molecules (e.g., B sequence shown in FIG. 4). The plurality of first barcode molecules in one solution can comprise an identical first microwell barcode sequence (e.g., Barcode B in FIG. 4). The pluralities of first barcode molecules in different solutions can comprise different first microwell barcode sequences. First barcode molecules of the plurality of first barcode molecules can be attached to the microwells of the microwell array in the first group (e.g., microwells in a row) aligned to first parallel flow channel. For example, first barcode molecules each comprises a biotin molecule. The substrate can comprise a poly(L-lysine) layer. streptavidin molecules can bind to the poly(L-lysine) layer. The first barcode molecules can be attached to the substrate by the binding of the biotin molecules of the first barcode molecules to the streptavidin molecules. In some embodiments, the first barcode molecule comprises a primer sequence (e.g., a PCR adaptor sequence shown in FIG. 4), a molecular label (e.g., a UMI shown in FIG. 4), a first microwell barcode sequence (e.g., Barcode B in FIG. 4), and/or a first linker sequence (e.g., B linker in FIG. 4). In some embodiments, the first barcode molecule comprises a molecular label. Example 3 provides a non-limiting exemplary embodiment of introducing first barcode molecules (referred to as B sequence in the example) to microwells and attaching the first barcode molecules to the substrate.

Figure 2B:
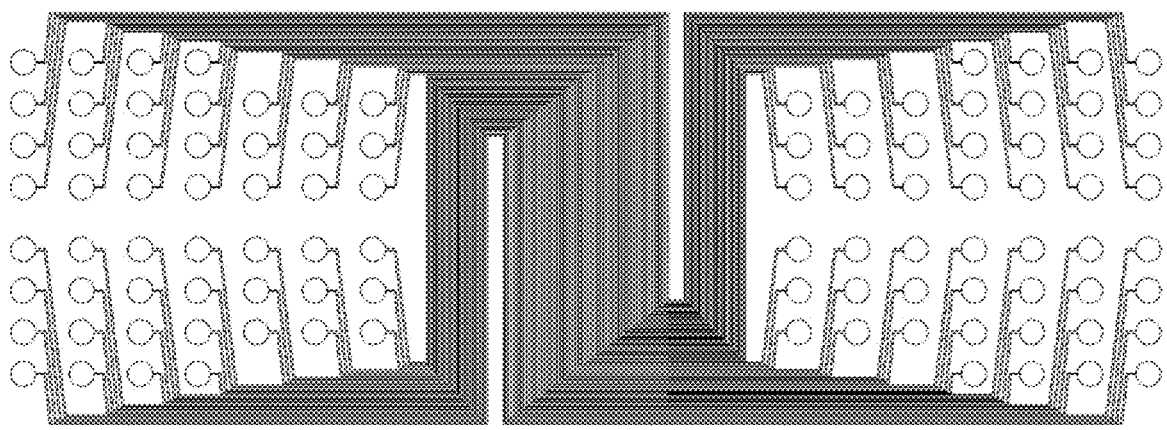

The method can comprise providing a second patterning device comprising a plurality of second flow channels with a second pattern (e.g., the patterning device shown in FIG. 2B). Two or more (or all) second flow channels can be parallel or substantially parallel to each other. In some embodiments, the plurality of second flow channels comprises, comprises about, comprises at least, comprises at least about, comprises at most, or comprises at most about, 5, 6, 7, 8, 9, 10, 111, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 96, 97, 98, 99, 100, 200, 300, 400, 500, 600, 700, 800, 900, 1000, 2000, 3000, 4000, 5000, 6000, 7000, 8000, 9000, 10000, or a number or a range between any two of these values, second flow channels. The number of first flow channels can be the same as (or more than, or less than) the number of second flow channels.

The method can comprise aligning the second patterning device with the microwell array such that flow cells of the microwell array in a second group (e.g., microwells in a column) are aligned to one of the plurality of second parallel flow channels. The method can comprise introducing into each of the second parallel flow channels a solution comprising a plurality of second barcode molecules (e.g., A sequence in FIG. 4). The plurality of second barcode molecules in one solution comprises an identical second microwell barcode sequence. The pluralities of second barcode molecules in different solutions can comprise different second microwell barcode sequences. Second barcode molecules of the plurality of second barcode molecules can be attached to the first barcode molecules attached to the microwells of the microwell array in the first group aligned to second parallel flow channel. For example, a first barcode molecule can hybridize to one part of a linker molecule (e.g., ligation linker in FIG. 4). A second barcode molecule can hybridize to another part of the linker molecule. One end (e.g., 3' end) of the first barcode molecule can be brought to close proximity to one end (e.g., 5' end) of the second barcode molecule by the linker molecule and can be ligated with, for example, a ligase. In some embodiments, the second barcode molecule comprises a second linker sequence (e.g., A linker shown in FIG. 4), a second microwell barcode sequence (e.g., Barcode A in FIG. 4), and a target binding sequence (e.g., poly-T in FIG. 4). Two or more (e.g., 100, 200, 300, 400, 500, 600, 700, 800, 900, 1000, 2000, 3000, 4000, 5000, 6000, 7000, 8000, 9000, 10000, 100000, 1000000, 10000000, 100000000, 1000000000, or more or less) second barcode molecules can comprise different molecular labels. Two or more (e.g., 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, 10000, or more or less) second barcode molecules can comprise identical molecular labels. Example 3 provides a non-limiting exemplary embodiment of introducing second barcode molecules (referred to as A sequence in the example) to microwells and attaching the second barcode molecules to the substrate using a linker (a ligation linker in the example).

In some embodiments, the first microwell barcode sequences of the pluralities of barcode molecules are identical in microwells in each first group (e.g., each row) of the microwell array and different in microwells in different first groups (e.g., different rows) of the microwell array. Second microwell barcode sequences of the pluralities of barcode molecules can be identical in microwells in each second group (e.g., each column) of the microwell array and different in microwells in different second groups (e.g., different columns) of the microwell array.

In some embodiments, the solution comprising the plurality of second barcode molecules comprises linker molecules. The linker molecules can comprise an identical sequence. The plurality of second barcode molecules can be hybridized to the linker molecules in the solution. In some embodiments, the solution comprising the plurality of first barcode molecules comprises linker molecules comprising an identical sequence. The plurality of first barcode molecules can be hybridized to the linker molecules in the solution. For example, a second barcode molecule can be complementary to a part of the linker and hybridize to that part of the linker, and a first barcode molecule can be complementary to another part of the linker and hybridize to this other part of the linker.

In some embodiments, the microwells of the plurality of microwells in a first group comprise microwells of a row of the plurality of microwells. The microwells of the plurality of microwells in a second group comprise microwells of a column of the plurality of microwells. In some embodiments, the microwells of the plurality of microwells in a first group comprise microwells of a column of the plurality of microwells. The microwells of the plurality of microwells in a second group can comprise microwells of a row of the plurality of microwells.

In some embodiments, a direction of the first flow channel (or a part of the flow channel, such as the part shown in the middle of FIG. 2A), when the first patterning device is aligned with the microwell array, and a direction of the second flow channel (or a part of the flow channel, such as the part shown in the middle of FIG. 2B), when the second patterning device is aligned with the microwell array is perpendicular (or substantially perpendicular) to each other. For example, when the patterning devices illustrated in FIG. 2A and FIG. 2B are aligned to the microwell array, the flow channels at the center of the patterning device shown in FIG. 2A and the flow channels at the center of the patterning device shown in FIG. 2B are perpendicular to each other.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

EXAMPLES

Some aspects of the embodiments discussed above are disclosed in further detail in the following examples, which are not in any way intended to limit the scope of the present disclosure.

Example 1

Dielectrophoresis Microfluidic Device Fabrication

This example describes an exemplary process of fabricating a dielectrophoresis (DEP) microfluidic device described herein. The dielectrophoresis microfluidic device has a polydimethylsilioxane (PDMS) flow channel bonded to a glass substrate. The glass substrate has been patterned with electrodes and microwell array as shown in FIGS. 1A-1E.

A glass wafer was cleaned by acid solution and deionized water before usage. After drying, the glass wafer was spin-coated with a photoresist, hexamethyldisilazane (HDMS), and then exposed to UV light under a designed mask. After photoresist develop process, the pattern on the mask was transferred to the photoresist layer. Titanium and gold were evaporated subsequently to the patterned photoresist to form an alloy layer. Then, the glass wafer was soaked in Nanostrip to remove the photoresist layer and lift off the alloy layer to form electrode patterns on the glass wafer. FIGS. 1A-1B show the cross-section view and top view of electrode patterns on a glass wafer, respectively. Then, a negative photoresist SU8 was applied to the surface of the electrodes. After photolithography, a microwell array formed by the negative photoresist was generated on the glass wafer. The microwell array was aligned with the electrode patterns. Each microwell covered the two spacing between the three electrodes and can hold the particles trapped by the electrodes. This glass wafer with patterns was further bonded with a PDMS flow channel to form a closed microfluidic device. The glass wafer with pattern can be further modified with different surface treatment before bonded to the PDMS flow channel.

Example 2

Patterning Flow Channel Fabrication

This example describes an exemplary process of fabricating patterning flow channels which can be used for patterning a DEP microfluidic device.

The patterning flow channel was made from polydimethylsilioxane (PDMS). A silicon wafer with designed flow channel pattern was used as a mold. PDMS (Sylgard 184) was cast over the silicon mold pretreated with Trimethylchlorosilane (TMCS) and cured at 80° C. for 1 hour. Then the cured PDMS was peeled from the silicon mold with flow channel pattern on its surface. The flow channel pattern had two designs, flow channel pattern A and flow channel pattern B. Both flow channel patterns can fit into a microscope slide with 25 mm×75 mm in dimension. Flow channel pattern A had 50 parallel flow channels aligned to the longitude direction of the microscope slide (FIG. 2A). Flow channel pattern B had 50 parallel flow channels aligned to the latitude direction of the microscope slide (FIG. 2B). When aligning the central area of flow channel pattern A with the central area of flow channel pattern B, the parallel flow channels in pattern A and the parallel flow channels in pattern B would form a crossbar pattern.

Example 3

Barcode Patterning on DEP Microwell Array

This example describes an exemplary process of barcoding each well of a microwell array of a DEP microfluidic device using patterning flow channels of Example 2.

Oligonucleotide sequences with specified sequences were hybridized to the microwell array to render unique barcodes for each well. In order to diversify the barcodes, two different sets of oligonucleotide sequences, A sequences and B sequences, were designed. Each A sequence has 40 nucleotides in total, from 5' to 3' including a 15 bp A linker sequence, a unique 8 bp barcode sequence with known oligonucleotide sequences but different from other A barcode sequences, and a 15 bp thymine sequences (polyT sequences) with two degenerate bases at the end, i.e., V and N. V means a base has equal opportunity to be C, G, A, except T. N means a base has equal opportunity to be A, T, C, or G. Each B sequence has 55 nucleotides in total, from 5' to 3' starting from a biotinylated 22 bp PCR adaptor sequences, a 10 bp degenerate base N sequences used as unique molecular identifier (UMI), a unique 8 bp barcode sequences with known oligonucleotide sequences but different from other B barcode sequences, and a 15 bp B linker sequence. There were a total of 50 different A sequences, i.e., An (n varies from 1 to 50), and 50 different B sequences, i.e., Bm (m varies from 1 to 50), as shown in Tables 1 and 2. Additionally, a ligation linker with 30 nucleotides in total (e.g., CGAATGCTCTGGCCTCTCAAGCACGTGGAT (SEQ ID NO: 101)), in which 15 nucleotides are complementary to the A linker sequence, and the other 15 nucleotides are complementary to the B linker sequence, was used to ligate one A sequence with one B sequence to form a unique barcode sequence.

TABLE 1

50 different A sequences. 5Phos denotes 5' phosphorylation.

| A Sequence Name | Sequence | SEQ ID NO |
|---|---|---|
| A-1 | /5Phos/AGGCCAGAGCATTCGAACGTGATTTTTTTTTTTTTTVN | 1 |
| A-2 | /5Phos/AGGCCAGAGCATTCGAAACATCGTTTTTTTTTTTTTTVN | 2 |
| A-3 | /5Phos/AGGCCAGAGCATTCGATGCCTAATTTTTTTTTTTTTTVN | 3 |
| A-4 | /5Phos/AGGCCAGAGCATTCGAGTGGTCATTTTTTTTTTTTTTVN | 4 |
| A-5 | /5Phos/AGGCCAGAGCATTCGACCACTGTTTTTTTTTTTTTTTVN | 5 |
| A-6 | /5Phos/AGGCCAGAGCATTCGACATTGGCTTTTTTTTTTTTTTVN | 6 |
| A-7 | /5Phos/AGGCCAGAGCATTCGCAGATCTGTTTTTTTTTTTTTTVN | 7 |
| A-8 | /5Phos/AGGCCAGAGCATTCGCATCAAGTTTTTTTTTTTTTTTVN | 8 |
| A-9 | /5Phos/AGGCCAGAGCATTCGCGCTGATCTTTTTTTTTTTTTTVN | 9 |
| A-10 | /5Phos/AGGCCAGAGCATTCGACAAGCTATTTTTTTTTTTTTTVN | 10 |
| A-11 | /5Phos/AGGCCAGAGCATTCGCTGTAGCCTTTTTTTTTTTTTTVN | 11 |
| A-12 | /5Phos/AGGCCAGAGCATTCGAGTACAAGTTTTTTTTTTTTTTVN | 12 |
| A-13 | /5Phos/AGGCCAGAGCATTCGAACAACCATTTTTTTTTTTTTTVN | 13 |
| A-14 | /5Phos/AGGCCAGAGCATTCGAACCGAGATTTTTTTTTTTTTTVN | 14 |
| A-15 | /5Phos/AGGCCAGAGCATTCGAACGCTTATTTTTTTTTTTTTTVN | 15 |
| A-16 | /5Phos/AGGCCAGAGCATTCGAAGACGGATTTTTTTTTTTTTTVN | 16 |
| A-17 | /5Phos/AGGCCAGAGCATTCGAAGGTACATTTTTTTTTTTTTTVN | 17 |
| A-18 | /5Phos/AGGCCAGAGCATTCGACACAGAATTTTTTTTTTTTTTVN | 18 |
| A-19 | /5Phos/AGGCCAGAGCATTCGACAGCAGATTTTTTTTTTTTTTVN | 19 |
| A-20 | /5Phos/AGGCCAGAGCATTCGACCTCCAATTTTTTTTTTTTTTVN | 20 |
| A-21 | /5Phos/AGGCCAGAGCATTCGACGCTCGATTTTTTTTTTTTTTVN | 21 |
| A-22 | /5Phos/AGGCCAGAGCATTCGACGTATCATTTTTTTTTTTTTTVN | 22 |
| A-23 | /5Phos/AGGCCAGAGCATTCGACTATGCATTTTTTTTTTTTTTVN | 23 |
| A-24 | /5Phos/AGGCCAGAGCATTCGAGAGTCAATTTTTTTTTTTTTTVN | 24 |
| A-25 | /5Phos/AGGCCAGAGCATTCGAGATCGCATTTTTTTTTTTTTTVN | 25 |
| A-26 | /5Phos/AGGCCAGAGCATTCGAGCAGGAATTTTTTTTTTTTTTVN | 26 |
| A-27 | /5Phos/AGGCCAGAGCATTCGAGTCACTATTTTTTTTTTTTTTVN | 27 |
| A-28 | /5Phos/AGGCCAGAGCATTCGATCCTGTATTTTTTTTTTTTTTVN | 28 |
| A-29 | /5Phos/AGGCCAGAGCATTCGATTGAGGATTTTTTTTTTTTTTVN | 29 |
| A-30 | /5Phos/AGGCCAGAGCATTCGCAACCACATTTTTTTTTTTTTTVN | 30 |
| A-31 | /5Phos/AGGCCAGAGCATTCGGACTAGTATTTTTTTTTTTTTTVN | 31 |
| A-32 | /5Phos/AGGCCAGAGCATTCGCAATGGAATTTTTTTTTTTTTTVN | 32 |
| A-33 | /5Phos/AGGCCAGAGCATTCGCACTTCGATTTTTTTTTTTTTTVN | 33 |
| A-34 | /5Phos/AGGCCAGAGCATTCGCAGCGTTATTTTTTTTTTTTTTVN | 34 |
| A-35 | /5Phos/AGGCCAGAGCATTCGCATACCAATTTTTTTTTTTTTTVN | 35 |
| A-36 | /5Phos/AGGCCAGAGCATTCGCCAGTTCATTTTTTTTTTTTTTVN | 36 |
| A-37 | /5Phos/AGGCCAGAGCATTCGCCGAAGTATTTTTTTTTTTTTTVN | 37 |
| A-38 | /5Phos/AGGCCAGAGCATTCGCCGTGAGATTTTTTTTTTTTTTVN | 38 |

TABLE 1-continued 50 different A sequences. 5Phos denotes 5' phosphorylation.

| A Sequence Name | Sequence | SEQ ID NO |
|---|---|---|
| A-39 | /5Phos/AGGCCAGAGCATTCGCCTCCTGATTTTTTTTTTTTTVN | 39 |
| A-40 | /5Phos/AGGCCAGAGCATTCGCGAACTTATTTTTTTTTTTTTVN | 40 |
| A-41 | /5Phos/AGGCCAGAGCATTCGCGACTGGATTTTTTTTTTTTTVN | 41 |
| A-42 | /5Phos/AGGCCAGAGCATTCGCGCATACATTTTTTTTTTTTTVN | 42 |
| A-43 | /5Phos/AGGCCAGAGCATTCGCTCAATGATTTTTTTTTTTTTVN | 43 |
| A-44 | /5Phos/AGGCCAGAGCATTCGCTGAGCCATTTTTTTTTTTTTVN | 44 |
| A-45 | /5Phos/AGGCCAGAGCATTCGCTGGCATATTTTTTTTTTTTTVN | 45 |
| A-46 | /5Phos/AGGCCAGAGCATTCGGAATCTGATTTTTTTTTTTTTVN | 46 |
| A-47 | /5Phos/AGGCCAGAGCATTCGCAAGACTATTTTTTTTTTTTTVN | 47 |
| A-48 | /5Phos/AGGCCAGAGCATTCGGAGCTGAATTTTTTTTTTTTTVN | 48 |
| A-49 | /5Phos/AGGCCAGAGCATTCGGATAGACATTTTTTTTTTTTTVN | 49 |
| A-50 | /5Phos/AGGCCAGAGCATTCGGCCACATATTTTTTTTTTTTTVN | 50 |

TABLE 2

50 different B sequences. 5Biosg denotes a 5' biotin modification.

| B Sequence Name | Sequence | SEQ ID NO. |
|---|---|---|
| B-1 | /5Biosg/CAAGCGTTGGCTTCTCGCATCTNNNNNNNNNNNAACGTGATATCCACGTGCTTGAG | 51 |
| B-2 | /5Biosg/CAAGCGTTGGCTTCTCGCATCTNNNNNNNNNNNAAACATCGATCCACGTGCTTGAG | 52 |
| B-3 | /5Biosg/CAAGCGTTGGCTTCTCGCATCTNNNNNNNNNNNATGCCTAAATCCACGTGCTTGAG | 53 |
| B-4 | /5Biosg/CAAGCGTTGGCTTCTCGCATCTNNNNNNNNNNNAGTGGTCAATCCACGTGCTTGAG | 54 |
| B-5 | /5Biosg/CAAGCGTTGGCTTCTCGCATCTNNNNNNNNNNNACCACTGTATCCACGTGCTTGAG | 55 |
| B-6 | /5Biosg/CAAGCGTTGGCTTCTCGCATCTNNNNNNNNNNNACATTGGCATCCACGTGCTTGAG | 56 |
| B-7 | /5Biosg/CAAGCGTTGGCTTCTCGCATCTNNNNNNNNNNNCAGATCTGATCCACGTGCTTGAG | 57 |
| B-8 | /5Biosg/CAAGCGTTGGCTTCTCGCATCTNNNNNNNNNNNCATCAAGTATCCACGTGCTTGAG | 58 |
| B-9 | /5Biosg/CAAGCGTTGGCTTCTCGCATCTNNNNNNNNNNNCGCTGATCATCCACGTGCTTGAG | 59 |
| B-10 | /5Biosg/CAAGCGTTGGCTTCTCGCATCTNNNNNNNNNNNACAAGCTAATCCACGTGCTTGAG | 60 |
| B-11 | /5Biosg/CAAGCGTTGGCTTCTCGCATCTNNNNNNNNNNNCTGTAGCCATCCACGTGCTTGAG | 61 |
| B-12 | /5Biosg/CAAGCGTTGGCTTCTCGCATCTNNNNNNNNNNNAGTACAAGATCCACGTGCTTGAG | 62 |
| B-13 | /5Biosg/CAAGCGTTGGCTTCTCGCATCTNNNNNNNNNNNACAACCAATCCACGTGCTTGAG | 63 |
| B-14 | /5Biosg/CAAGCGTTGGCTTCTCGCATCTNNNNNNNNNNNAACCGAGAATCCACGTGCTTGAG | 64 |
| B-15 | /5Biosg/CAAGCGTTGGCTTCTCGCATCTNNNNNNNNNNNAACGCTTAATCCACGTGCTTGAG | 65 |
| B-16 | /5Biosg/CAAGCGTTGGCTTCTCGCATCTNNNNNNNNNNNAAGACGGAATCCACGTGCTTGAG | 66 |
| B-17 | /5Biosg/CAAGCGTTGGCTTCTCGCATCTNNNNNNNNNNNAAGGTACAATCCACGTGCTTGAG | 67 |
| B-18 | /5Biosg/CAAGCGTTGGCTTCTCGCATCTNNNNNNNNNNNACACAGAAATCCACGTGCTTGAG | 68 |
| B-19 | /5Biosg/CAAGCGTTGGCTTCTCGCATCTNNNNNNNNNNNACAGCAGAATCCACGTGCTTGAG | 69 |
| B-20 | /5Biosg/CAAGCGTTGGCTTCTCGCATCTNNNNNNNNNNNACCTCCAAATCCACGTGCTTGAG | 70 |

TABLE 2-continued 50 different B sequences. 5Biosg denotes a 5' biotin modification.

| B Sequence Name | Sequence | SEQ ID NO. |
|---|---|---|
| B-21 | /5Biosg/CAAGCGTTGGCTTCTCGCATCTNNNNNNNNNNNACGCTCGAATCCACGTGCTTGAG | 71 |
| B-22 | /5Biosg/CAAGCGTTGGCTTCTCGCATCTNNNNNNNNNNNACGTATCAATCCACGTGCTTGAG | 72 |
| B-23 | /5Biosg/CAAGCGTTGGCTTCTCGCATCTNNNNNNNNNNNACTATGCAATCCACGTGCTTGAG | 73 |
| B-24 | /5Biosg/CAAGCGTTGGCTTCTCGCATCTNNNNNNNNNNNAGAGTCAAATCCACGTGCTTGAG | 74 |
| B-25 | /5Biosg/CAAGCGTTGGCTTCTCGCATCTNNNNNNNNNNNAGATCGCAATCCACGTGCTTGAG | 75 |
| B-26 | /5Biosg/CAAGCGTTGGCTTCTCGCATCTNNNNNNNNNNNAGCAGGAAATCCACGTGCTTGAG | 76 |
| B-27 | /5Biosg/CAAGCGTTGGCTTCTCGCATCTNNNNNNNNNNNAGTCACTAATCCACGTGCTTGAG | 77 |
| B-28 | /5Biosg/CAAGCGTTGGCTTCTCGCATCTNNNNNNNNNNNATCCTGTAATCCACGTGCTTGAG | 78 |
| B-29 | /5Biosg/CAAGCGTTGGCTTCTCGCATCTNNNNNNNNNNNATTGAGGAATCCACGTGCTTGAG | 79 |
| B-30 | /5Biosg/CAAGCGTTGGCTTCTCGCATCTNNNNNNNNNNNCAACCACAATCCACGTGCTTGAG | 80 |
| B-31 | /5Biosg/CAAGCGTTGGCTTCTCGCATCTNNNNNNNNNNNGACTAGTAATCCACGTGCTTGAG | 81 |
| B-32 | /5Biosg/CAAGCGTTGGCTTCTCGCATCTNNNNNNNNNNNCAATGGAAATCCACGTGCTTGAG | 82 |
| B-33 | /5Biosg/CAAGCGTTGGCTTCTCGCATCTNNNNNNNNNNNCACTTCGAATCCACGTGCTTGAG | 83 |
| B-34 | /5Biosg/CAAGCGTTGGCTTCTCGCATCTNNNNNNNNNNNCAGCGTTAATCCACGTGCTTGAG | 84 |
| B-35 | /5Biosg/CAAGCGTTGGCTTCTCGCATCTNNNNNNNNNNNCATACCAAATCCACGTGCTTGAG | 85 |
| B-36 | /5Biosg/CAAGCGTTGGCTTCTCGCATCTNNNNNNNNNNNCCAGTTCAATCCACGTGCTTGAG | 86 |
| B-37 | /5Biosg/CAAGCGTTGGCTTCTCGCATCTNNNNNNNNNNNCCGAAGTAATCCACGTGCTTGAG | 87 |
| B-38 | /5Biosg/CAAGCGTTGGCTTCTCGCATCTNNNNNNNNNNNCCGTGAGAATCCACGTGCTTGAG | 88 |
| B-39 | /5Biosg/CAAGCGTTGGCTTCTCGCATCTNNNNNNNNNNNCCTCCTGAATCCACGTGCTTGAG | 89 |
| B-40 | /5Biosg/CAAGCGTTGGCTTCTCGCATCTNNNNNNNNNNNCGAACTTAATCCACGTGCTTGAG | 90 |
| B-41 | /5Biosg/CAAGCGTTGGCTTCTCGCATCTNNNNNNNNNNNCGACTGGAATCCACGTGCTTGAG | 91 |
| B-42 | /5Biosg/CAAGCGTTGGCTTCTCGCATCTNNNNNNNNNNNCGCATACAATCCACGTGCTTGAG | 92 |
| B-43 | /5Biosg/CAAGCGTTGGCTTCTCGCATCTNNNNNNNNNNNCTCAATGAATCCACGTGCTTGAG | 93 |
| B-44 | /5Biosg/CAAGCGTTGGCTTCTCGCATCTNNNNNNNNNNNCTGAGCCAATCCACGTGCTTGAG | 94 |
| B-45 | /5Biosg/CAAGCGTTGGCTTCTCGCATCTNNNNNNNNNNNCTGGCATAATCCACGTGCTTGAG | 95 |
| B-46 | /5Biosg/CAAGCGTTGGCTTCTCGCATCTNNNNNNNNNNNGAATCTGAATCCACGTGCTTGAG | 96 |
| B-47 | /5Biosg/CAAGCGTTGGCTTCTCGCATCTNNNNNNNNNNNCAAGACTAATCCACGTGCTTGAG | 97 |
| B-48 | /5Biosg/CAAGCGTTGGCTTCTCGCATCTNNNNNNNNNNNGAGCTGAAATCCACGTGCTTGAG | 98 |
| B-49 | /5Biosg/CAAGCGTTGGCTTCTCGCATCTNNNNNNNNNNNGATAGACAATCCACGTGCTTGAG | 99 |
| B-50 | /5Biosg/CAAGCGTTGGCTTCTCGCATCTNNNNNNNNNNNGCCACATAATCCACGTGCTTGAG | 100 |

The glass wafer with microwell array was coated with poly(L-lysine) and Streptavidin (STV) before applying oligonucleotide sequences. In brief, the glass wafer was cleaned with base bath, water and 100% ethanol subsequently before usage. After drying the surface, the glass wafer surface was treated with oxygen plasma and then was soaked in 0.1% poly(L-lysine) (PLL) solution for 15 minutes at room temperature, then washed with water three time and blow-dried with nitrogen and baked in the oven at 60° C. to further dry. Then 1mg/mL Streptavidin in phosphate buffered Saline (PBS) was applied to the surface of PLL coated glass wafer to introduce Streptavidin coating to the glass wafer. After drying the Streptavidin on the PLL coated surface, the glass wafer with microwell array was ready for the oligonucleotide sequence binding.

B sequences and A sequences were immobilized on the glass wafer surface using a microfluidic flow patterning technique. First, the flow channels A was aligned with the microwell array by letting the parallel flow channels cover the rows of the microwell array. Then, the B sequences, i.e., B1 to B50, were diluted in water (100 µM) and applied to each individual channel of flow channels A (FIG. 3A) with binding buffer. The B sequences was incubated on the glass wafer for 60 minutes at room temperature to let the biotinylated B sequences bind to the streptavidin coated surface, before washing by Phosphate Buffered Saline (PBS). After removing the flow channels A from the glass wafer, each row of the microwell array was coated with a unique B sequence (FIG. 3B). Second, the flow channels B was aligned with the microwell array by letting the parallel flow channels cover the columns of the microwell array. Then the A sequences, i.e., A1 to A50, were diluted in water (100 µM) and annealed with the ligation linkers to form modified A sequences. The modified A sequences were mixed with ligase solution and applied to each individual channel of flow channels B (FIG. 3C). After incubating at 37° C. for 30 minutes, the modified A sequences were ligated to the B sequences and formed unique barcode sequences (FIG. 3D). Through this cross microfluidic flow patterning, each microwell had a specific barcode sequence including a PCR adaptor sequence, a UMI sequence, a barcode A and barcode B sequence, and a polyT sequence (FIG. 4). With identified microwell position, the corresponding barcode A and barcode B sequences are known.

Example 4

Cell Loading and DEP Trapping

Preparation of Cells

The mouse mammary tumor 4T1 cells and K562 human leukemia cells were cultured in DMEM with 10% Fetal Bovine Serum (FBS) and penicillin and streptomycin (PS) at 37° C. with 5% $CO_2$. Cells were collected from cell culture flask and centrifuged at 500 g for 3 minutes to form cell pellet. The cell pellet was resuspended in 1 mL of low conductivity DEP buffer with RNase Inhibitor. The cell suspension was passed through a 40 µm cell strainer to remove cell clusters. Then the cells were counted under hemocytometer.

Cell Loading and DEP Trapping

Figure 7:
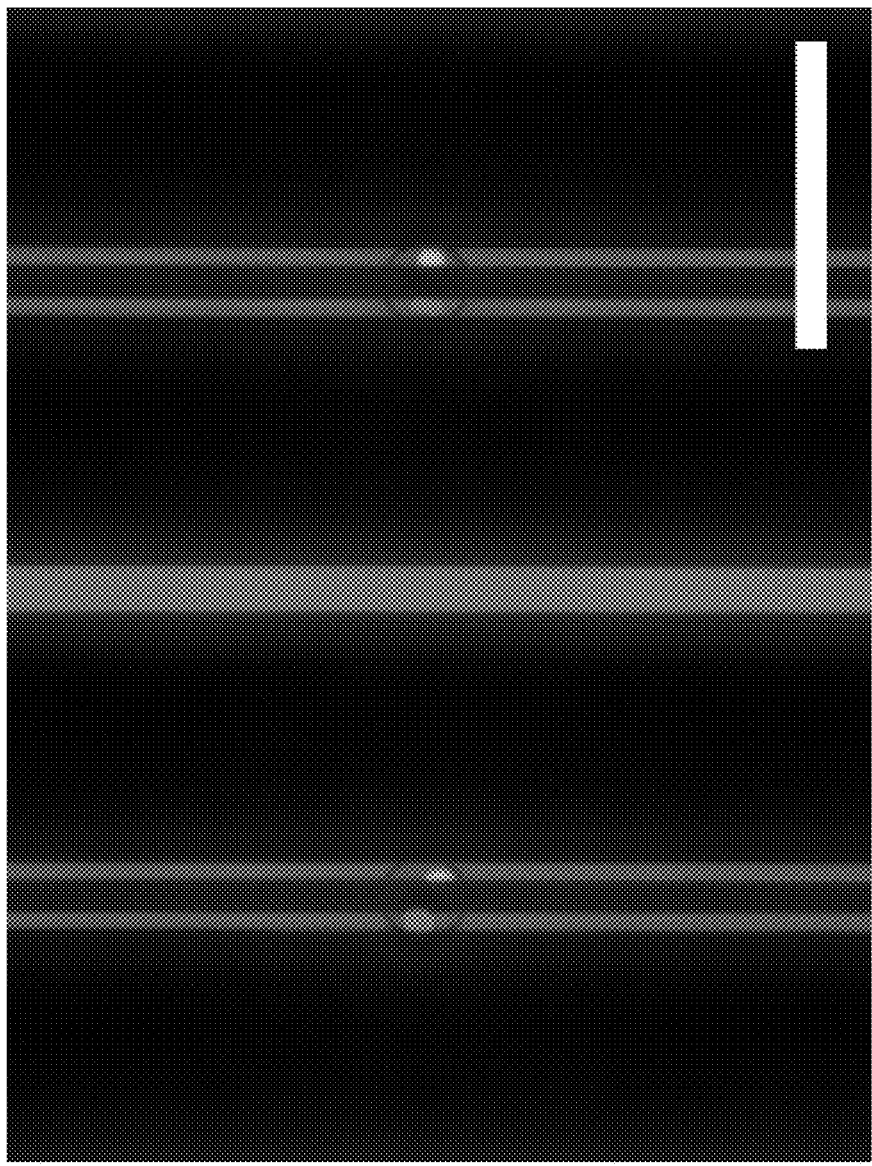
FIG. 7 shows the DEP microfluidic device trapped one pair of single cells with different fluorescent dyes on the paired electrodes in the same microwell. The size bar is 100 μm in length.

After priming the DEP microfluidic device with low conductivity DEP buffer, about 100 µL single cell suspension of 4T1 cells was loaded from the inlet to fill the entire microfluidic device. The concentration of single cell suspension was about $5 \times 10^5$ cells/mL. Then a 4V peak-to-peak (Vp-p) sinusoidal electrical wave at 10 MHz was applied to the DEP electrodes AC1 and ground for cell trapping via a positive DEP effect. The cell suspension was perfused with a speed of 5 µL/min inside the flow channel to ensure trapping of cells inside almost each microwell. After cell trapping, excessive cells were washed away from the microwell array while keeping the first set of DEP electrodes on. Then about 100 µL single cell suspension of K562 cells was loaded from the inlet to fill the entire microfluidic device. The concentration of single cell suspension was about $5 \times 10^5$ cells/mL. Then a 4V peak-to-peak (Vp-p) sinusoidal electrical wave at 10 MHz was applied to the DEP electrodes AC2 and ground for cell trapping via a positive DEP effect. After cell trapping, excessive cells were washed away from the microwell array while keeping both sets of DEP electrodes on. By adjusting the voltage applied to the electrodes, the geometry of the electrodes, and the cell suspension concentration, only one single cell can be trapped in the spacing of one set of electrodes in most microwells. FIG. 7 shows the trapping of one pair of single cells with different fluorescent dyes on the paired electrodes in the same microwell. After washing, in each microwell, there could be one pair of 4T1 cell and K562 cell. Then the DEP buffer can be replaced with PBS or other buffer with stimulation reagents for cell culture. The whole device was observed under microscope to record the cell status in each microwell and according positions. The microwell positions were used to extract the known barcode sequences.

Example 5

Determining Cell-Cell Interaction

Cell Lysis and mRNA Capture

After cell loading and DEP trapping using a DEP microfluidic device, the cell lysis buffer was perfused into the device to lyse the cells. Then the device was sat at room temperature for 30 min letting mRNA released from cells to bind to the barcodes on the surface of microwells.

On-Chip Reverse Transcription and 1-Cycle Polymerase Chain Reaction

After mRNA binding, washing buffer was perfused through the flow channel. Then reverse transcription (RT) mixer solution with template switching primer was loaded into the DEP microfluidic device. The device was sat at room temperature for 30 min, and then at 42° C. for 90 min to finish the RT reaction. After RT reaction, the RT solution was collected for PCR amplification. A NaOH solution was used to denaturize the formed half double strand cDNA. After washing, Polymerase Chain Reaction (PCR) solution was loaded into the device and the device was kept at 65° C. for about 3 min for annealing and 72° C. for about 5-10 min for extension. After the 1-cycle PCR reaction, the PCR solution was collected for further amplification. The NaOH solution was used to denaturize the formed completed double strand cDNA. After denaturization, the liquid solution inside the microfluidic flow channel was collected and neutralized with HC1 for next step of purification and PCR amplification.

Purification and PCR Amplification

The collected liquid solution from the microfluidic device had floating cDNA. cDNA with desirable sequence length (i.e., about 1000 bp) was selectively captured by magnetic beads. Then the magnetic beads with selected cDNA was mixed with PCR solution, and PCR was carried out to amplify the captured cDNA.

Purification and Bioanalyzer Analysis

Figure 8:
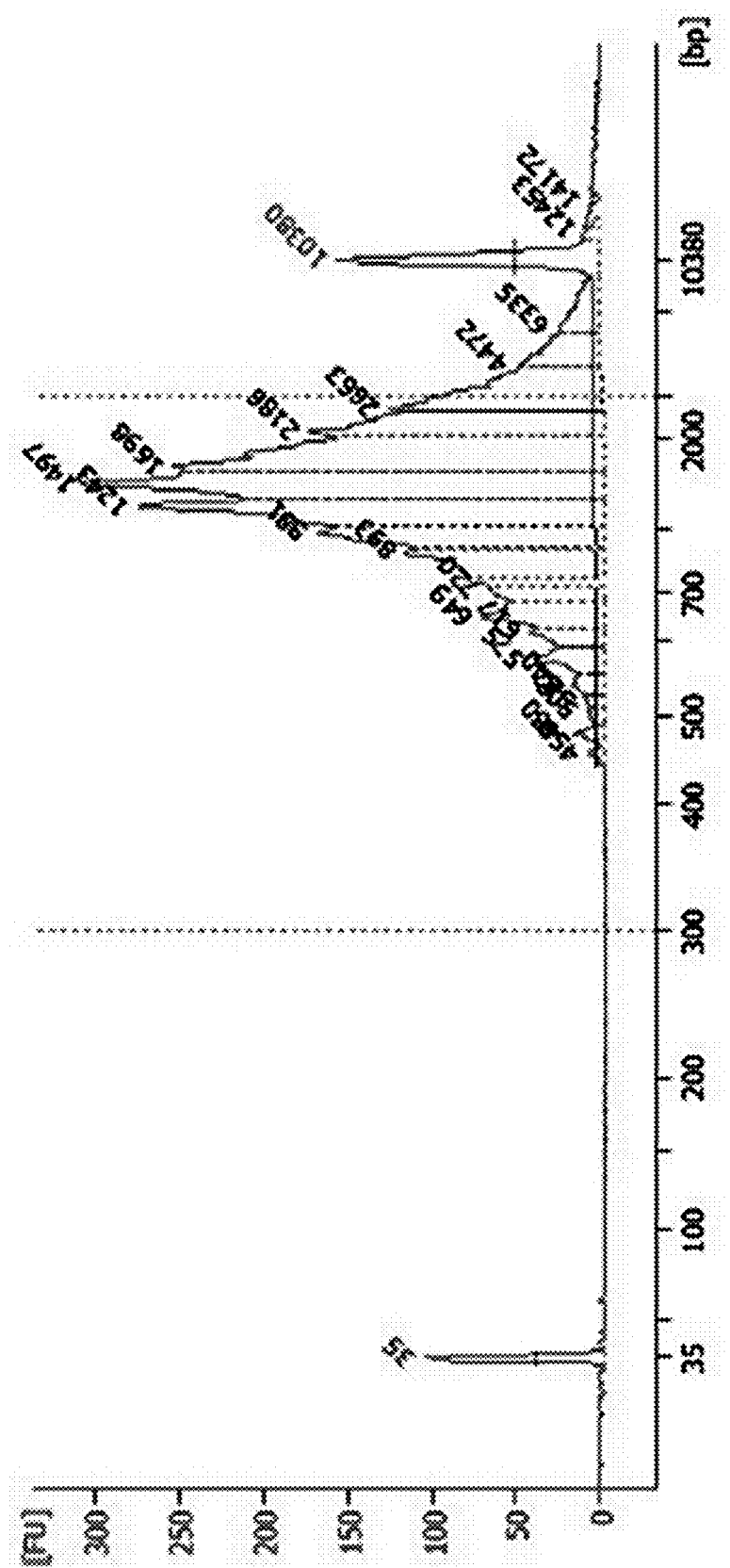
FIG. 8 shows the quality of the purified cDNA solution after PCR amplification.

After PCR, the product with amplified cDNA was purified by magnetic beads again to select the desirable sequences with ~1000 bp in length. Then Fluorometer was used to measure the cDNA concentration in the purified solution and the Agilent Bioanalzyer 2100 was used to characterize the quality of the purified solution as shown in FIG. 8.

Library Construction and Sequencing

Figure 9:
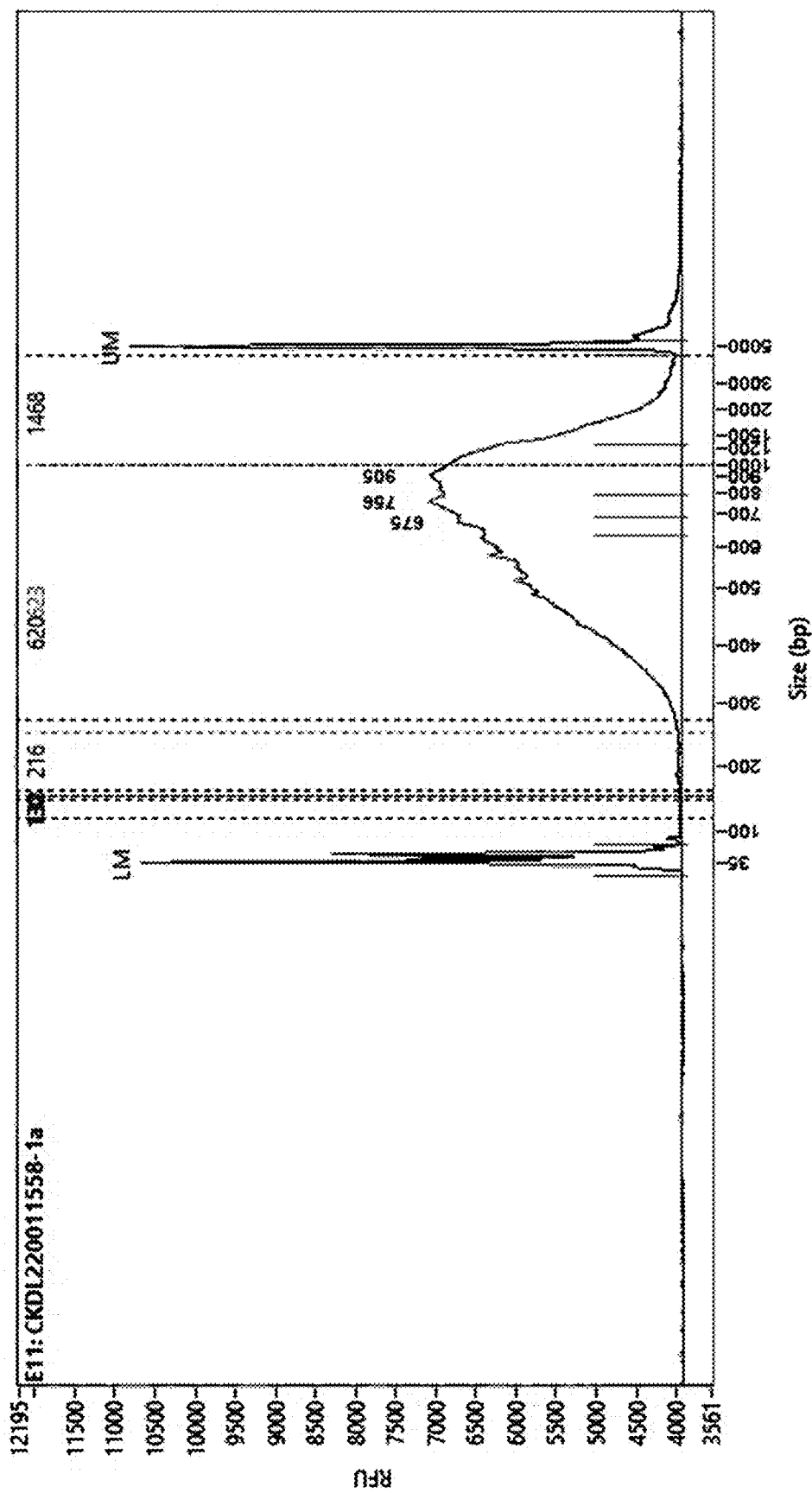
FIG. 9 shows the quality of purified libraries.

The cDNA in the purified solution was then inputted for standard Nextera tagmentation and amplification reactions to construct libraries for sequencing. Custom primers instead of i5 index primer and i7 index primer were used to amplify only those fragments containing the 22 bp PCR adaptor sequences. The library product was then purified again using magnetic beads. The cDNA concentration of the libraries was measured by Fluorometer and the quality of the libraries was characterized by Labchip GXII Touch HT machine (FIG. 9). The libraries were sequenced on a NovaSeq 6000 sequencer.

Sequencing Data Analysis

Transcriptome alignment was performed by using BBduk and DropSeq tools. In brief, the Read 2 sequencing data include the PCR adaptor, the cell barcode, and the UMI sequences, while the Read 1 sequencing data contain the transcript information of captured mRNA. The cell barcode sequences in the Read 2 was a combination of barcode A and barcode B as shown in FIG. 4. The combination of barcodes A and barcodes B was predetermined and prepatterned on the surface of the microwell array, and recorded in a cell barcode list. The Read 2 cell barcode sequences were matched to the cell barcode list, considering zero mismatch, to select the sequencing data with the matched cell barcodes. The reads in the corresponding Read 1 were aligned to reference transcriptome of the corresponding species (mouse; human; human-mouse mix) to extract gene expression matrix. The selected matched sequencing data were used to generate a cell-gene matrix for down-stream analysis.

The cell transcriptomics profile was correlated to the spatial information of each cell by using Seurat. In brief, a coordinates csv file was generated to record the (x, y) coordinates of the prepatterned cell barcode sequences on the microwell array. By matching the cell barcode sequences in the cell-gene matrix to the cell barcode sequences in the coordinates csv file, the cell transcriptomics profiling can be assigned to each microwell.

Figures 10A, 10B:
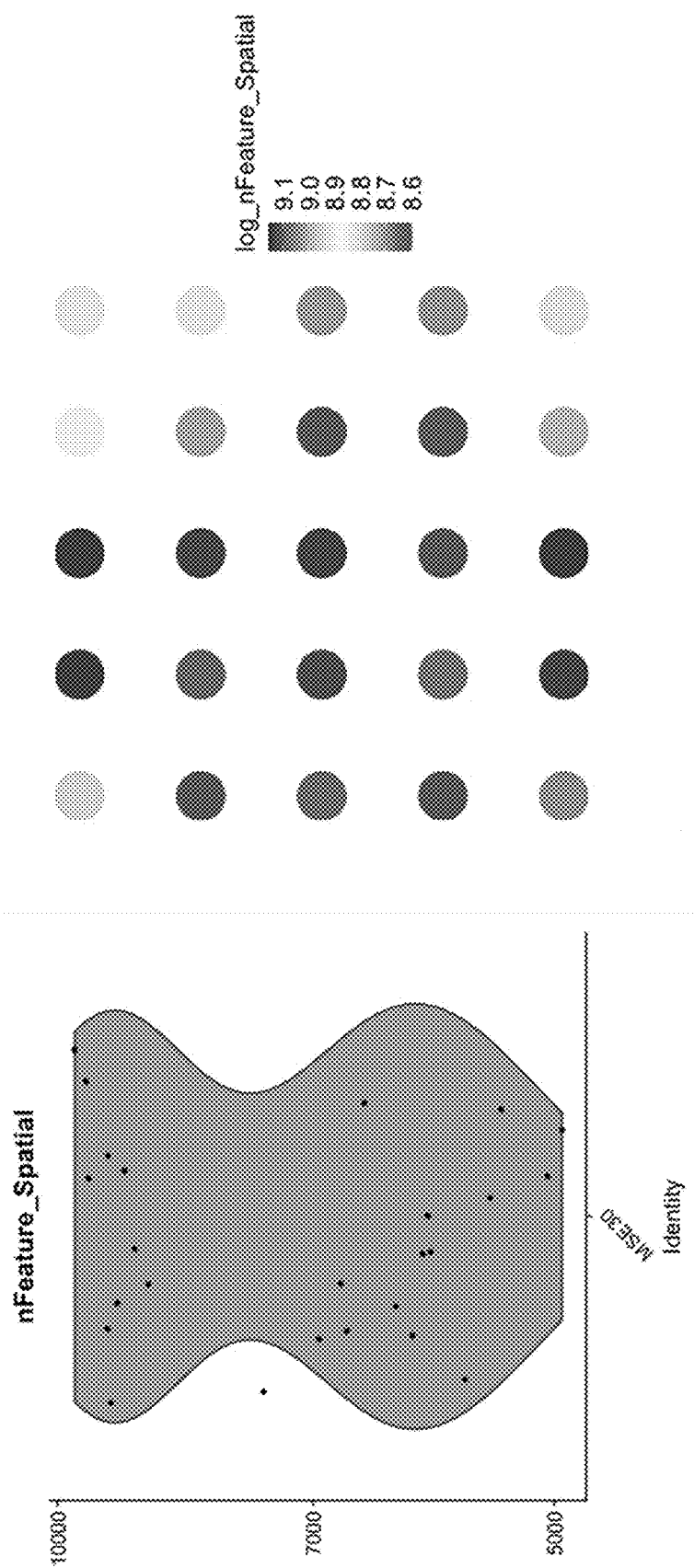
FIGS. 10A-10D show the gene count and UMI count of each cell barcode correlated to their spatial location.
Figures 10C, 10D:
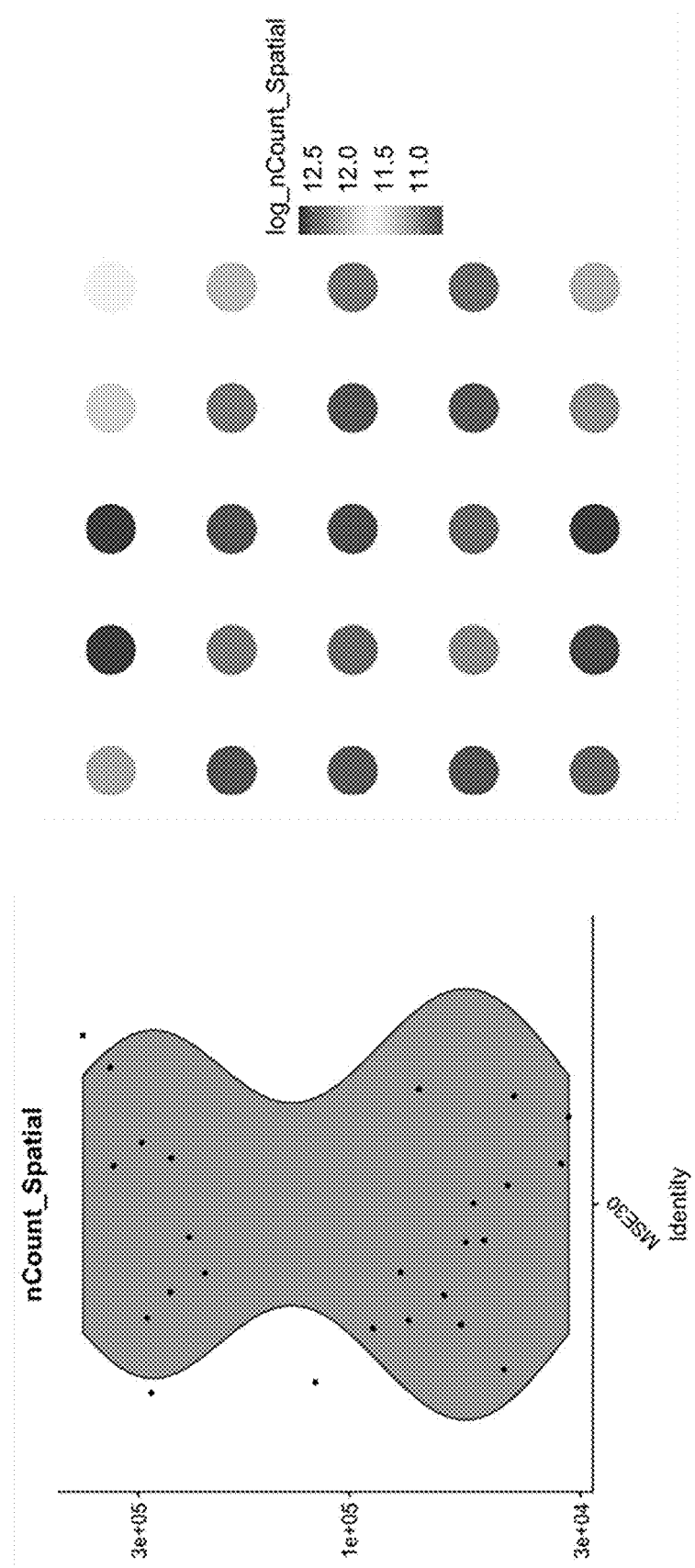

In this example, 25 cell barcodes were used. For example, barcode A varied from A1 to A5 and barcode B varies from B1 to B5. Each barcode covered a 4X9 microwell array area. So, there were 36 microwells sharing the same cell barcodes. Also, the corresponding cells captured in these 36 microwells were sharing the same cell barcodes. The gene count and UMI count of each cell barcode correlated to their spatial location were shown in FIGS. 10A-10D. FIG. 10A shows the violin plot of the gene number, and FIG. 10B shows the spatial profile of the gene number corresponding to cell barcodes. FIG. 10C shows the violin plot of the UMI number, and FIG. 10D shows the spatial profile of the UMI number corresponding to cell barcodes.

Terminology

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As used in this specification and the appended claims, the singular forms "a," "an," and "the" include plural references unless the context clearly dictates otherwise. Any reference to "or" herein is intended to encompass "and/or" unless otherwise stated.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be appar-

What is claimed is:

1. A microfluidic device, comprising:
a substrate;
a plurality of electrodes on the substrate and comprising a ground electrode, a first signal electrode, and a second signal electrode;
a microwell array on the substrate and the plurality of electrodes and comprising a plurality of microwells, wherein each of the plurality of microwells comprises a plurality of barcode molecules attached thereto, wherein each barcode molecule of the plurality of barcode molecules comprises a molecular barcode sequence, a first microwell barcode sequence, and a second microwell barcode sequence, wherein first microwell barcode sequences of the pluralities of barcode molecules are predetermined and are identical in microwells in each row of the microwell array and different in microwells in different rows of the microwell array, and wherein second microwell barcode sequences of the pluralities of barcode molecules are predetermined and are identical in microwells in each column of the microwell array and different in microwells in different columns of the microwell array,
wherein a surface of each of the plurality of electrodes is on a bottom of at least one microwell of the plurality of microwells, wherein a space between the first signal electrode and the ground electrode in the microwell is capable of trapping a first cell when a first signal is applied to the first signal electrode and the ground electrode, wherein a space between the second signal electrode and the ground electrode in a microwell of the plurality of microwells is capable of trapping a second cell when a second signal is applied to the second signal electrode and the ground electrode; and
a flow channel comprising an inlet and an outlet and in fluidic communication with the microwell array.

2. The microfluidic device of claim 1, wherein a surface of the first signal electrode is on the bottom of each microwell of the plurality of microwells, and/or wherein a surface of the second signal electrode is on the bottom of each microwell of the plurality of microwells.

3. The microfluidic device of claim 1, wherein the plurality of electrodes comprises a plurality of first signal electrodes and a plurality of second signal electrodes, wherein a surface of each of the plurality of first signal electrodes is on the bottom of at least one microwell of the plurality of microwells, and wherein a surface of each of the plurality of second signal electrodes is on the bottom of at least one microwell of the plurality of microwells, optionally wherein at least two first signal electrodes of the plurality of first signal electrodes are not connected, optionally wherein at least two second signal electrodes of the plurality of second signal electrodes are not connected, optionally wherein at least two first signal electrodes of the plurality of first signal electrodes are parallel, optionally wherein at least two second signal electrodes of the plurality of second signal electrodes are parallel, optionally wherein at least one first signal electrode of the plurality of first signal electrodes and at least one second signal electrode of the plurality of second signal electrodes are perpendicular to each other, optionally wherein at least one first signal electrode of the plurality of first signal electrodes and at least one second signal electrode of the plurality of second signal electrodes are parallel to each other, and optionally wherein the orientation of at least one first signal electrode of the plurality of first signal electrodes and at least one second signal electrode of the plurality of second signal electrodes is 5°, 10°, 20°, 30°, 40°, 45°, 50°, 60°, 70°, or 80°.

4. The microfluidic device of claim 3, wherein surfaces of different first signal electrodes of the plurality of first signal electrodes are on the bottoms of the microwells in different rows of the microwell arrays, and wherein surfaces of different second signal electrodes of the plurality of second signal electrodes are on the bottoms of the microwells in different rows of the microwell arrays.

5. The microfluidic device of claim 3, wherein surfaces of different first signal electrodes of the plurality of first signal electrodes are on the bottoms of different microwells of the plurality of microwells, and wherein surfaces of different second signal electrodes of the plurality of second signal electrodes are on the bottoms of different microwells of the plurality of microwells.

6. The microfluidic device of claim 1, wherein a surface of the ground electrode is on a bottom of each microwell of the plurality of microwells.

7. The microfluidic device of claim 1, wherein the space between the first signal electrode and the ground electrode is 1 μm to 10 μm, and/or wherein the space between the second signal electrode and the ground electrode is 1 μm to 10 μm.

8. The microfluidic device of claim 1, wherein a width of the first signal electrode is 5 μm to 100 μm, wherein a width of the second signal electrode is 5 μm to 100 μm, and/or wherein a width of the ground electrode is 5 μm to 50 μm.

9. The microfluidic device of, wherein a thickness of the first signal electrode is 0.1 μm to 1 μm, wherein a thickness of the second signal electrode is 0.1 μm to 1 μm, and/or wherein a thickness of the ground electrode is 0.1 μm to 1 μm.

10. The microfluidic device of claim 1, wherein a width of a microwell of the plurality of microwells is 10 μm to 200 μm, wherein a length of a microwell of the plurality of microwells is 10 μm to 200 μm, and/or wherein a depth of a microwell of the plurality of microwells is 5 μm to 500 μm.

11. The microfluidic device of claim 1, wherein a material of the microwell array, or one, one or more, or each of the plurality of microwells, comprises a dielectric material, optionally wherein the dielectric material comprises SU-8.

12. The microfluidic device of claim 1, wherein the microwell array is directly or indirectly in contact with the plurality of electrodes.

13. The microfluidic device of claim 1, wherein the plurality of barcode is attached to the microwell covalently.

14. The microfluidic device of claim 1, wherein the plurality of barcode molecules is attached to the microwell non-covalently, optionally wherein the substrate comprises a poly (L-lysine) layer comprising streptavidin molecules, optionally wherein the plurality of barcode molecules each comprises a biotin molecule, and optionally wherein the plurality of barcode molecules is attached to the microwell by binding of the biotin molecules to the streptavidin molecules.

15. The microfluidic device of claim 1, wherein each barcode molecule of the plurality of barcode molecules comprises from 5' to 3' a primer sequence, a molecular barcode sequence, a first microwell barcode sequence, a first linker sequence, a second linker sequence, a second microwell barcode sequence, and/or a target binding sequence, optionally wherein the target binding sequence comprises a poly (dT) sequence, optionally wherein each barcode molecule of the plurality of barcode molecules comprises an enzyme recognition sequence, optionally wherein the enzyme recognition sequence is on the 5' end of the barcode molecule and/or is 5' to the primer sequence.

16. The microfluidic device of claim 1, wherein each barcode molecule of the plurality of barcode molecules comprises a template switching sequence.

17. A method of nucleic acid sequencing, comprising:
providing a microfluidic device of claim 1,
loading a plurality of first cells in a first loading buffer into the microfluidic device via the inlet of the microfluidic device;
applying a first signal to the first signal electrode and the ground electrode of the microfluidic device, thereby partitioning single first cells of the plurality of first cells into microwells of the plurality of microwells and trapping the single first cells in the spaces between the ground electrode and the first signal electrode in the microwells;
loading a plurality of second cells in a second loading buffer into the microfluidic device via the inlet of the microfluidic device;
applying a second signal to the second signal electrode and the ground electrode of the microfluidic device, thereby partitioning single second cells of the plurality of second cells into microwells of the plurality of microwells and trapping the single second cells in the spaces between the ground electrode and the second signal electrode in the microwells;
determining an interaction between the first cell and the second cell is of interest in a microwell of the microwells;
identifying the first microwell barcode sequence and the second microwell barcode sequence of the plurality of barcode molecules in the microwell based on a location of the microwell in the plurality of microwells;
barcoding a plurality of target nucleic acids associated with the first cell and/or the second cell in each of the microwells using the plurality of barcode molecules attached to the microwell to generate a plurality of barcoded nucleic acid molecules;
sequencing barcoded nucleic acids of the plurality of barcoded nucleic acids not attached to each of the microwells, or any products thereof, to obtain nucleic acid sequences of the plurality of barcoded nucleic acids; and
determining the nucleic acid sequences of the plurality of barcoded nucleic acids with the first microwell barcode sequence and the second microwell barcode sequence identified.

18. The method of claim 17, comprising: removing first cells of the plurality of first cells in the microfluidic device that are not trapped in the spaces between the ground electrode and the first signal electrode in the microwells from the microfluidic device, optionally wherein a first cell of the first cells not trapped in the space between the ground electrode and the first signal electrode of a microwell can be inside the microwell or outside the microwell, optionally wherein a first cell of the first cells not trapped in the space between the ground electrode and the first signal electrode is in the space between the second signal electrode and the ground electrode, is on a surface of the bottom of the microwell, and/or is on a surface between two microwells of the plurality of microwells, optionally wherein removing the first cells that are not trapped in the spaces between the ground electrode and the first signal electrode from the microfluidic device comprises introducing a first washing buffer into the microfluidic device via the inlet of the microfluidic device and out of the microfluidic device via the outlet of the microfluidic device, thereby washing away the first cells that are not trapped in the spaces between the ground electrode and the first signal electrode in the microwells from the microfluidic device, optionally wherein introducing the first washing buffer comprises injecting the first washing buffer into the inlet of the microfluidic device, and optionally wherein the first loading buffer and the first washing buffer are identical.

19. The method of claim 17, comprising: removing second cells of the plurality of second cells in the microfluidic device that are not trapped in the spaces between the ground electrode and the second signal electrode in the microwells from the microfluidic device, optionally wherein a second cell of the second cells not trapped in the spaces between the ground electrode and the second signal electrode is in the spaces between the first signal electrode and the ground electrode, and/or is on a surface of the bottom of the microwell, and/or is on a surface between two microwells of the plurality of microwells, optionally wherein removing the second cells that are not trapped in the spaces between the ground electrode and the second signal electrode from the microfluidic device comprises introducing a second washing buffer into the microfluidic device via the inlet of the microfluidic device and out of the microfluidic device via the outlet of the microfluidic device, thereby washing away the second cells that are not trapped in the spaces between the ground electrode and the second signal electrode in the microwells from the microfluidic device, optionally wherein introducing the second washing buffer comprises injecting the second washing buffer into the inlet of the microfluidic device, and optionally wherein the second loading buffer and the second washing buffer are identical.

\* \* \* \* \*

```
                              SEQUENCE LISTING

Sequence total quantity: 101
SEQ ID NO: 1            moltype = DNA   length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 1
aggccagagc attcgaacgt gatttttttt tttttttvn                           40

SEQ ID NO: 2            moltype = DNA   length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 2
aggccagagc attcgaaaca tcgtttttt ttttttttvn                           40

SEQ ID NO: 3            moltype = DNA   length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 3
aggccagagc attcgatgcc taatttttt ttttttttvn                           40

SEQ ID NO: 4            moltype = DNA   length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 4
aggccagagc attcgagtgg tcatttttt ttttttttvn                           40

SEQ ID NO: 5            moltype = DNA   length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 5
aggccagagc attcgaccac tgttttttt ttttttttvn                           40

SEQ ID NO: 6            moltype = DNA   length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 6
aggccagagc attcgacatt ggctttttt ttttttttvn                           40

SEQ ID NO: 7            moltype = DNA   length = 40
FEATURE                 Location/Qualifiers
```

```
misc_feature          1..40
                      note = Synthetic Oligonucleotide
misc_feature          1
                      note = 5' Phosphorylation
source                1..40
                      mol_type = other DNA
                      organism = synthetic construct
SEQUENCE: 7
aggccagagc attcgcagat ctgttttttt ttttttttvn                                40

SEQ ID NO: 8          moltype = DNA   length = 40
FEATURE               Location/Qualifiers
misc_feature          1..40
                      note = Synthetic Oligonucleotide
misc_feature          1
                      note = 5' Phosphorylation
source                1..40
                      mol_type = other DNA
                      organism = synthetic construct
SEQUENCE: 8
aggccagagc attcgcatca agttttttt ttttttttvn                                 40

SEQ ID NO: 9          moltype = DNA   length = 40
FEATURE               Location/Qualifiers
misc_feature          1..40
                      note = Synthetic Oligonucleotide
misc_feature          1
                      note = 5' Phosphorylation
source                1..40
                      mol_type = other DNA
                      organism = synthetic construct
SEQUENCE: 9
aggccagagc attcgcgctg atcttttttt ttttttttvn                                40

SEQ ID NO: 10         moltype = DNA   length = 40
FEATURE               Location/Qualifiers
misc_feature          1..40
                      note = Synthetic Oligonucleotide
misc_feature          1
                      note = 5' Phosphorylation
source                1..40
                      mol_type = other DNA
                      organism = synthetic construct
SEQUENCE: 10
aggccagagc attcgacaag ctattttttt ttttttttvn                                40

SEQ ID NO: 11         moltype = DNA   length = 40
FEATURE               Location/Qualifiers
misc_feature          1..40
                      note = Synthetic Oligonucleotide
misc_feature          1
                      note = 5' Phosphorylation
source                1..40
                      mol_type = other DNA
                      organism = synthetic construct
SEQUENCE: 11
aggccagagc attcgctgta gccttttttt ttttttttvn                                40

SEQ ID NO: 12         moltype = DNA   length = 40
FEATURE               Location/Qualifiers
misc_feature          1..40
                      note = Synthetic Oligonucleotide
misc_feature          1
                      note = 5' Phosphorylation
source                1..40
                      mol_type = other DNA
                      organism = synthetic construct
SEQUENCE: 12
aggccagagc attcgagtac aagttttttt ttttttttvn                                40

SEQ ID NO: 13         moltype = DNA   length = 40
FEATURE               Location/Qualifiers
misc_feature          1..40
                      note = Synthetic Oligonucleotide
misc_feature          1
                      note = 5' Phosphorylation
source                1..40
                      mol_type = other DNA
                      organism = synthetic construct
```

```
SEQUENCE: 13
aggccagagc attcgaacaa ccattttttt tttttttvn                              40

SEQ ID NO: 14          moltype = DNA   length = 40
FEATURE                Location/Qualifiers
misc_feature           1..40
                       note = Synthetic Oligonucleotide
misc_feature           1
                       note = 5' Phosphorylation
source                 1..40
                       mol_type = other DNA
                       organism = synthetic construct
SEQUENCE: 14
aggccagagc attcgaaccg agattttttt tttttttvn                              40

SEQ ID NO: 15          moltype = DNA   length = 40
FEATURE                Location/Qualifiers
misc_feature           1..40
                       note = Synthetic Oligonucleotide
misc_feature           1
                       note = 5' Phosphorylation
source                 1..40
                       mol_type = other DNA
                       organism = synthetic construct
SEQUENCE: 15
aggccagagc attcgaacgc ttattttttt tttttttvn                              40

SEQ ID NO: 16          moltype = DNA   length = 40
FEATURE                Location/Qualifiers
misc_feature           1..40
                       note = Synthetic Oligonucleotide
misc_feature           1
                       note = 5' Phosphorylation
source                 1..40
                       mol_type = other DNA
                       organism = synthetic construct
SEQUENCE: 16
aggccagagc attcgaagac ggattttttt tttttttvn                              40

SEQ ID NO: 17          moltype = DNA   length = 40
FEATURE                Location/Qualifiers
misc_feature           1..40
                       note = Synthetic Oligonucleotide
misc_feature           1
                       note = 5' Phosphorylation
source                 1..40
                       mol_type = other DNA
                       organism = synthetic construct
SEQUENCE: 17
aggccagagc attcgaaggt acattttttt tttttttvn                              40

SEQ ID NO: 18          moltype = DNA   length = 40
FEATURE                Location/Qualifiers
misc_feature           1..40
                       note = Synthetic Oligonucleotide
misc_feature           1
                       note = 5' Phosphorylation
source                 1..40
                       mol_type = other DNA
                       organism = synthetic construct
SEQUENCE: 18
aggccagagc attcgacaca gaattttttt tttttttvn                              40

SEQ ID NO: 19          moltype = DNA   length = 40
FEATURE                Location/Qualifiers
misc_feature           1..40
                       note = Synthetic Oligonucleotide
misc_feature           1
                       note = 5' Phosphorylation
source                 1..40
                       mol_type = other DNA
                       organism = synthetic construct
SEQUENCE: 19
aggccagagc attcgacagc agattttttt tttttttvn                              40

SEQ ID NO: 20          moltype = DNA   length = 40
FEATURE                Location/Qualifiers
misc_feature           1..40
                       note = Synthetic Oligonucleotide
```

```
                         -continued
misc_feature             1
                         note = 5' Phosphorylation
source                   1..40
                         mol_type = other DNA
                         organism = synthetic construct
SEQUENCE: 20
aggccagagc attcgacctc caattttttt ttttttttvn                              40

SEQ ID NO: 21            moltype = DNA  length = 40
FEATURE                  Location/Qualifiers
misc_feature             1..40
                         note = Synthetic Oligonucleotide
misc_feature             1
                         note = 5' Phosphorylation
source                   1..40
                         mol_type = other DNA
                         organism = synthetic construct
SEQUENCE: 21
aggccagagc attcgacgct cgattttttt ttttttttvn                              40

SEQ ID NO: 22            moltype = DNA  length = 40
FEATURE                  Location/Qualifiers
misc_feature             1..40
                         note = Synthetic Oligonucleotide
misc_feature             1
                         note = 5' Phosphorylation
source                   1..40
                         mol_type = other DNA
                         organism = synthetic construct
SEQUENCE: 22
aggccagagc attcgacgta tcattttttt ttttttttvn                              40

SEQ ID NO: 23            moltype = DNA  length = 40
FEATURE                  Location/Qualifiers
misc_feature             1..40
                         note = Synthetic Oligonucleotide
misc_feature             1
                         note = 5' Phosphorylation
source                   1..40
                         mol_type = other DNA
                         organism = synthetic construct
SEQUENCE: 23
aggccagagc attcgactat gcattttttt ttttttttvn                              40

SEQ ID NO: 24            moltype = DNA  length = 40
FEATURE                  Location/Qualifiers
misc_feature             1..40
                         note = Synthetic Oligonucleotide
misc_feature             1
                         note = 5' Phosphorylation
source                   1..40
                         mol_type = other DNA
                         organism = synthetic construct
SEQUENCE: 24
aggccagagc attcgagagt caattttttt ttttttttvn                              40

SEQ ID NO: 25            moltype = DNA  length = 40
FEATURE                  Location/Qualifiers
misc_feature             1..40
                         note = Synthetic Oligonucleotide
misc_feature             1
                         note = 5' Phosphorylation
source                   1..40
                         mol_type = other DNA
                         organism = synthetic construct
SEQUENCE: 25
aggccagagc attcgagatc gcattttttt ttttttttvn                              40

SEQ ID NO: 26            moltype = DNA  length = 40
FEATURE                  Location/Qualifiers
misc_feature             1..40
                         note = Synthetic Oligonucleotide
misc_feature             1
                         note = 5' Phosphorylation
source                   1..40
                         mol_type = other DNA
                         organism = synthetic construct
SEQUENCE: 26
aggccagagc attcgagcag gaattttttt ttttttttvn                              40
```

```
SEQ ID NO: 27               moltype = DNA  length = 40
FEATURE                     Location/Qualifiers
misc_feature                1..40
                            note = Synthetic Oligonucleotide
misc_feature                1
                            note = 5' Phosphorylation
source                      1..40
                            mol_type = other DNA
                            organism = synthetic construct
SEQUENCE: 27
aggccagagc attcgagtca ctatttttt tttttttvn                                40

SEQ ID NO: 28               moltype = DNA  length = 40
FEATURE                     Location/Qualifiers
misc_feature                1..40
                            note = Synthetic Oligonucleotide
misc_feature                1
                            note = 5' Phosphorylation
source                      1..40
                            mol_type = other DNA
                            organism = synthetic construct
SEQUENCE: 28
aggccagagc attcgatcct gtatttttt tttttttvn                                40

SEQ ID NO: 29               moltype = DNA  length = 40
FEATURE                     Location/Qualifiers
misc_feature                1..40
                            note = Synthetic Oligonucleotide
misc_feature                1
                            note = 5' Phosphorylation
source                      1..40
                            mol_type = other DNA
                            organism = synthetic construct
SEQUENCE: 29
aggccagagc attcgattga ggatttttt tttttttvn                                40

SEQ ID NO: 30               moltype = DNA  length = 40
FEATURE                     Location/Qualifiers
misc_feature                1..40
                            note = Synthetic Oligonucleotide
misc_feature                1
                            note = 5' Phosphorylation
source                      1..40
                            mol_type = other DNA
                            organism = synthetic construct
SEQUENCE: 30
aggccagagc attcgcaacc acatttttt tttttttvn                                40

SEQ ID NO: 31               moltype = DNA  length = 40
FEATURE                     Location/Qualifiers
misc_feature                1..40
                            note = Synthetic Oligonucleotide
misc_feature                1
                            note = 5' Phosphorylation
source                      1..40
                            mol_type = other DNA
                            organism = synthetic construct
SEQUENCE: 31
aggccagagc attcggacta gtatttttt tttttttvn                                40

SEQ ID NO: 32               moltype = DNA  length = 40
FEATURE                     Location/Qualifiers
misc_feature                1..40
                            note = Synthetic Oligonucleotide
misc_feature                1
                            note = 5' Phosphorylation
source                      1..40
                            mol_type = other DNA
                            organism = synthetic construct
SEQUENCE: 32
aggccagagc attcgcaatg gaatttttt tttttttvn                                40

SEQ ID NO: 33               moltype = DNA  length = 40
FEATURE                     Location/Qualifiers
misc_feature                1..40
                            note = Synthetic Oligonucleotide
misc_feature                1
                            note = 5' Phosphorylation
```

```
source                     1..40
                           mol_type = other DNA
                           organism = synthetic construct
SEQUENCE: 33
aggccagagc attcgcactt cgattttttt tttttttttvn                               40

SEQ ID NO: 34              moltype = DNA   length = 40
FEATURE                    Location/Qualifiers
misc_feature               1..40
                           note = Synthetic Oligonucleotide
misc_feature               1
                           note = 5' Phosphorylation
source                     1..40
                           mol_type = other DNA
                           organism = synthetic construct
SEQUENCE: 34
aggccagagc attcgcagcg ttattttttt tttttttttvn                               40

SEQ ID NO: 35              moltype = DNA   length = 40
FEATURE                    Location/Qualifiers
misc_feature               1..40
                           note = Synthetic Oligonucleotide
misc_feature               1
                           note = 5' Phosphorylation
source                     1..40
                           mol_type = other DNA
                           organism = synthetic construct
SEQUENCE: 35
aggccagagc attcgcatac caattttttt tttttttttvn                               40

SEQ ID NO: 36              moltype = DNA   length = 40
FEATURE                    Location/Qualifiers
misc_feature               1..40
                           note = Synthetic Oligonucleotide
misc_feature               1
                           note = 5' Phosphorylation
source                     1..40
                           mol_type = other DNA
                           organism = synthetic construct
SEQUENCE: 36
aggccagagc attcgccagt tcattttttt tttttttttvn                               40

SEQ ID NO: 37              moltype = DNA   length = 40
FEATURE                    Location/Qualifiers
misc_feature               1..40
                           note = Synthetic Oligonucleotide
misc_feature               1
                           note = 5' Phosphorylation
source                     1..40
                           mol_type = other DNA
                           organism = synthetic construct
SEQUENCE: 37
aggccagagc attcgccgaa gtattttttt tttttttttvn                               40

SEQ ID NO: 38              moltype = DNA   length = 40
FEATURE                    Location/Qualifiers
misc_feature               1..40
                           note = Synthetic Oligonucleotide
misc_feature               1
                           note = 5' Phosphorylation
source                     1..40
                           mol_type = other DNA
                           organism = synthetic construct
SEQUENCE: 38
aggccagagc attcgccgtg agattttttt tttttttttvn                               40

SEQ ID NO: 39              moltype = DNA   length = 40
FEATURE                    Location/Qualifiers
misc_feature               1..40
                           note = Synthetic Oligonucleotide
misc_feature               1
                           note = 5' Phosphorylation
source                     1..40
                           mol_type = other DNA
                           organism = synthetic construct
SEQUENCE: 39
aggccagagc attcgcctcc tgattttttt tttttttttvn                               40

SEQ ID NO: 40              moltype = DNA   length = 40
```

```
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 40
aggccagagc attcgcgaac ttatttttt ttttttttvn                              40

SEQ ID NO: 41           moltype = DNA  length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 41
aggccagagc attcgcgact ggatttttt ttttttttvn                              40

SEQ ID NO: 42           moltype = DNA  length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 42
aggccagagc attcgcgcat acatttttt ttttttttvn                              40

SEQ ID NO: 43           moltype = DNA  length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 43
aggccagagc attcgctcaa tgatttttt ttttttttvn                              40

SEQ ID NO: 44           moltype = DNA  length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 44
aggccagagc attcgctgag ccatttttt ttttttttvn                              40

SEQ ID NO: 45           moltype = DNA  length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 45
aggccagagc attcgctggc atatttttt ttttttttvn                              40

SEQ ID NO: 46           moltype = DNA  length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
```

```
                        organism = synthetic construct
SEQUENCE: 46
aggccagagc attcggaatc tgattttttt tttttttttvn                    40

SEQ ID NO: 47           moltype = DNA  length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 47
aggccagagc attcgcaaga ctattttttt tttttttttvn                    40

SEQ ID NO: 48           moltype = DNA  length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 48
aggccagagc attcggagct gaattttttt tttttttttvn                    40

SEQ ID NO: 49           moltype = DNA  length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 49
aggccagagc attcggatag acattttttt tttttttttvn                    40

SEQ ID NO: 50           moltype = DNA  length = 40
FEATURE                 Location/Qualifiers
misc_feature            1..40
                        note = Synthetic Oligonucleotide
misc_feature            1
                        note = 5' Phosphorylation
source                  1..40
                        mol_type = other DNA
                        organism = synthetic construct
SEQUENCE: 50
aggccagagc attcggccac atattttttt tttttttttvn                    40

SEQ ID NO: 51           moltype = DNA  length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 51
caagcgttgg cttctcgcat ctnnnnnnnn nnaacgtgat atccacgtgc ttgag     55

SEQ ID NO: 52           moltype = DNA  length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 52
caagcgttgg cttctcgcat ctnnnnnnnn nnaaacatcg atccacgtgc ttgag     55

SEQ ID NO: 53           moltype = DNA  length = 55
FEATURE                 Location/Qualifiers
misc_feature            1..55
```

```
                          note = Synthetic Oligonucleotide
misc_feature              1
                          note = 5' Biotin
source                    1..55
                          mol_type = other DNA
                          organism = synthetic construct
SEQUENCE: 53
caagcgttgg cttctcgcat ctnnnnnnnn nnatgcctaa atccacgtgc ttgag            55

SEQ ID NO: 54             moltype = DNA  length = 55
FEATURE                   Location/Qualifiers
misc_feature              1..55
                          note = Synthetic Oligonucleotide
misc_feature              1
                          note = 5' Biotin
source                    1..55
                          mol_type = other DNA
                          organism = synthetic construct
SEQUENCE: 54
caagcgttgg cttctcgcat ctnnnnnnnn nnagtggtca atccacgtgc ttgag            55

SEQ ID NO: 55             moltype = DNA  length = 55
FEATURE                   Location/Qualifiers
misc_feature              1..55
                          note = Synthetic Oligonucleotide
misc_feature              1
                          note = 5' Biotin
source                    1..55
                          mol_type = other DNA
                          organism = synthetic construct
SEQUENCE: 55
caagcgttgg cttctcgcat ctnnnnnnnn nnaccactgt atccacgtgc ttgag            55

SEQ ID NO: 56             moltype = DNA  length = 55
FEATURE                   Location/Qualifiers
misc_feature              1..55
                          note = Synthetic Oligonucleotide
misc_feature              1
                          note = 5' Biotin
source                    1..55
                          mol_type = other DNA
                          organism = synthetic construct
SEQUENCE: 56
caagcgttgg cttctcgcat ctnnnnnnnn nnacattggc atccacgtgc ttgag            55

SEQ ID NO: 57             moltype = DNA  length = 55
FEATURE                   Location/Qualifiers
misc_feature              1..55
                          note = Synthetic Oligonucleotide
misc_feature              1
                          note = 5' Biotin
source                    1..55
                          mol_type = other DNA
                          organism = synthetic construct
SEQUENCE: 57
caagcgttgg cttctcgcat ctnnnnnnnn nncagatctg atccacgtgc ttgag            55

SEQ ID NO: 58             moltype = DNA  length = 55
FEATURE                   Location/Qualifiers
misc_feature              1..55
                          note = Synthetic Oligonucleotide
misc_feature              1
                          note = 5' Biotin
source                    1..55
                          mol_type = other DNA
                          organism = synthetic construct
SEQUENCE: 58
caagcgttgg cttctcgcat ctnnnnnnnn nncatcaagt atccacgtgc ttgag            55

SEQ ID NO: 59             moltype = DNA  length = 55
FEATURE                   Location/Qualifiers
misc_feature              1..55
                          note = Synthetic Oligonucleotide
misc_feature              1
                          note = 5' Biotin
source                    1..55
                          mol_type = other DNA
                          organism = synthetic construct
SEQUENCE: 59
```

-continued

```
caagcgttgg cttctcgcat ctnnnnnnnn nncgctgatc atccacgtgc ttgag       55

SEQ ID NO: 60           moltype = DNA  length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 60
caagcgttgg cttctcgcat ctnnnnnnnn nnacaagcta atccacgtgc ttgag       55

SEQ ID NO: 61           moltype = DNA  length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 61
caagcgttgg cttctcgcat ctnnnnnnnn nnctgtagcc atccacgtgc ttgag       55

SEQ ID NO: 62           moltype = DNA  length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 62
caagcgttgg cttctcgcat ctnnnnnnnn nnagtacaag atccacgtgc ttgag       55

SEQ ID NO: 63           moltype = DNA  length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 63
caagcgttgg cttctcgcat ctnnnnnnnn nnaacaacca atccacgtgc ttgag       55

SEQ ID NO: 64           moltype = DNA  length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 64
caagcgttgg cttctcgcat ctnnnnnnnn nnaaccgaga atccacgtgc ttgag       55

SEQ ID NO: 65           moltype = DNA  length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 65
caagcgttgg cttctcgcat ctnnnnnnnn nnaacgctta atccacgtgc ttgag       55

SEQ ID NO: 66           moltype = DNA  length = 55
FEATURE                 Location/Qualifiers
misc_feature            1..55
                        note = Synthetic Oligonucleotide
misc_feature            1
```

```
                    note = 5' Biotin
source              1..55
                    mol_type = other DNA
                    organism = synthetic construct
SEQUENCE: 66
caagcgttgg cttctcgcat ctnnnnnnnn nnaagacgga atccacgtgc ttgag        55

SEQ ID NO: 67       moltype = DNA  length = 55
FEATURE             Location/Qualifiers
misc_feature        1..55
                    note = Synthetic Oligonucleotide
misc_feature        1
                    note = 5' Biotin
source              1..55
                    mol_type = other DNA
                    organism = synthetic construct
SEQUENCE: 67
caagcgttgg cttctcgcat ctnnnnnnnn nnaaggtaca atccacgtgc ttgag        55

SEQ ID NO: 68       moltype = DNA  length = 55
FEATURE             Location/Qualifiers
misc_feature        1..55
                    note = Synthetic Oligonucleotide
misc_feature        1
                    note = 5' Biotin
source              1..55
                    mol_type = other DNA
                    organism = synthetic construct
SEQUENCE: 68
caagcgttgg cttctcgcat ctnnnnnnnn nnacacagaa atccacgtgc ttgag        55

SEQ ID NO: 69       moltype = DNA  length = 55
FEATURE             Location/Qualifiers
misc_feature        1..55
                    note = Synthetic Oligonucleotide
misc_feature        1
                    note = 5' Biotin
source              1..55
                    mol_type = other DNA
                    organism = synthetic construct
SEQUENCE: 69
caagcgttgg cttctcgcat ctnnnnnnnn nnacagcaga atccacgtgc ttgag        55

SEQ ID NO: 70       moltype = DNA  length = 55
FEATURE             Location/Qualifiers
misc_feature        1..55
                    note = Synthetic Oligonucleotide
misc_feature        1
                    note = 5' Biotin
source              1..55
                    mol_type = other DNA
                    organism = synthetic construct
SEQUENCE: 70
caagcgttgg cttctcgcat ctnnnnnnnn nnacctccaa atccacgtgc ttgag        55

SEQ ID NO: 71       moltype = DNA  length = 55
FEATURE             Location/Qualifiers
misc_feature        1..55
                    note = Synthetic Oligonucleotide
misc_feature        1
                    note = 5' Biotin
source              1..55
                    mol_type = other DNA
                    organism = synthetic construct
SEQUENCE: 71
caagcgttgg cttctcgcat ctnnnnnnnn nnacgctcga atccacgtgc ttgag        55

SEQ ID NO: 72       moltype = DNA  length = 55
FEATURE             Location/Qualifiers
misc_feature        1..55
                    note = Synthetic Oligonucleotide
misc_feature        1
                    note = 5' Biotin
source              1..55
                    mol_type = other DNA
                    organism = synthetic construct
SEQUENCE: 72
caagcgttgg cttctcgcat ctnnnnnnnn nnacgtatca atccacgtgc ttgag        55
```

```
SEQ ID NO: 73              moltype = DNA   length = 55
FEATURE                    Location/Qualifiers
misc_feature               1..55
                           note = Synthetic Oligonucleotide
misc_feature               1
                           note = 5' Biotin
source                     1..55
                           mol_type = other DNA
                           organism = synthetic construct
SEQUENCE: 73
caagcgttgg cttctcgcat ctnnnnnnnn nnactatgca atccacgtgc ttgag       55

SEQ ID NO: 74              moltype = DNA   length = 55
FEATURE                    Location/Qualifiers
misc_feature               1..55
                           note = Synthetic Oligonucleotide
misc_feature               1
                           note = 5' Biotin
source                     1..55
                           mol_type = other DNA
                           organism = synthetic construct
SEQUENCE: 74
caagcgttgg cttctcgcat ctnnnnnnnn nnagagtcaa atccacgtgc ttgag       55

SEQ ID NO: 75              moltype = DNA   length = 55
FEATURE                    Location/Qualifiers
misc_feature               1..55
                           note = Synthetic Oligonucleotide
misc_feature               1
                           note = 5' Biotin
source                     1..55
                           mol_type = other DNA
                           organism = synthetic construct
SEQUENCE: 75
caagcgttgg cttctcgcat ctnnnnnnnn nnagatcgca atccacgtgc ttgag       55

SEQ ID NO: 76              moltype = DNA   length = 55
FEATURE                    Location/Qualifiers
misc_feature               1..55
                           note = Synthetic Oligonucleotide
misc_feature               1
                           note = 5' Biotin
source                     1..55
                           mol_type = other DNA
                           organism = synthetic construct
SEQUENCE: 76
caagcgttgg cttctcgcat ctnnnnnnnn nnagcaggaa atccacgtgc ttgag       55

SEQ ID NO: 77              moltype = DNA   length = 55
FEATURE                    Location/Qualifiers
misc_feature               1..55
                           note = Synthetic Oligonucleotide
misc_feature               1
                           note = 5' Biotin
source                     1..55
                           mol_type = other DNA
                           organism = synthetic construct
SEQUENCE: 77
caagcgttgg cttctcgcat ctnnnnnnnn nnagtcacta atccacgtgc ttgag       55

SEQ ID NO: 78              moltype = DNA   length = 55
FEATURE                    Location/Qualifiers
misc_feature               1..55
                           note = Synthetic Oligonucleotide
misc_feature               1
                           note = 5' Biotin
source                     1..55
                           mol_type = other DNA
                           organism = synthetic construct
SEQUENCE: 78
caagcgttgg cttctcgcat ctnnnnnnnn nnatcctgta atccacgtgc ttgag       55

SEQ ID NO: 79              moltype = DNA   length = 55
FEATURE                    Location/Qualifiers
misc_feature               1..55
                           note = Synthetic Oligonucleotide
misc_feature               1
                           note = 5' Biotin
source                     1..55
```

```
                        mol_type = other DNA
                        organism = synthetic construct
SEQUENCE: 79
caagcgttgg cttctcgcat ctnnnnnnnn nnattgagga atccacgtgc ttgag          55

SEQ ID NO: 80           moltype = DNA   length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 80
caagcgttgg cttctcgcat ctnnnnnnnn nncaaccaca atccacgtgc ttgag          55

SEQ ID NO: 81           moltype = DNA   length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 81
caagcgttgg cttctcgcat ctnnnnnnnn nngactagta atccacgtgc ttgag          55

SEQ ID NO: 82           moltype = DNA   length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 82
caagcgttgg cttctcgcat ctnnnnnnnn nncaatggaa atccacgtgc ttgag          55

SEQ ID NO: 83           moltype = DNA   length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 83
caagcgttgg cttctcgcat ctnnnnnnnn nncacttcga atccacgtgc ttgag          55

SEQ ID NO: 84           moltype = DNA   length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 84
caagcgttgg cttctcgcat ctnnnnnnnn nncagcgtta atccacgtgc ttgag          55

SEQ ID NO: 85           moltype = DNA   length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 85
caagcgttgg cttctcgcat ctnnnnnnnn nncataccaa atccacgtgc ttgag          55

SEQ ID NO: 86           moltype = DNA   length = 55
FEATURE                 Location/Qualifiers
```

```
misc_feature            1..55
                        note = Synthetic Oligonucleotide
misc_feature            1
                        note = 5' Biotin
source                  1..55
                        mol_type = other DNA
                        organism = synthetic construct
SEQUENCE: 86
caagcgttgg cttctcgcat ctnnnnnnnn nnccagttca atccacgtgc ttgag       55

SEQ ID NO: 87           moltype = DNA  length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 87
caagcgttgg cttctcgcat ctnnnnnnnn nnccgaagta atccacgtgc ttgag       55

SEQ ID NO: 88           moltype = DNA  length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 88
caagcgttgg cttctcgcat ctnnnnnnnn nnccgtgaga atccacgtgc ttgag       55

SEQ ID NO: 89           moltype = DNA  length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 89
caagcgttgg cttctcgcat ctnnnnnnnn nncctcctga atccacgtgc ttgag       55

SEQ ID NO: 90           moltype = DNA  length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 90
caagcgttgg cttctcgcat ctnnnnnnnn nncgaactta atccacgtgc ttgag       55

SEQ ID NO: 91           moltype = DNA  length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 91
caagcgttgg cttctcgcat ctnnnnnnnn nncgactgga atccacgtgc ttgag       55

SEQ ID NO: 92           moltype = DNA  length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
```

```
SEQUENCE: 92
caagcgttgg cttctcgcat ctnnnnnnnn nncgcataca atccacgtgc ttgag        55

SEQ ID NO: 93           moltype = DNA   length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 93
caagcgttgg cttctcgcat ctnnnnnnnn nnctcaatga atccacgtgc ttgag        55

SEQ ID NO: 94           moltype = DNA   length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 94
caagcgttgg cttctcgcat ctnnnnnnnn nnctgagcca atccacgtgc ttgag        55

SEQ ID NO: 95           moltype = DNA   length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 95
caagcgttgg cttctcgcat ctnnnnnnnn nnctggcata atccacgtgc ttgag        55

SEQ ID NO: 96           moltype = DNA   length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 96
caagcgttgg cttctcgcat ctnnnnnnnn nngaatctga atccacgtgc ttgag        55

SEQ ID NO: 97           moltype = DNA   length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 97
caagcgttgg cttctcgcat ctnnnnnnnn nncaagacta atccacgtgc ttgag        55

SEQ ID NO: 98           moltype = DNA   length = 55
FEATURE                 Location/Qualifiers
misc_feature            1..55
                        note = Synthetic Oligonucleotide
misc_feature            1
                        note = 5' Biotin
source                  1..55
                        mol_type = other DNA
                        organism = synthetic construct
SEQUENCE: 98
caagcgttgg cttctcgcat ctnnnnnnnn nngagctgaa atccacgtgc ttgag        55

SEQ ID NO: 99           moltype = DNA   length = 55
FEATURE                 Location/Qualifiers
misc_feature            1..55
                        note = Synthetic Oligonucleotide
```

-continued

```
misc_feature         1
                     note = 5' Biotin
source               1..55
                     mol_type = other DNA
                     organism = synthetic construct
SEQUENCE: 99
caagcgttgg cttctcgcat ctnnnnnnnn nngatagaca atccacgtgc ttgag          55

SEQ ID NO: 100       moltype = DNA  length = 55
FEATURE              Location/Qualifiers
misc_feature         1..55
                     note = Synthetic Oligonucleotide
misc_feature         1
                     note = 5' Biotin
source               1..55
                     mol_type = other DNA
                     organism = synthetic construct
SEQUENCE: 100
caagcgttgg cttctcgcat ctnnnnnnnn nngccacata atccacgtgc ttgag          55

SEQ ID NO: 101       moltype = DNA  length = 30
FEATURE              Location/Qualifiers
misc_feature         1..30
                     note = Synthetic Oligonucleotide
source               1..30
                     mol_type = other DNA
                     organism = synthetic construct
SEQUENCE: 101
cgaatgctct ggcctctcaa gcacgtggat                                      30
```